(12) United States Patent
Iwami et al.

(10) Patent No.: US 10,499,200 B2
(45) Date of Patent: Dec. 3, 2019

(54) INFORMATION PROCESSING DEVICE AND INFORMATION PROCESSING METHOD

(71) Applicant: SONY CORPORATION, Tokyo (JP)

(72) Inventors: Hideki Iwami, Saitama (JP); Daisuke Kawakami, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 78 days.

(21) Appl. No.: 15/528,150

(22) PCT Filed: Nov. 17, 2015

(86) PCT No.: PCT/JP2015/082194
§ 371 (c)(1),
(2) Date: May 19, 2017

(87) PCT Pub. No.: WO2016/084649
PCT Pub. Date: Jun. 2, 2016

(65) Prior Publication Data
US 2017/0332210 A1  Nov. 16, 2017

(30) Foreign Application Priority Data
Nov. 28, 2014 (JP) ................... 2014-240842

(51) Int. Cl.
*G06F 15/173* (2006.01)
*H04W 4/08* (2009.01)
(Continued)

(52) U.S. Cl.
CPC ............ *H04W 4/08* (2013.01); *H04N 21/436* (2013.01); *H04N 21/4788* (2013.01);
(Continued)

(58) Field of Classification Search
USPC .................. 709/223, 246, 231, 201, 202
See application file for complete search history.

(56) References Cited

U.S. PATENT DOCUMENTS

| | | | | |
|---|---|---|---|---|
| 9,160,835 | B1* | 10/2015 | Beckman | ............ H04M 1/7253 |
| 2012/0282922 | A1* | 11/2012 | Fodor | .................. H04W 8/22 |
| | | | | 455/426.1 |

(Continued)

FOREIGN PATENT DOCUMENTS

| | | |
|---|---|---|
| AU | 2013382296 A1 | 2/2015 |
| CA | 2890327 A1 | 9/2014 |

(Continued)

OTHER PUBLICATIONS

Search Report and Written Opinion of SG Application No. 11201703774Y, dated Apr. 23, 2018, 10 pages of ISRWO.

(Continued)

*Primary Examiner* — Lan Dai T Truong
(74) *Attorney, Agent, or Firm* — Chip Law Group

(57) ABSTRACT

To perform a process related to group formation rapidly. An information processing device includes a wireless communication and a control unit. The wireless communication unit is a wireless communication unit configured to interchange a stream for outputting image information from a first information processing device by using wireless communication, the first information processing device belonging to a first group to which one or more information processing devices including the own device belong. In addition, The control unit is a control unit configured to perform control such that capability information regarding the one or more information processing devices is exchanged with a second information processing device belonging to a second group which is a new group other than the first group when the second group is formed.

19 Claims, 32 Drawing Sheets

(51) Int. Cl.
  *H04W 76/10*  (2018.01)
  *H04N 21/436*  (2011.01)
  *H04N 21/4788*  (2011.01)
  *H04W 84/12*  (2009.01)
  *H04W 84/20*  (2009.01)

(52) U.S. Cl.
  CPC ........... *H04W 76/10* (2018.02); *H04W 84/12* (2013.01); *H04W 84/20* (2013.01)

(56) References Cited

U.S. PATENT DOCUMENTS

| | | |
|---|---|---|
| 2014/0016507 A1 | 1/2014 | Han et al. |
| 2014/0071847 A1* | 3/2014 | Pantelidou ............... H04L 1/00 370/252 |
| 2014/0091987 A1* | 4/2014 | Lee ........................ H04L 65/00 345/2.3 |
| 2014/0177472 A1 | 6/2014 | Halasz et al. |
| 2014/0226639 A1 | 8/2014 | Yi et al. |
| 2015/0245393 A1* | 8/2015 | Lee ....................... H04W 8/005 370/338 |
| 2017/0085638 A1 | 3/2017 | Lee et al. |

FOREIGN PATENT DOCUMENTS

| | | |
|---|---|---|
| CN | 104429155 A | 3/2015 |
| CN | 104813735 A | 7/2015 |
| EP | 2869658 A1 | 5/2015 |
| EP | 2873290 A1 | 5/2015 |
| JP | 2012-129651 A | 7/2012 |
| JP | 2014-078785 A | 5/2014 |
| JP | 2014-192547 A | 10/2014 |
| JP | 2014-216898 A | 11/2014 |
| JP | 2015-528249 A | 9/2015 |
| JP | 2016-506110 A | 2/2016 |
| JP | 6093026 B2 | 3/2017 |
| JP | 2017-103813 A | 6/2017 |
| KR | 10-2014-0010343 A | 1/2014 |
| KR | 10-2015-0138168 A | 12/2015 |
| RU | 2015116433 A | 11/2016 |
| WO | 2013/153925 A1 | 10/2013 |
| WO | 2014/014245 A1 | 1/2014 |
| WO | 2014/142415 A1 | 9/2014 |

OTHER PUBLICATIONS

Extended European Search Report of EP Application No. 15863929.4, dated Jun. 6, 2018, 08 pages of EESR.

Office Action for CN Patent Application No. 2016-561511, dated Jul. 30, 2019, 05 pages of Office Action and 04 pages of English Translation.

* cited by examiner

FIG. 4

MANAGEMENT INFORMATION RETENTION UNIT 390

| TERMINAL IDENTIFICATION INFORMATION (391) | FREQUENCY CHANNEL (392) | RADIO WAVE PROPAGATION MEASUREMENT INFORMATION (393) | | | | | DEVICE INFORMATION (394) | BAND USE LEVEL (395) | DISPLAY FORM (396) | STANDBY OR WAKE-UP (397) | MULTI-RECEPTION DIVERSITY CORRESPONDENCE (398) | BASIC SERVICE (105) | CONCURRENT PRESENCE OR ABSENCE (106) |
|---|---|---|---|---|---|---|---|---|---|---|---|---|---|
| | | PER | BER | NUMBER OF RETRANS- MISSIONS OF PACKETS | THROUGHPUT | FRAME DROP | SIR (RS SI) | | | | | | |
| DSC200 | 60GHz | ... | ... | ... | ... | ... | ... | MOBILE | 20Mbps | SUB (PERIPHERAL CHANNEL) | STANDBY | ABSENCE | CAPABLE OF IMAGE TRANSMISSION AND RECEPTION | PRESENCE |
| DR400 | 2.4GHz | ... | ... | ... | ... | ... | ... | STATIONERY | 20Mbps | MAIN (MIDDLE CHANNEL) | WAKE-UP | PRESENCE | CAPABLE OF ONLY IMAGE TRANSMISSION | ABSENCE |

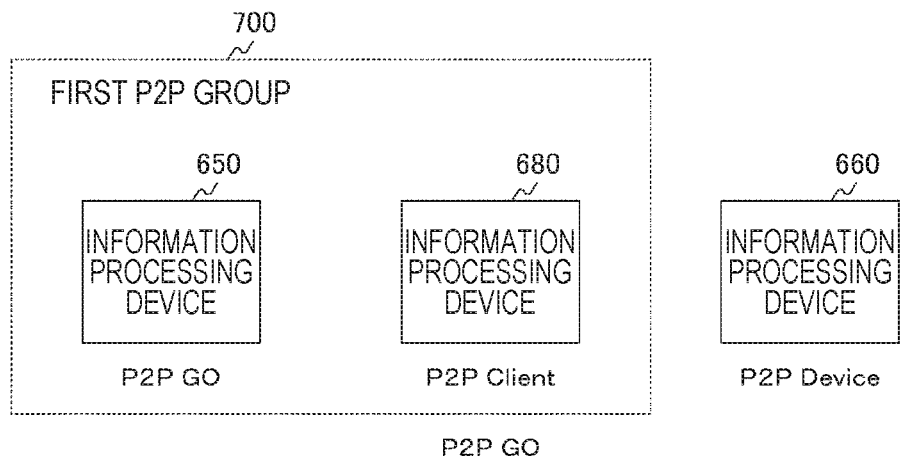
FIG. 18a
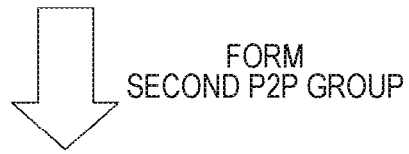
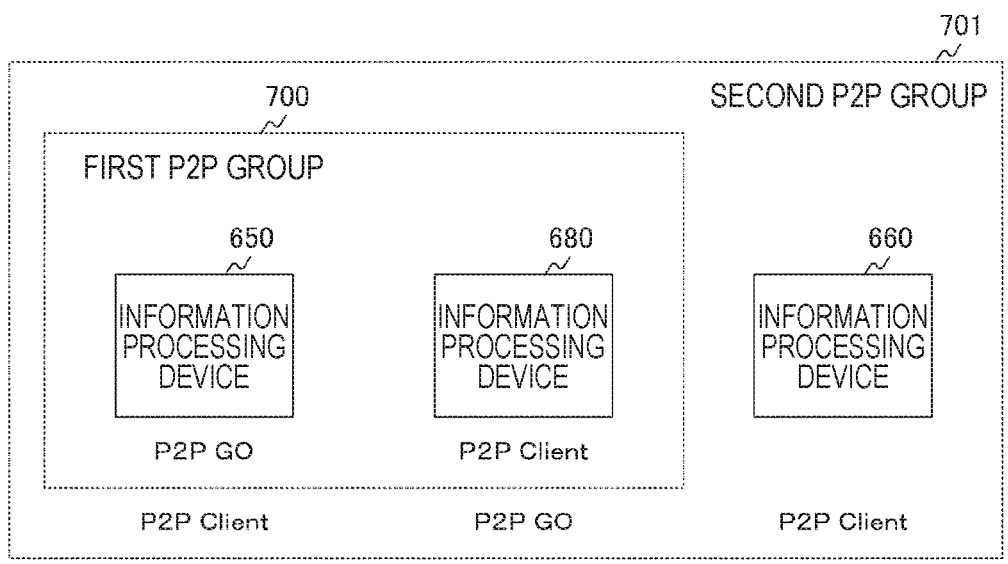
FIG. 18b

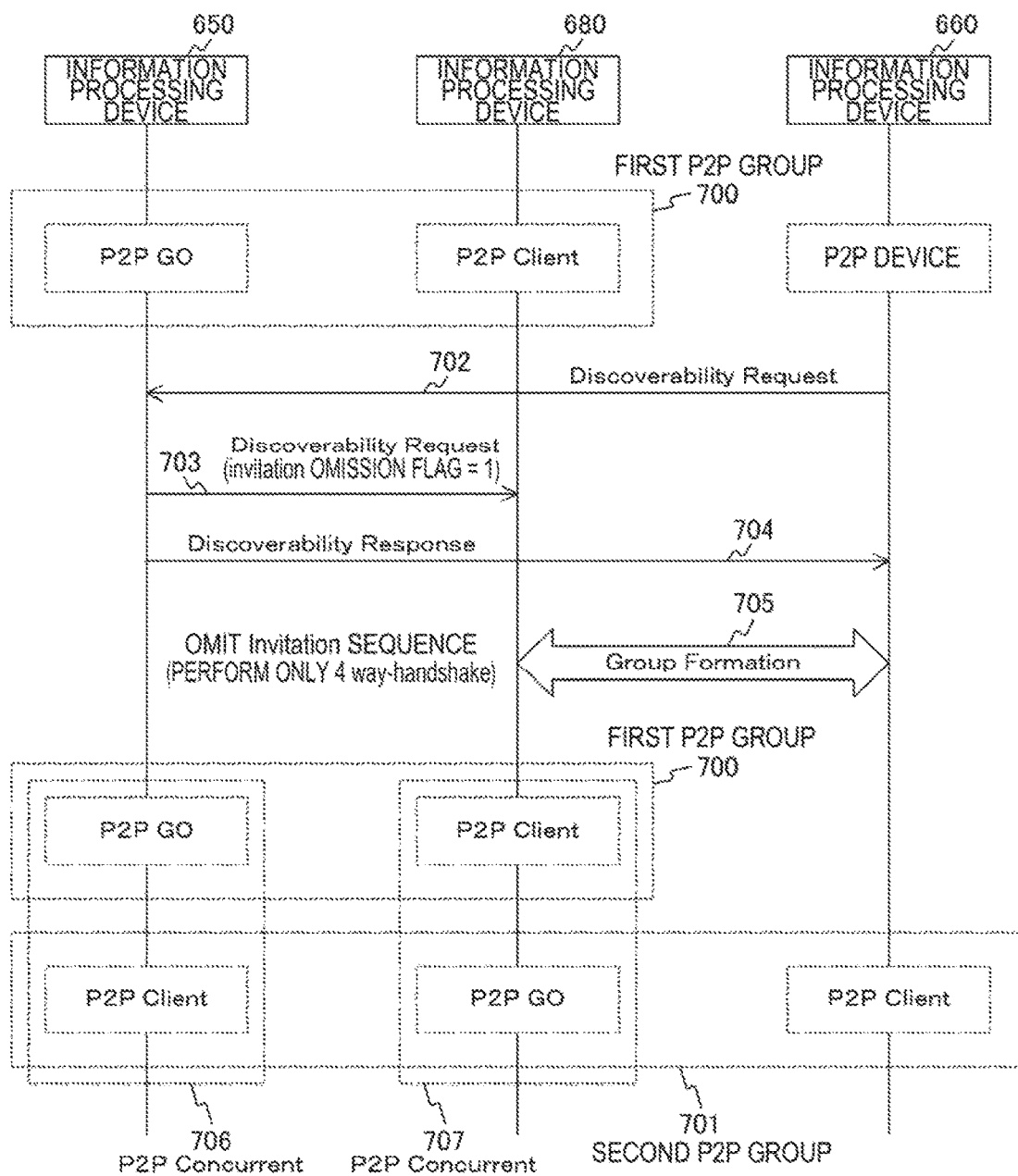

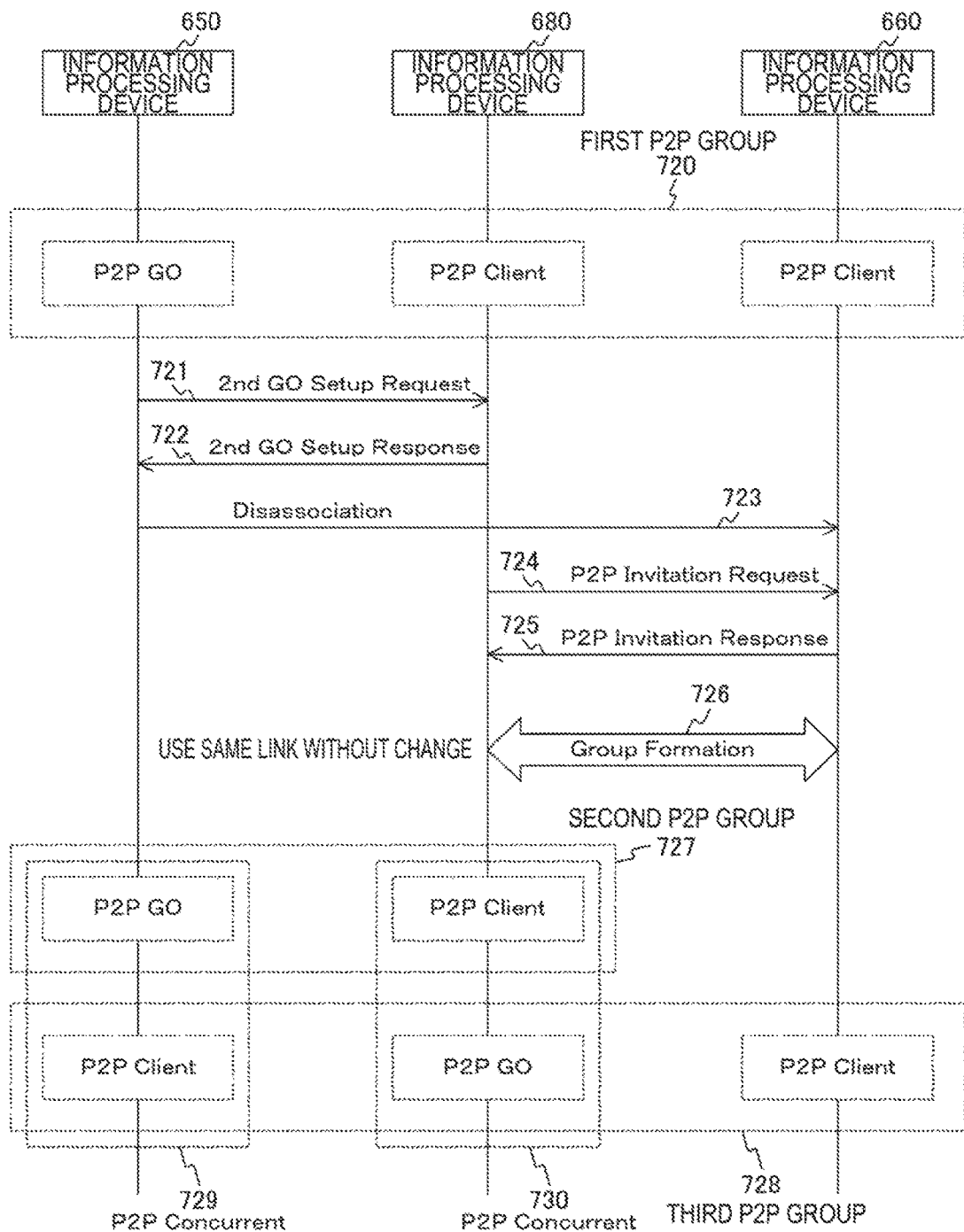

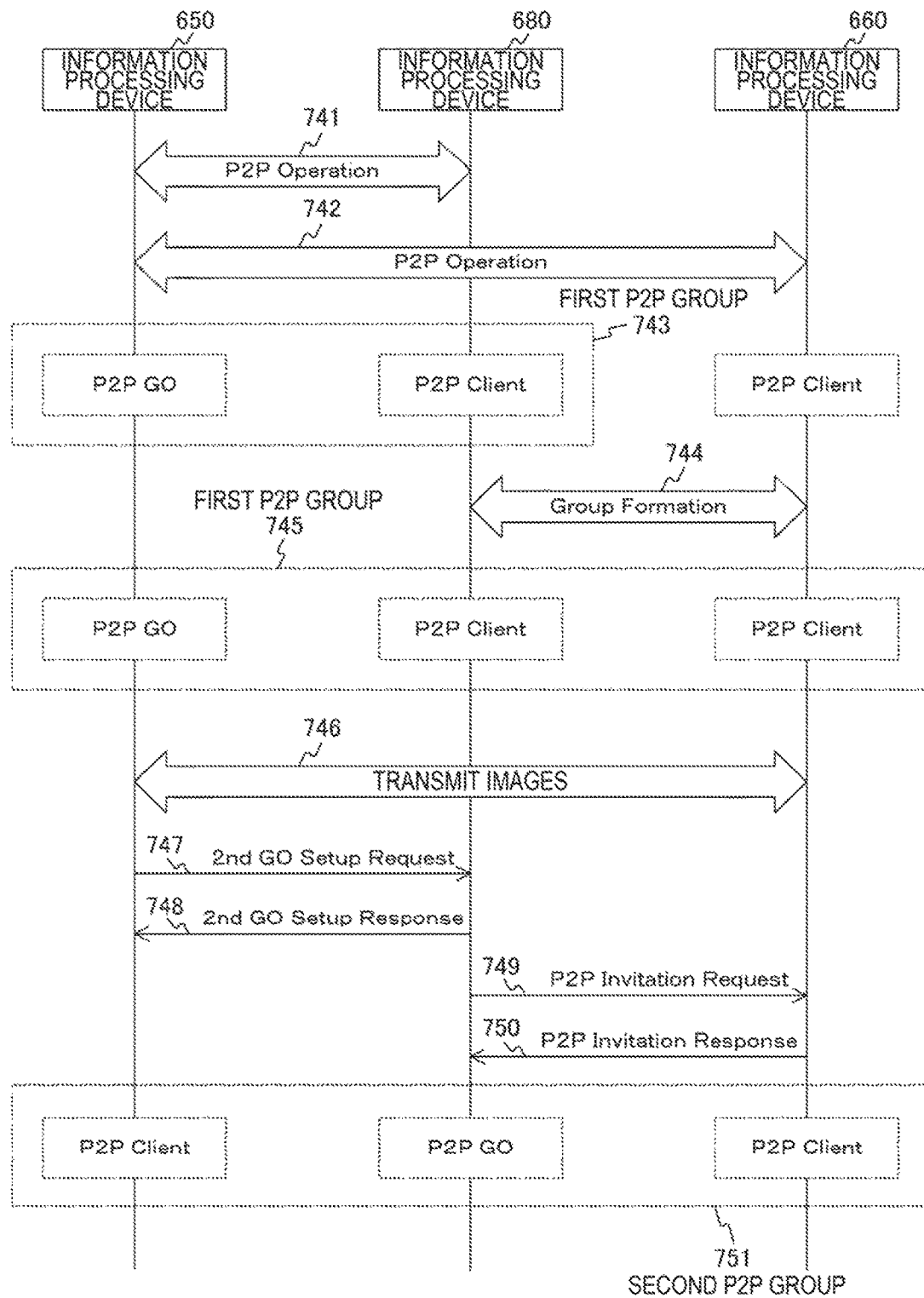

FIG. 23

Table 59 – General format of P2P action frame

| Field | Size (octets) | Value (Hexadecimal) | Description |
|---|---|---|---|
| Category | 1 | 0x7F | IEEE 802.11 vendor specific usage (IEEE Std 802.11-2007[1] Table 7-24). |
| OUI | 3 | 50 6F 9A | WFA Specific OUI. |
| OUI type | 1 | 0x09 (to be assigned) | Identifying the type or version of action frame. Setting to 09 indicates Wi-Fi P2P v1.0. |
| OUI Subtype | 1 | | Identifying the type of P2P action frame. The specific value is defined in Table 60. |
| Dialog Token | 1 | | When set to a nonzero value, used to identify the request/response transaction. |
| SubField | 1 | | 0: SAME FREQUENCY<br>1: OTHER FREQUENCIES |
| Elements | Variable | | Including P2P IE or any information elements defined in IEEE Std 802.11-2007[1]. |

FIG. 24

Table 60 — P2P action frame type

| Type | Notes |
|---|---|
| 0 | Notice of Absence |
| 1 | P2P Presence Request |
| 2 | P2P Presence Response |
| 3 | GO Discoverability Request |
| 4 | 2nd GO Setup Request |
| 5 | 2nd GO Setup Response |
| 6-255 | Reserved |

FIG. 25

Table 47 — General format of P2P public action frame

| Field | Size (octets) | Value (Hexadecimal) | Description |
|---|---|---|---|
| Category | 1 | 0×04 | IEEE 802.11 public action usage. |
| Action field | 1 | 0×09 | IEEE 802.11 vendor specific usage. |
| OUI | 3 | 50 6F 9A | WFA Specific OUI. |
| OUI type | 1 | 0×09 (to be assigned) | Identifying the type or version of action frame. Setting to 09 indicates WFA P2P v1.0. |
| OUI Subtype | 1 | | Identifying the type of P2P action frame. The specific value is defined in Table 48. |
| Invitation OMISSION FLAG | 1 | | 0: NOT OMITTED<br>1: OMITTED |
| Dialog Token | 1 | | Set to a nonzero value to identify the request/response transaction. |
| Elements | Variable | | Including P2P IE or any information elements defined in IEEE Std 802.11-2007[1]. |

FIG. 26

Table 48 — P2P public action frame type

| Type | Notes |
|---|---|
| 0 | GO Negotiation Request |
| 1 | GO Negotiation Response |
| 2 | GO Negotiation Confirmation |
| 3 | P2P Invitation Request |
| 4 | P2P Invitation Response |
| 5 | Device Discoverability Request |
| 6 | Device Discoverability Response |
| 7 | Provision Discovery Request |
| 8 | Provision Discovery Response |
| 9 — 255 | Reserved |

EACH SOURCE DEVICE SWITCHES SINK DEVICE AFTER INFORMATION PROCESSING DEVICE 660 IS DISCOVERED

DEVICE MANAGEMENT LIST 850

| TERMINAL IDENTIFICATION INFORMATION (851) | DEVICE NAME (852) | COMMUNICATION SCHEME (853) ||| |
|---|---|---|---|---|---|
| | | WIRED OR WIRELESS | MAXIMUM TRANSMISSION SPEED | FREQUENCY CHANNEL | ... |
| Source1 | FIRST SOURCE | WIRELESS | 1Gbps | 60GHz /5GHz /2.4GHz | ... |
| Source2 | SECOND SOURCE | WIRELESS | 2Gbps | 60GHz /5GHz /2.4GHz | ... |

FIG. 28a

DISCOVER INFORMATION PROCESSING DEVICE 660

DEVICE MANAGEMENT LIST 850

| TERMINAL IDENTIFICATION INFORMATION (851) | DEVICE NAME (852) | COMMUNICATION METHOD (853) ||| |
|---|---|---|---|---|---|
| | | WIRED OR WIRELESS | MAXIMUM TRANSMISSION SPEED | FREQUENCY CHANNEL | ... |
| Source1 | FIRST SOURCE | WIRELESS | 1Gbps | 60GHz /5GHz /2.4GHz | ... |
| Source2 | SECOND SOURCE | WIRELESS | 2Gbps | 60GHz /5GHz /2.4GHz | ... |
| Sink2 | SECOND SINK | WIRELESS | 2Gbps | 60GHz /5GHz /2.4GHz | ... |

FIG. 28b

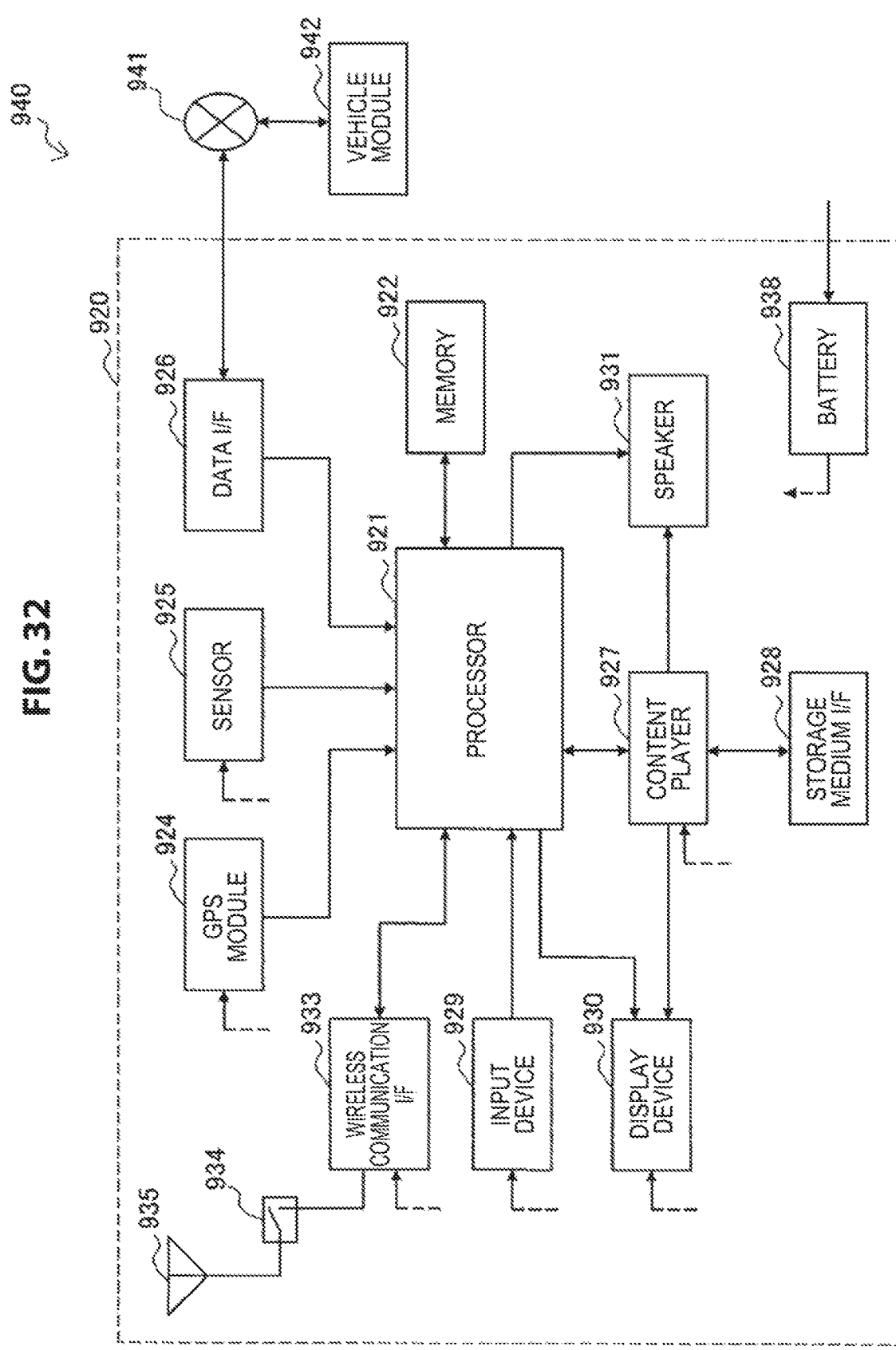

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2015/082194 filed on Nov. 17, 2015, which claims priority benefit of Japanese Patent Application No. JP 2014-240842 filed in the Japan Patent Office on Nov. 28, 2014. Each of the above-referenced applications is hereby incorporated herein by reference in its entirety.

TECHNICAL FIELD

The present technology relates to an information processing device. Specifically, the present technology relates to an information processing device and information processing method of interchanging various kinds of information using wireless communication, and a program causing a computer to perform the method.

BACKGROUND ART

Since the past, a wireless communication technique of exchanging various kinds of data using wireless communication has been known. For example, a wireless communication technique that enables various kinds of information to be interchanged between two information processing device has been proposed.

For example, a wireless communication technique that enables a group to be formed by a plurality of information processing devices and interchanging various kinds of information in the group has been proposed. In this case, it is also conceivable that the information processing devices belonging to the group can be changed.

For example, a wireless communication device that changes a topology of a group on the basis of a relation of the number of devices operating functions of supplying and using content or situations of supply and use of content by a master device has been proposed (for example, see Patent Literature 1).

CITATION LIST

Patent Literature

Patent Literature 1: JP 2014-78785A

DISCLOSURE OF INVENTION

Technical Problem

In the above-described technique of the related art, a group which has already been formed can be changed.

Here, for example, when a group to which a large number of information processing devices belongs is changed or a new group in which the number of information processing devices is large is formed, a processing time may become long in accordance with the number of information processing devices. Thus, it is important to perform a process related to group formation rapidly.

The present technology is devised in view of these circumstances and an object of the present technology is to perform a process related to group formation rapidly.

Solution to Problem

The present technology has been made to solve the above problem. According to a first aspect of the present technology, there is provided an information processing device, an information processing method, and a program causing a computer to perform the information processing method. The information processing device includes: a wireless communication unit configured to interchange a stream for outputting image information from a first information processing device by using wireless communication, the first information processing device belonging to a first group to which one or more information processing devices including the own device belong; and a control unit configured to perform control such that capability information regarding the one or more information processing devices is exchanged with a second information processing device belonging to a second group which is a new group other than the first group when the second group is formed. Accordingly, it is possible to obtain an operational effect in which the capability information regarding the one or more information processing devices is exchanged with the second information processing devices belong to the second group when the second group is formed.

In addition, according to the first aspect, the control unit may perform control such that a process of exchanging a request and a response with the second information processing device is performed, the request and the response including information regarding a usable frequency channel or data transmission band. Accordingly, it is possible to obtain an operational effect of performing the process of exchanging the request and the response including the information regarding the usable frequency channel or the data transmission band with the second information processing device.

In addition, according to the first aspect, the control unit may perform control such that a group changing request including predetermined band information is transmitted to the second information processing device before the process of exchanging the request and the response when the second group is formed. Accordingly, it is possible to obtain an operational effect in which the group changing request including the predetermined band information is transmitted to the second information processing device, earlier than the process of exchanging the request and the response when the second group is formed.

In addition, according to the first aspect, the control unit may perform control such that the process of exchanging the request and the response is realized through provision discovery. Accordingly, it is possible to obtain an operational effect in which the process of exchanging the request and the response is realized through the provision discovery.

In addition, according to the first aspect, the second information processing device may form the second group on the basis of the capability information regarding the one or more information processing devices. Accordingly, it is possible to obtain an operational effect in which the second information processing device forms the second group on the basis of the capability information regarding the one or more information processing devices.

In addition, according to the first aspect, the control unit may perform control such that the second group is formed on the basis of a way of using the first information processing device. Accordingly, it is possible to obtain an operational effect in which the second group is formed on the basis of use of the first information processing device.

In addition, according to the first aspect, the control unit may perform control such that state information indicating a role of each of the information processing devices belonging to the first group and limit information regarding a limit of each of the information processing devices are interchanged between the information processing devices belonging to the first group, the information being used at time of deciding a role of the second group. Accordingly, it is possible to obtain an operational effect in which the state information and the limit information are interchanged between the information processing devices belonging to the first group.

In addition, according to the first aspect, the control unit may perform control such that the second information processing device is notified of information regarding a usable frequency and a transmission speed recommended to the second group on the basis of at least one of a display form of the first information processing device and a way of using the first information processing device. Accordingly, it is possible to obtain an operational effect in which the second information processing device is notified of the information regarding the usable frequency and the transmission speed recommended to the second group on the basis of at least one of the display form of the first information processing device and the use of the first information processing device.

In addition, according to the first aspect, the first information processing device may manage device management information of each of the information processing devices belonging to the first group. Accordingly, it is possible to obtain an operational effect in which the first information processing device manages device management information of each of the information processing devices belonging to the first group.

In addition, according to the first aspect, the first information processing device may decide a group owner of the second group and a client of the second group so that at least one client belonging to the first group serves as the second information processing device, and the first information processing device may notify each of the information processing devices belonging to the second group of content of the decision. Accordingly, it is possible to obtain an operational effect in which the first information processing device decides a group owner of the second group and a client of the second group so that at least one client belonging to the first group serves as the second information processing device, and notifies each of the information processing devices belonging to the second group of content of the decision.

In addition, according to the first aspect, the group owner of the second group may form the second group by performing an invitation process on each information processing device to be a client of the second group. Accordingly, it is possible to obtain an operational effect in which the group owner of the second group forms the second group by performing the invitation process on each information processing device serving as the client of the second group.

In addition, according to the first aspect, the group owner of the second group may form the second group by performing a provision discovery process on the basis of information received from an information processing device to be a client of the second group. Accordingly, it is possible to obtain an operational effect in which the group owner of the second group forms the second group by performing a provision discovery process on the basis of information received from an information processing device serving as a client of the second group.

In addition, according to the first aspect, the first information processing device may notify an information processing device that newly participates in the first group of device management information managed by the first information processing device and causes the information processing device to set a mode for participation in the first group. Accordingly, it is possible to obtain an operational effect in which the first information processing device notifies the information processing device newly participating in the first group of device management information managed by the first information processing device to set the mode for participation in the first group.

In addition, according to the first aspect, the control unit may perform control such that the second group is formed by setting a group owner of the second group and a client of the second group via the first group. Accordingly, it is possible to obtain an operational effect in which the second group is formed by setting the group owner of the second group and the client of the second group via the first group.

In addition, according to the first aspect, the control unit may perform control such that the capability information necessary to form the second group is transmitted to each of the information processing devices that are to belong to the second group. Accordingly, it is possible to obtain an operational effect in which the capability information necessary to form the second group is transmitted to each of the information processing devices belonging to the second group.

In addition, according to the first aspect, when the first information processing device does not have a concurrent function, the first information processing device may transmit the capability information managed by the first information processing device to the second information processing device for disconnection from the first group. Accordingly, it is possible to obtain an operational effect in which the first information processing device transmits the capability information managed by the first information processing device to the second information processing device for disconnection from the first group when the first information processing device has no concurrent function.

In addition, according to the first aspect, the capability information may include at least one of information regarding a frequency to be used, information regarding a transmission rate to be used, and information regarding whether there is a concurrent function. Accordingly, it is possible to obtain an operational effect in which at least one of the information regarding the frequency to be used, the information regarding the transmission rate to be used, and the information regarding whether there is the concurrent function is notified of as the capability information.

Advantageous Effects of Invention

According to the present technology, it is possible to obtain an excellent advantageous effect of performing a process related to group formation rapidly. It is not necessarily limited to the effect described herein, and any effect described in the present disclosure may be included.

BRIEF DESCRIPTION OF DRAWINGS

FIG. 4 is a diagram schematically illustrating a content example retained in a management information retention unit 390 according to the first embodiment of the present technology.

FIGS. 18a and 18b are diagrams illustrating a transition example of a group formed by information processing devices included in the communication system 640 according to the second embodiment of the present technology.

FIG. 19 is a sequence chart illustrating a communication process example between devices included in the communication system 640 according to the second embodiment of the present technology.

FIG. 21 is a sequence chart illustrating a communication process example between devices included in the communication system 640 according to the second embodiment of the present technology.

FIG. 22 is a sequence chart illustrating a communication process example between devices included in the communication system 640 according to the second embodiment of the present technology.

FIG. 23 a diagram illustrating an example of a frame format interchanged between devices included in the communication system 640 according to the second embodiment of the present technology.

FIG. 24 a diagram illustrating an example of a frame format interchanged between devices included in the communication system 640 according to the second embodiment of the present technology.

FIG. 25 a diagram illustrating an example of a frame format interchanged between devices included in the communication system 640 according to the second embodiment of the present technology.

FIG. 26 a diagram illustrating an example of a frame format interchanged between devices included in the communication system 640 according to the second embodiment of the present technology.

FIGS. 28a and 28b is a are diagrams schematically illustrating a transition example of retained content of a device management list 850 according to the second embodiment of the present technology.

MODE(S) FOR CARRYING OUT THE INVENTION

Figure 1:
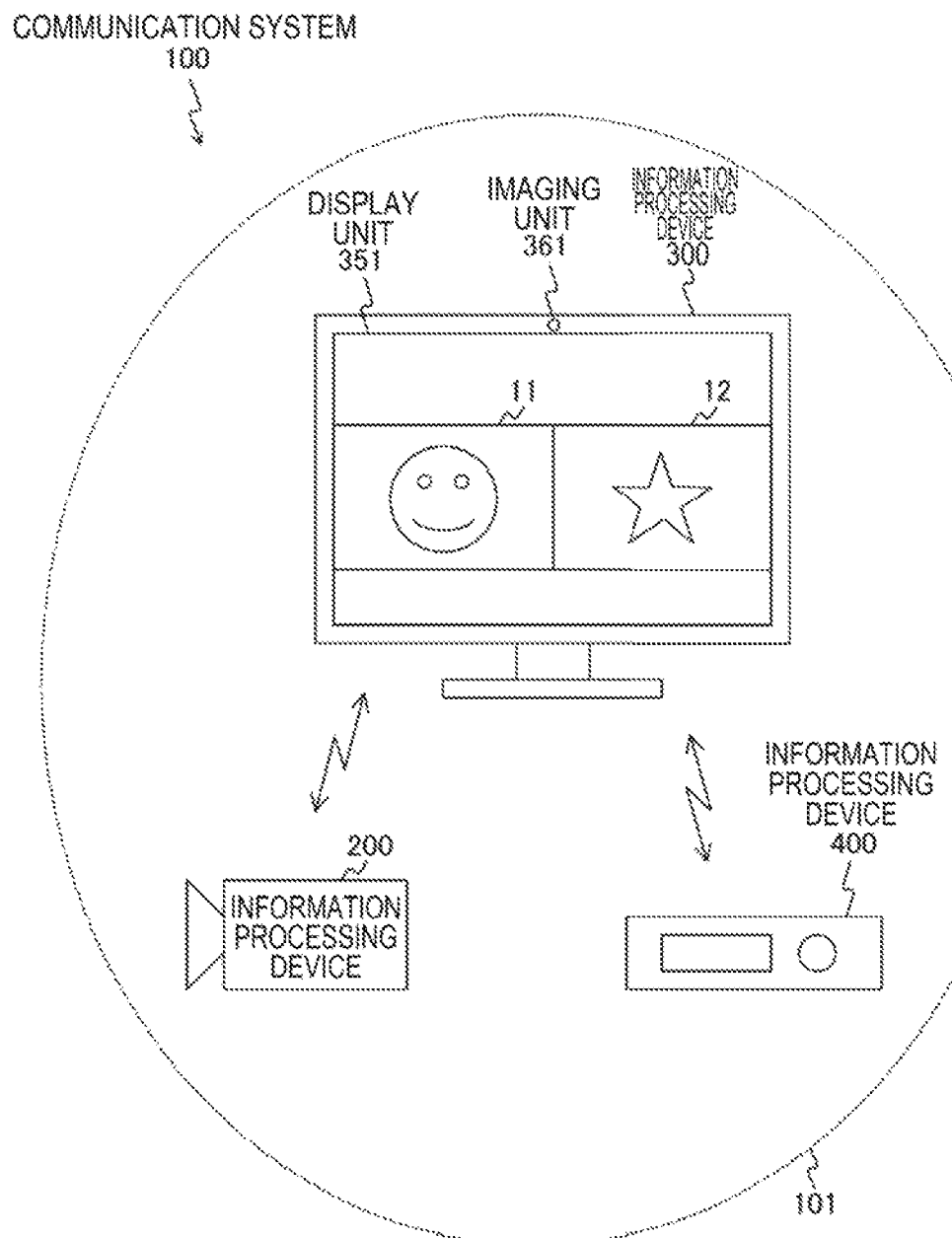
FIG. 1 is a block diagram illustrating a system configuration example of a communication system 100 according to a first embodiment of the present technology.

Hereinafter, modes (hereinafter, "embodiments") for carrying out the present technology will be described. The description will proceed in the following order:
1. First embodiment (example of controlling wireless communication on the basis of user information or management information)
2. Second embodiment (example in which multi-sink is set under multi-source environment)
3. Application examples
<1. First Embodiment>
[Configuration Example of Communication System]
FIG. 1 is a block diagram illustrating a system configuration example of a communication system 100 according to a first embodiment of the present technology. FIG. 1 illustrates an example of a communication system in which wireless connection can be performed through peer-to-peer (P2P) direct communication.

The communication system 100 includes information processing devices 200, 300, and 400. The communication system 100 is a communication system in which the information processing device 300 receives data (for example, image data or audio data) transmitted from at least one of the information processing devices 200 and 400.

The information processing devices 200, 300, and 400 are transmission and reception devices that have a wireless communication function. The information processing devices 200, 300, and 400 are, for example, display devices (for example, personal computers) or portable information processing devices (for example, smartphones or tablet terminals) that have a wireless communication function. The information processing devices 200, 300, and 400 are, for example, information processing devices that conform to Institute of Electrical and Electronics Engineers (IEEE) 802.11, 802.15, or 802.16, 3rd Generation Partnership Project (3GPP) specification (for example, Wideband Code Division Multiple Access (W-CDMA)), Global system for Mobile Communications (GSM: registered trademark), Worldwide Interoperability for Microwave Access (Wi-MAX), WiMAX2, Long Term Evolution (LTE), LTE-A (Advanced), or the like. The information processing devices 200, 300, and 400 can interchange various kinds of information using the wireless communication function.

Here, an example of a case in which wireless communication using wireless Local Area Network (LAN) is performed between the information processing devices 200 and 300 or between the information processing devices 400 and 300 will be described.

As the wireless LAN, for example, Wireless Fidelity (Wi-Fi) Direct, Tunneled Direct Link Setup (TDLS), an ad-hoc network, or a mesh network can be used. As short-range wireless audio visual (AV) transmission communication used in the communication system 100, for example, Wi-Fi Certified Miracast (technical specification title: Wi-Fi Display) can be used. Wi-Fi Certified Miracast is a mirroring technology for transmitting an audio or a display image reproduced with one terminal to another terminal using the technology of Wi-Fi Direct or TDLS and outputting the audio or image data similarly with the other terminal.

In Wi-Fi Certified Miracast, user Input Back Channel (UIBC) is realized on Transmission Control Protocol/Internet Protocol (TCP/IP). UIBC is a technology for transmitting manipulation information of an input device such as a mouse or a keyboard from one terminal to another terminal. Instead of Wi-Fi Certified Miracast, another remote desktop software (for example, Virtual Network Computing (VNC)) may be applied.

Here, in Wi-Fi Certified Miracast, for example, it is established that an image (video) is compressed and decompressed using H.264. For example, in Wi-Fi Certified Miracast, H.264 can be adjusted on a transmission side. An embodiment of the present technology is not limited to H.264, but can also correspond to various codecs such as H.265 (for example, high efficiency video coding (HEVC) and scalable video coding extensions of high efficiency video coding (SHVC)) and Moving Picture Experts Group (MPEG4), Joint Photographic Experts Group (JPEG) 2000. Further, it can also correspond to a line-based codec in which one or more lines are bundled and compressed or two or more lines are divided into 2×2 or more macro blocks to be compressed and decompressed. For example, by obtaining a difference with a previous code amount region of a specific code amount region (such as a picture, a bundle of a plurality of lines, or a macro block), it is possible to correspond to a codec that reduces a transmission rate without performing compression such as DCT or Wavelet. Further, an image (video) may be transmitted or received with non-compression.

In the first embodiment of the present technology, an example in which the information processing device 200 sets image data and audio data generated through an imaging operation as a transmission target will be described. In the first embodiment of the present technology, an example in which the information processing device 400 sets content (for example, content formed by image data and audio data) stored in a storage unit (for example, a hard disk) as a transmission target. An electronic device (for example, a PC, a game device, a smartphone, or a tablet terminal) on which a camera is mounted as the information processing device 200 may be used. Another electronic device (for example, an imaging device, a game device, a smartphone, or a tablet terminal) that includes a display unit as the information processing device 300 may be used. If the information processing device 400 has a tethering function, the information processing device 400 may acquire content stored in an internet services provider (IPS) via wireless or wired network and set the content as a transmission target.

For example, image data generated through an imaging operation of the information processing device 200 is transmitted to the information processing device 300 and an image 11 based on the image data is displayed on a display unit 351 of the information processing device 300. Further, content stored in a storage unit (for example, a hard disk) of the information processing device 400 is transmitted to the information processing device 300 and an image 12 based on this content is displayed on the display unit 351 of the information processing device 300.

In this way, in the first embodiment of the present technology, an example in which the information processing devices 200 and 400 serve as source side information processing devices (source devices) and the information processing device 300 serves as a sink side information processing device (sink device) will be described.

In FIG. 1, a range in which the information processing device 300 can perform direct communication via peer to peer (P2P) direct connection using wireless communication is indicated as an information conveyance range 101. The information conveyance range 101 is an information conveyance range (a service range) based on the information processing device 300.

[Configuration Example of Information Processing Device (Source Device)]

Figure 2:
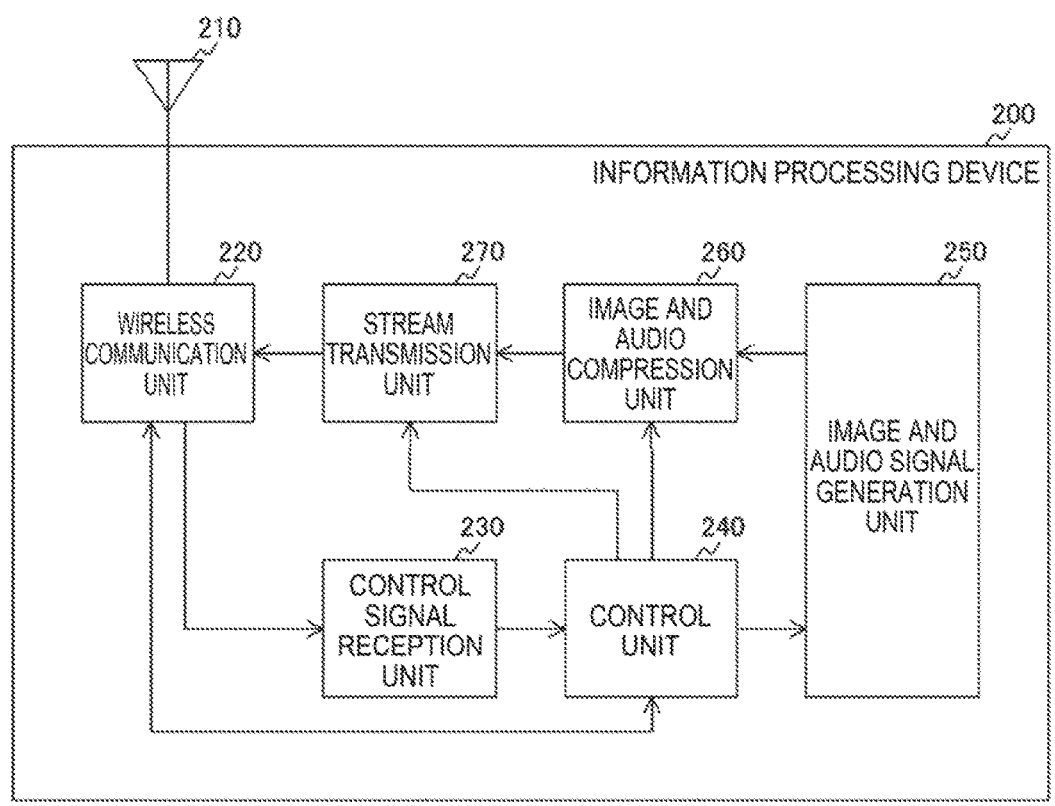
FIG. 2 is a block diagram illustrating a functional configuration example of an information processing device 200 according to the first embodiment of the present technology.

FIG. 2 is a block diagram illustrating a functional configuration example of the information processing device 200 according to the first embodiment of the present technology. The functional configuration of the information processing device 400 related to wireless communication is substantially the same as that of the information processing device 200. Therefore, in the first embodiment of the present technology, only the information processing device 200 will be described and the description of the information processing device 400 will be omitted.

The information processing device 200 includes an antenna 210, a wireless communication unit 220, a control signal reception unit 230, a control unit 240, an image and audio signal generation unit 250, an image and audio compression unit 260, and a stream transmission unit 270.

The wireless communication unit 220 transmits and receives each piece of information (for example, image data and audio data) to and from another information processing device (for example, the information processing device 300) via the antenna 210 using wireless communication under the control of the control unit 240. For example, when an image data transmission process is performed, the image data generated by the image and audio signal generation unit 250 is compressed by the image and audio compression unit 260 and the compressed image data (image stream) is transmitted from the antenna 210 via the wireless communication unit 220.

The wireless communication unit 220 is assumed to be able to transmit and receive each piece of information to and from another information processing device (for example, the information processing device 300) using a plurality of frequency channels. In the first embodiment of the present technology, an example in which the wireless communication unit 220 has a function of transmitting and receiving three kinds of frequency channels, 2.4 GHz, 5 GHz, and 60 GHz will be described. In this way, when the source device has the function of transmitting and receiving the plurality of frequency channels, a sink device (for example, the information processing device 300) can control a frequency channel to be used by each source device.

The control signal reception unit 230 acquires a control signal (for example, information interchanged with the information processing device 300) transmitted from another information processing device (for example, the information processing device 300) among the pieces of information received by the wireless communication unit 220. Then the control signal reception unit 230 outputs the acquired control signal to the control unit 240.

The control unit 240 performs control on each piece of information to be transmitted from the information processing device 200. For example, the control unit 240 performs control on the image and audio signal generation unit 250 and the image and audio compression unit 260 on the basis of the control signal received by the control signal reception unit 230. For example, the control unit 240 performs control such that the number of channels of audio or the resolution of image data which is a transmission target is changed or performs control such that an image region of the image data which is a transmission target is changed. That is, the control unit 240 performs transmission control of a stream which is a transmission target on the basis of the control signal received by the control signal reception unit 230. The transmission control of the stream is, for example, for example, data transmission speed control, setting control of multi-reception diversity, or setting control of content protection.

The control unit 240 may have a function of measuring a radio wave propagation situation (link radio wave propagation situation) when data is transmitted to and received from the sink device using the wireless communication and may transmit a measurement result (radio wave propagation measurement information) to the sink device.

Here, the radio wave propagation measurement information is, for example, information used to determine whether line quality with the sink device is quality with which the image data and the audio data can be transmitted and received. The radio wave propagation measurement information is used, for example, when stream transmission control is performed. The radio wave propagation measurement information will be described in detail with reference to FIG. 4. Instead of the radio wave propagation measurement information, the control unit 240 may count the number of retransmissions of the same packet and perform the stream transmission control on the basis of the counted number of retransmissions.

Here, the data transmission speed mainly means an occupancy ratio to a communication line and is assumed to include a meaning of a communication speed or a communication capacity. For example, the resolution is defined as an index of image quality configured to include a component such as an image frame (the number of vertical and horizontal pixels) of the image data, or a bit rate (compression ratio) of the image data. As the index of the quality, the throughput of a stream can be used. The number of channels of audio is assumed to include a meaning of an audio recording and reproducing method such as a monaural (1.0 ch), a stereo (2.0 ch), 5.1 ch, 9.1 ch, or high-resolution audio. The number of channels of audio is defined as an index of audio quality configured to include a component such as a bit rate (compression ratio) of audio data or the number of channels. As the index of the audio quality, the throughput of a stream can be used.

The control unit 240 performs control such that a state unstable in the data rate control is improved. For example, the control unit 240 comprehends system performance information of a sink device (for example, the information processing device 300) by interchanging information with the sink device. Here, the system performance information is, for example, performance information regarding the system of the sink device. For example, the system performance information is a usable frequency channel, a resolution, Transmission Control Protocol (TCP), and User Datagram Protocol (UDP). The system performance information is, for example, information indicating each of correspondence of an encryption method, correspondence of standard definition (SD)/high definition (HD), and correspondence of a low power consumption mode. For example, the control unit 240 can select a method for the stream transmission control (for example, the data transmission speed control) to further improve the entire system stability of the communication system 100 in accordance with whether the sink device corresponds to the lower power consumption mode.

For example, the control unit 240 is assumed to insert information regarding whether the information processing device 200 is a mobile device during interchange of information with the information processing device 300. For example, capability information regarding the information processing device 200 can include information regarding whether the information processing device 200 is a mobile device. When it is comprehended that the information processing device 200 is the mobile device, the information processing device 300 can determine that it is not necessary to operate the information processing device 200 on the basis of association with other connected information processing devices. In this way, when it is determined that it is not necessary to operate the information processing device 200, the information processing device 200 receives a transmission stop command from the information processing device 300. When the control unit 240 comprehends the transmission stop command, the control unit 240 can be powered down the function of each of the image and audio signal generation unit 250, the image and audio compression unit 260, and the stream transmission unit 270 for a given time. The control unit 240 can transition the wireless communication unit 220 to intermittent reception (which is a mode in which the wireless communication unit 220 rises up periodically so that the wireless communication unit 220 can receive a command from the information processing device 300 and the device is powered down in other cases).

The image and audio signal generation unit 250 generates data (image data and audio data) which is an output target under the control of the control unit 240 and outputs the generated data to the image and audio compression unit 260. For example, the image and audio signal generation unit 250 includes an imaging unit (not illustrated) and an audio acquisition unit (not illustrated). The imaging unit (for example, a lens, an image sensor, or a signal processing circuit) images a subject and generates an image (image data). The audio acquisition unit (for example, a microphone) acquires a surrounding audio when the image data is generated. The data generated in this way is a transmission target to be transmitted to another information processing device (for example, the information processing device 300).

The image and audio compression unit 260 compresses (encodes) the data (the image data and the audio data) generated by the image and audio signal generation unit 250 under the control of the control unit 240. Then, the image and audio compression unit 260 outputs the compressed data (the image data and the audio data) to the stream transmission unit 270. In this case, on the basis of whether a source device or a sink device is a mobile device, the control unit 240 may determine whether the image and audio compression unit 260 compresses or does not compress data. That is, on the basis of whether the source device or the sink device is a mobile device, the control unit 240 may determine whether the compressed data is transmitted without performing transcoding. For example, the image and audio compression unit 260 can output data generated by the image and audio signal generation unit 250 without being compressed when the source device is not a mobile device. The image and audio compression unit 260 may be realized by performing the encoding by software or may be realized by performing the encoding by hardware. The image and audio compression unit 260 is assumed to function as a codec, but is assumed to be able to handle an uncompressed image or audio. Further, the image and audio compression unit 260 can also function as a scalable codec. Here, the scalable codec means, for example, a codec which can be applied freely in accordance with the resolution of a reception side information processing device (sink device), a network environment, or the like.

The stream transmission unit 270 performs a transmission process of transmitting the data (the image data and the audio data) compressed by the image and audio compression unit 260 as a stream from the antenna 210 via the wireless communication unit 220 under the control of the control unit 240.

The information processing device 200 can include a display unit, an audio output unit, and a manipulation reception unit in addition to the above-described units, but these units are not illustrated in FIG. 2. The example in which the information processing device 200 generates the image data and the audio data which are the transmission targets has been described. However, the information processing device 200 may acquire image data and audio data which are transmission targets from an external device. For example, the information processing device 200 may acquire image data and audio data which are transmission targets from a web camera equipped with a microphone. The information processing device 200 may set content (for example, content formed by image data and audio data) stored in a storage device (for example, a hard disk) as a transmission target irrespective of the inside or outside of the information processing device 200. In this case, the content stored in the storage device is also assumed to be compressed content. In this case, when the compressed content is compressed in accordance with an encoding scheme defined in a standard adopted in the communication system 100, the compressed content may be transmitted without being decrypted (decoded).

A display unit (not illustrated) of the information processing device 200 is, for example, a display unit that displays an image generated by the image and audio signal generation unit 250. As the display unit, various types of display panels can be used. For example, an electro-luminescence (EL) or crystal light-emitting diode (LED) display or a liquid crystal display (LCD) can be used.

An audio output unit (not illustrated) of the information processing device 200 is, for example, an audio output unit (for example, a speaker) that outputs an audio generated by the image and audio signal generation unit 250. An image can be output from both of a transmission device and a reception device, but an audio is preferably output from only one of the transmission device and the reception device.

A manipulation reception unit (not illustrated) of the information processing device 200 is a manipulation reception unit that receives a manipulation input performed by a user and is, for example, a keyboard, a mouse, a game pad, a touch panel, a camera, or a microphone. The manipulation reception unit and the display unit can be integrally configured using a touch panel capable of performing a manipulation input when the user touches or approaches a display surface with his or her finger.

[Configuration Example of Information Processing Device (Sink Side)]

Figure 3:
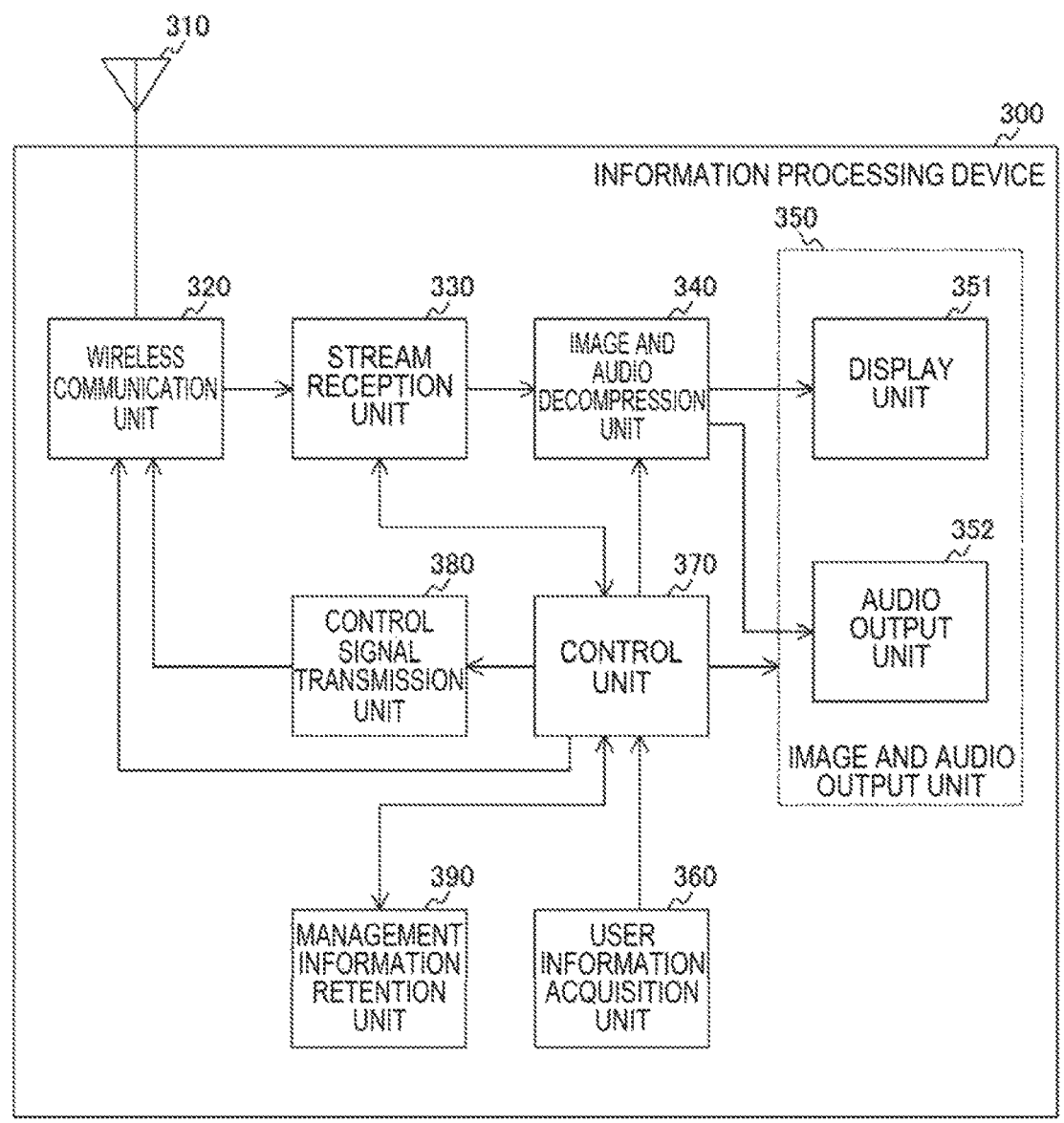
FIG. 3 is a block diagram illustrating a functional configuration example of an information processing device 300 according to the first embodiment of the present technology.

FIG. 3 is a block diagram illustrating a functional configuration example of the information processing device 300 according to the first embodiment of the present technology.

The information processing device 300 includes an antenna 310, a wireless communication unit 320, a stream reception unit 330, an image and audio decompression unit 340, an image and audio output unit 350, a user information acquisition unit 360, a control unit 370, a control signal transmission unit 380, and a management information retention unit 390.

The wireless communication unit 320 transmits and receives each piece of information (for example, image data and audio data) to and from another information processing device (for example, the information processing device 200) via the antenna 310 using wireless communication under the control of the control unit 370. For example, when an image data reception process is performed, the image data received by the antenna 310 is decompressed (decoded) by the image and audio decompression unit 340 via the wireless communication unit 320 and the stream reception unit 330. Then, the decompressed image data is supplied to the image and audio output unit 350 and an image corresponding to the decompressed image data is output from the image and audio output unit 350. That is, the image corresponding to the decompressed image data is displayed on a display unit 351.

The wireless communication unit 320 is assumed to be able to transmit and receive each piece of information to and from another information processing device (for example, the information processing device 200) using a plurality of frequency channels. In the first embodiment of the present technology, an example in which the wireless communication unit 320 has a function of transmitting and receiving three kinds of frequency channels, 2.4 GHz, 5 GHz, and 60 GHz will be described. That is, the wireless communication unit 320 can perform communication using a first frequency band and communication using a second frequency band of a higher data transmission speed than the first frequency band. The control unit 370 controls a frequency channel to be used among a plurality of frequency channels in wireless communication with each source device.

Link between the information processing devices 200 and 300 and link between the information processing devices 400 and 300 may be established with the same frequency channel or may be established with different frequency channels.

In the first embodiment of the present technology, an example in which the wireless communication unit 320 has the function of transmitting and receiving three kinds of frequency channels, 2.4 GHz, 5 GHz, and 60 GHz will be described, but an embodiment of the present technology is not limited thereto. For example, the wireless communication unit 320 may have a function of transmitting and receiving other frequency channels, two frequency channels, four or more frequency channels.

The stream reception unit 330 receives streams (for example, an image stream and an audio stream) and interchange information with each source device among the pieces of information received by the wireless communication unit 320 under the control of the control unit 370. Then, the stream reception unit 330 outputs the received command information to the control unit 370 and outputs the received streams to the image and audio decompression unit 340 and the control unit 370.

Here, the interchange information with each source device is information transmitted from a source device (for example, the information processing device 200) and includes, for example, a request for acquiring system performance information of the information processing device 300. The system performance information is, for example, information indicating a usable frequency channel, a resolution, TCP, and UDP or each of correspondence of an encryption method, correspondence of SD/HD, and correspondence of a low power consumption mode.

The stream reception unit 330 has a function of measuring a radio wave propagation situation (link radio wave propagation situation) when data is transmitted to and received from a sink device using the wireless communication. The stream reception unit 330 outputs a measurement result (radio wave propagation measurement information) to the control unit 370. The radio wave propagation measurement information will be described in detail with reference to FIG. 4.

The image and audio decompression unit 340 decompresses (decodes) the streams (image data and the audio data) transmitted from another information processing device (for example, the information processing device 200) under the control of the control unit 370. Then, the image and audio decompression unit 340 outputs the decompressed data (the image data and the audio data) to the image and audio output unit 350. The image and audio decompression unit 340 may be realized by performing the decoding by software or may be realized by performing the decoding by hardware. The image and audio decompression unit 340 is assumed to function as a codec, but is assumed to be able to handle an uncompressed image or audio. Further, the image and audio decompression unit 340 can also function as a scalable codec.

The image and audio output unit 350 includes a display unit 351 and an audio output unit 352.

The display unit 351 is a display unit that displays each image (for example, the images 11 and 12 illustrated in FIG. 1) based on the image data decompressed by the image and audio decompression unit 340. As the display unit 351, for example, a display panel such as an organic EL panel, a crystal LED display, an LCD panel can be used. As the display unit 351, a touch panel capable of performing a manipulation input when a user touches or approaches a display surface with his or her finger may be used.

The audio output unit 352 is an audio output unit (for example, a speaker) that outputs various audios (an audio and the like related to an image displayed on the display unit 351) based on the audio data decompressed by the image and audio decompression unit 340. Here, as an audio output method, for example, a method of reproducing only an audio of a source device allocated to a middle channel (a main image) from a speaker and reproducing no audio of a source device allocated to a peripheral channel (a sub-image) can be used. As another audio output method, for example, a method of setting the volume of an audio of a source device allocated to the middle channel as a main and lowering the volume of an audio of a source device allocated to the peripheral channel and reproducing the audio can be used. Other audio output methods may be used.

The user information acquisition unit 360 acquires information regarding a user (user information) and outputs the acquired user information to the control unit 370. For example, the user information acquisition unit 360 can acquire the user information by receiving an input from a manipulation reception unit (a keyboard, a mouse, a remote controller, a game pad, or a touch panel) for which the user can directly set a display method. The manipulation reception unit is, for example, a manipulation member that designates any region in an image displayed on the display unit 351. For example, the user information acquisition unit 360 can acquire the user information by receiving an input from a device which can comprehend a user's intention, such as a camera, a microphone, or any of various sensors (for example, gyro sensors and sensors detecting human bodies).

For example, the user information acquisition unit 360 acquires the user information generated through a user motion when information based on the stream received from another information processing device (for example, the information processing device 200) using the wireless communication is output from the image and audio output unit 350. The user information is, for example, user information generated through a user motion related to an image displayed on the display unit 351. For example, the user information is information generated on the basis of a user manipulation related to the image displayed on the display unit 351.

For example, the user information acquisition unit 360 can acquire image data generated by the imaging unit 361 (illustrated in FIG. 1) and generate user information. In addition, for example, the user information acquisition unit 360 may acquire information (for example, positional information or identification information) acquired by an external device (for example, each sensor or a wearable device) and generate user information.

The control unit 370 causes the management information retention unit 390 to retain each piece of information acquired by the stream reception unit 330 and manages each source device on the basis of management information retained the management information retention unit 390. The control unit 370 performs the stream transmission control so that stability is improved for streams transmitted from a plurality of source devices in the entire system.

For example, the control unit 370 performs the stream transmission control on the basis of the user information acquired by the user information acquisition unit 360 and the management information retained in the management information retention unit 390. For example, data transmission speed control, scalability transmission rate control, setting control of multi-reception diversity, or setting control of content protection is performed. Specifically, the control unit 370 generates a control signal for each source device to perform the stream transmission control (for example, the data transmission speed control and the scalability transmission rate control) on the basis of the management information retained in the management information retention unit 390 and outputs the generated control signal to the control signal transmission unit 380. For example, the control unit 370 changes the resolution of an image displayed on the display unit 351 on the basis of the user information and the management information and generates a control signal to request a transmission rate equivalent to the resolution to each source device. For example, the control unit 370 generates a control signal to change a display region of an image on the display unit 351 on the basis of the user information and the management information. For example, the control unit 370 generates a control signal to change the size of an image on the display unit 351 on the basis of the user information and the management information.

The control unit 370 performs control such that a frequency channel and a resolution to be used are set on the basis of the user information and the management information. For example, the control unit 370 sets a frequency channel to be used for each source device in the plurality of frequency channels of the wireless communication unit 320. When the power consumption mode is different from each frequency channel, the control unit 370 comprehends each mode and sets the frequency channel for caring the power consumption of a mobile device. That is, the control unit 370 can separately set a first power consumption mode related to the first frequency band and a second power consumption mode related to the second frequency band of a higher data transmission speed than the first frequency band.

The control signal transmission unit 380 performs a transmission process of transmitting the control signal output from the control unit 370 to another information processing device via the wireless communication unit 320 and the antenna 310.

The management information retention unit 390 is a table that retains information (management information) to manage each source device connected to the information processing device 300 using the wireless communication. Content retained in the management information retention unit 390 will be described in detail with reference to FIG. 4.

[Content Example Retained in Management Information Retention Unit]

FIG. 4 is a diagram schematically illustrating a content example retained in the management information retention unit 390 according to the first embodiment of the present technology.

The management information retention unit 390 is a table that retains information (management information) to manage each source device connected to the information processing device 300 using the wireless communication. For example, in the management information retention unit 390, terminal identification information 391, a frequency channel 392, a radio wave propagation measurement information 393, device information 394, a band use level 395, a display form 396, standby or wake-up 397, multi-reception diversity correspondence 398, a basic service 105, and concurrent presence or absence 106 are retained in association therewith.

In the terminal identification information 391, identification information is stored to identify the source devices connected to the information processing device 300 using the wireless communication.

In the frequency channel 392, a frequency channel actually used by the source device connected to the information processing device 300 using the wireless communication is stored.

In the radio wave propagation measurement information 393, radio wave propagation measurement information regarding the source device connected to the information processing device 300 using the wireless communication is stored. The radio wave propagation measurement information is measured by the stream reception unit 330 for each source device connected to the information processing device 300 using the wireless communication.

As the radio wave propagation measurement information 393, for example, a packet error rate (PER), a bit error rate (BER), the number of retransmissions of packets, and a throughput are stored. As the radio wave propagation measurement information 393, for example, frame drop, a signal to interference ratio (SIR), and a received signal strength indicator (RSSI) are stored. Here, instead of the SIR, a signal to interference plus noise ratio (SINR) may be used. The radio wave propagation measurement information 393 illustrated in FIG. 4 is an example. At least one piece of information among the pieces of information may be stored or another piece of radio wave propagation measurement information may be measured by the stream reception unit 330 to be stored. The radio wave propagation measurement information measured by the source device may be acquired and stored. Packet delay received by a reception side may be determined and information regarding the packet delay may be used as radio wave propagation measurement information. The packet delay serves as one index related to radio wave propagation since delay occurs in transmission to the reception side through a retransmission process in layer 2 at the time of occurrence of an error. The packet delay serves as, for example, an index indicating where link characteristics deteriorate in a wireless system in which a plurality of devices share wireless bands.

In the device information 394, classification of the source device (an attribute of the source device) connected to the information processing device 300 using the wireless communication is stored. For example, either of a mobile device and a stationary device is stored as the classification of the source device. Either of a device of which a power source is inserted and another device may be stored as the classification of the source device. Either of a battery-driven device and another device may be stored as the classification of the source device.

In the band use level 395, a band use level of the source device connected to the information processing device 300 using the wireless communication is stored. As the band use level, for example, a resolution or a throughput can be used. For example, in the band use level, a throughput during use may be stored, a pre-decided table may be prepared, and a number indicating correspondence of a range of the table may be stored and managed.

In the display form 396, a data display form (an output form) based on a stream transmitted from the source device connected to the information processing device 300 using the wireless communication is stored. For example, a display form (a main image (a middle channel) or a sub-image (a peripheral channel)) of the image data which is displayed on the display unit 351 and which is based on the stream transmitted from the source device is stored. For example, an output form (a main audio or a sub-audio) of the audio data which is output from the audio output unit 352 and which is based on the stream transmitted from the source device is stored. A format in which the sub-image (the peripheral channel) is not displayed may be realized in accordance with the display form.

In the standby or wake-up 397, a mode (a standby mode or a wake-up mode) of the source device connected to the information processing device 300 using the wireless communication is stored.

In the multi-reception diversity correspondence 398, information indicating whether the source device connected to the information processing device 300 using the wireless communication corresponds to the multi-reception diversity is stored. Also, multi-reception diversity will be described in detail in a third embodiment of the present technology.

In the basic service 105, a service to which a source device connected to the information processing device 300 using wireless communication corresponds is stored. As the service, for example, one of "capable of image transmission and reception" (capable of being both a source device and a sink device), "capable of only image transmission" (capable of being a source device), and "capable of only image reception" (capable of being a sink device is) is stored.

In the concurrent presence or absence 106, whether a source device connected to the information processing device 300 using wireless communication has a concurrent function (a time-division concurrent function or simultaneous use concurrent function) as a wireless LAN function is stored. The source device that has the concurrent function can perform time-division or simultaneous connection to both an access point and a sink device even when the source device does not perform disconnection switching of the access point and the sink device.

In this way, the management information retained in the management information retention unit 390 is information for associating the identification information (the terminal identification information 391) used to identify the other information processing device with the capability information regarding the other information processing device for management. The management information includes at least the information (the radio wave propagation measurement information 393) regarding the radio wave propagation measurement related to the communication with the other information processing device and the information (the standby or wake-up 397) regarding power consumption as the capability information regarding the other information processing device. The management information retained in the management information retention unit 390 includes the information (the display form 396) regarding a display form for displaying the image information as the capability information regarding the other information processing device. The information regarding the display form is, for example, information indicating that the image information is displayed as main information or sub-information.

[Transition Example of Image]

Figure 5A:
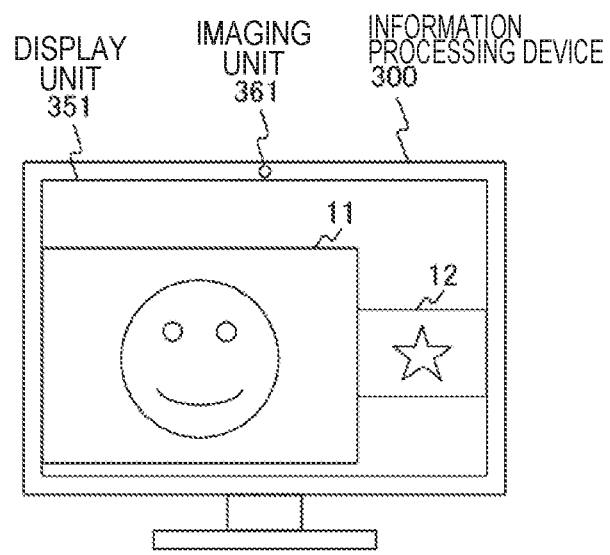
FIGS. 5a and 5b are diagrams illustrating a transition example of images displayed on a display unit 351 of the information processing device 300 according to the first embodiment of the present technology.
Figure 5B:
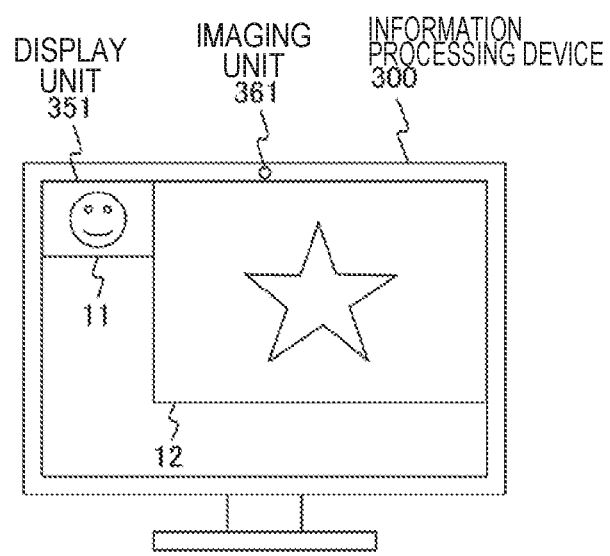

FIGS. 5a and 5b are diagrams illustrating a transition example of images displayed on the display unit 351 of the information processing device 300 according to the first embodiment of the present technology.

FIG. 5a illustrates an example of a display form in which the images 11 and 12 are displayed on the display unit 351 of the information processing device 300 so that the image 11 serves as a main image and the image 12 serves as a sub-image.

FIG. 5b illustrates an example of a display form in which the images 11 and 12 are displayed on the display unit 351 of the information processing device 300 so that the image 11 serves as a sub-image and the image 12 serves as a main image.

For example, a case in which each of the information processing devices 200 and 400 transmits a stream (the image data and the audio data) with a standard resolution to the information processing device 300 is assumed. In this case, as illustrated in FIG. 1, the image 11 based on the image data from the information processing device 200 and the image 12 based on the image data from the information processing device 400 can be displayed on the display unit 351 of the information processing device 300 so that the sizes of the images 11 and 12 are the same. In this example, a given resolution and a display region are defined to be the same, but a scaler function may be added to the display unit 351 so that the images 11 and 12 are rescaled and displayed on the display unit 351. However, in the embodiments of the present technology, to facilitate the description, this function is assumed not to be used in the description.

In the display forms of the images 11 and 12, for example, the display forms set at the time of the previous communication may be retained and the images 11 and 12 may be displayed on the display unit 351 of the information processing device 300 in accordance with the display forms.

The display forms of the images 11 and 12 may be decided on the basis of an order of connection to the information processing device 300. For example, a case in which the information processing device 200 is first connected to the information processing device 300 and the information processing device 400 is connected to the information processing device 300 after the connection is assumed. In this case, the images 11 and 12 are displayed on the display unit 351 of the information processing device 300 by setting the image 11 as the middle channel and setting the image 12 as the peripheral channel. That is, the images may be displayed in the procedure of the middle channel and the peripheral channel on the basis of the order of the connection to the information processing device 300.

As illustrated in FIG. 5a, when the images 11 and 12 are displayed on the display unit 351 by setting the image 11 as the middle channel and setting the image 12 as the peripheral channel, user information for setting the image 12 as the middle channel is assumed to be acquired by the user information acquisition unit 360. For example, when a viewer performs a manipulation of setting the image 12 as the middle channel using a pointer such as a remote controller or a gesture, the user information for setting the image 12 as the middle channel is acquired by the user information acquisition unit 360. In this case, as illustrated in FIG. 5b, the images 11 and 12 are displayed on the display unit 351 by setting the image 12 as the middle channel and setting the image 11 as the peripheral channel. Further, display positions of the images 11 and 12 on the display surface of the display unit 351 are decided on the basis of user information (for example, a manual manipulation or a line of sight) acquired by the user information acquisition unit 360.

[Communication Example]

Figure 6:
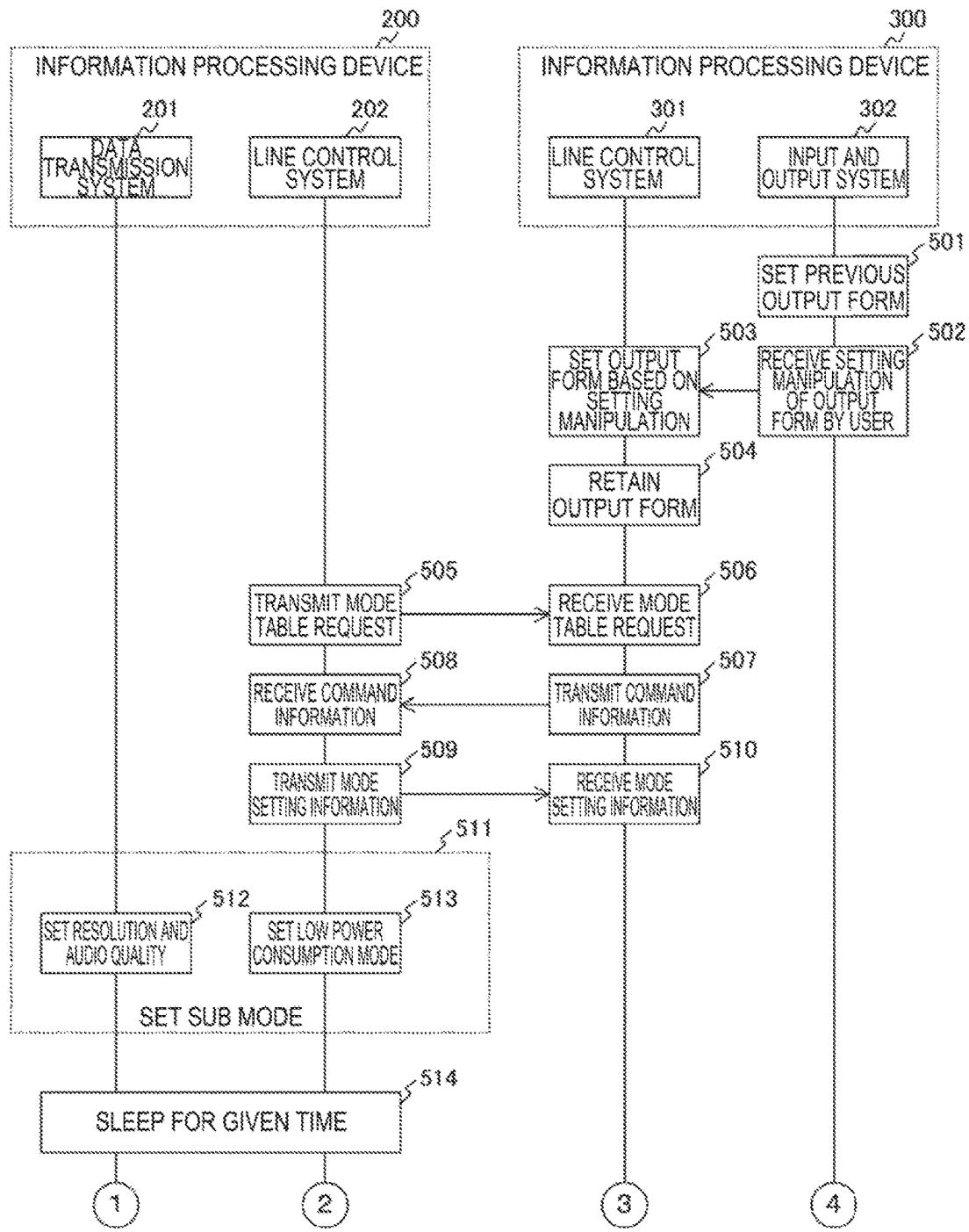
FIG. 6 is a sequence chart illustrating a communication process example between devices included in the communication system 100 according to the first embodiment of the present technology.
Figure 7:
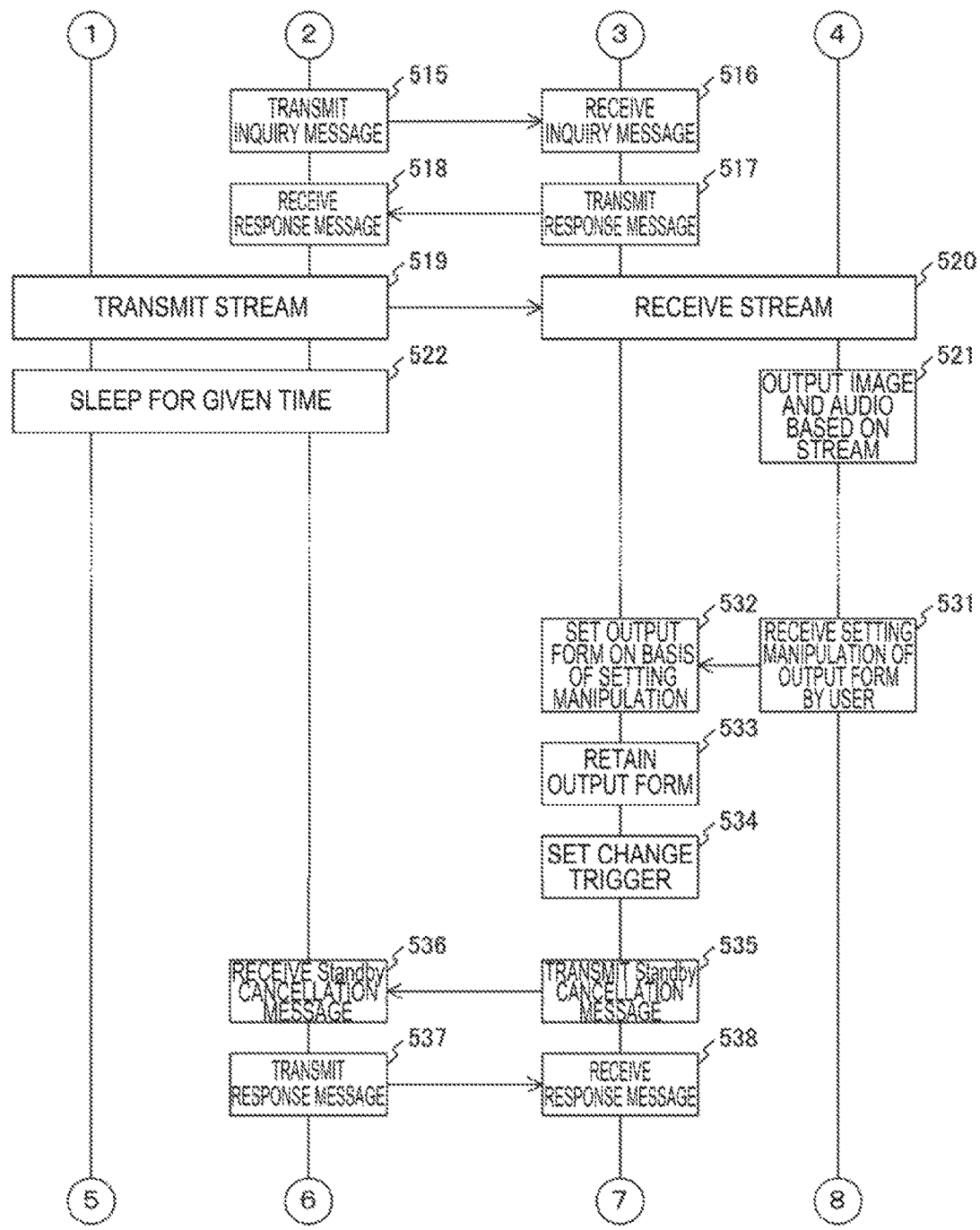
FIG. 7 is a sequence chart illustrating a communication process example between devices included in the communication system 100 according to the first embodiment of the present technology.
Figure 8:
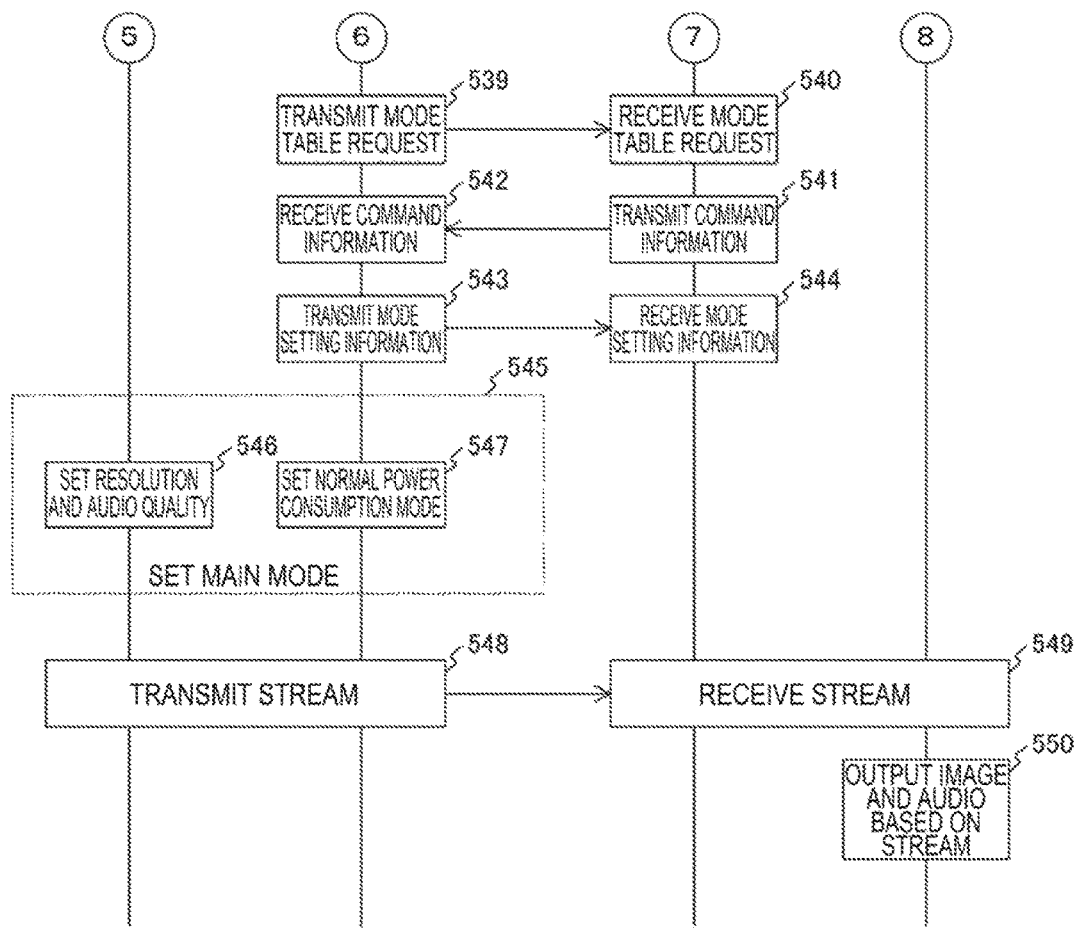
FIG. 8 is a sequence chart illustrating a communication process example between devices included in the communication system 100 according to the first embodiment of the present technology.

FIGS. 6 to 8 are sequence charts illustrating a communication process example between the devices included in the communication system 100 according to the first embodiment of the present technology. FIGS. 6 to 8 illustrate an example of a communication process between the information processing devices 200 and 300.

In FIGS. 6 to 8, the image and audio signal generation unit 250, the image and audio compression unit 260, and the stream transmission unit 270 among the units included in the information processing device 200 are illustrated as a data transmission system 201. The antenna 210, the wireless communication unit 220, the control signal reception unit 230, and the control unit 240 are illustrated as a line control system 202.

In FIGS. 6 to 8, the antenna 310, the wireless communication unit 320, the stream reception unit 330, the control unit 370, and the control signal transmission unit 380 in the configuration of the information processing device 300 are illustrated as a line control system 301. The image and audio decompression unit 340, the image and audio output unit 350, and the user information acquisition unit 360 are illustrated as an input and output system 302.

In FIGS. 6 to 8, first, an example in which an image based on the image data from the information processing device 200 is displayed as a sub-image on the display unit 351 of the information processing device 300 and a low power consumption mode is set in the information processing device 200 is illustrated. Subsequently, an example in which an image based on the image data from the information processing device 200 is displayed as a main image on the display unit 351 and a normal power consumption mode is set in the information processing device 200 is illustrated. That is, in FIGS. 6 to 8, a connection setup example of the information processing devices 200 and 300 and a transition example of the power consumption mode in the information processing device 200 are illustrated.

First, when the information processing device 300 is powered up, a previous display form (which is a display form when the information processing device 300 is powered down) is set as a display form (which is an image display form and an audio output form) of the information processing device 300 (501). The control unit 370 of the information processing device 300 causes the management information retention unit 390 to retain the management information of each source device connected to the information processing device 300 using the wireless communication (illustrated in FIG. 4). As illustrated in FIGS. 5a and 5b, the control unit 370 of the information processing device 300 causes the display unit 351 to display the images 11 and 12 corresponding to two streams respectively transmitted from the information processing devices 200 and 400 on the basis of the previous display form.

Subsequently, a case in which the user performs a manipulation of setting the display form (changing manipulation) is assumed (502). In this case, a control signal related to the setting manipulation is acquired as the user information by the user information acquisition unit 360 and the user information is output to the control unit 370. Then, the control unit 370 changes the content retained in the management information retention unit 390 (illustrated in FIG. 4) on the basis of the user information (503 and 504). For example, as illustrated in FIG. 5b, a case in which the setting manipulation (changing manipulation) is performed to set the image 11 based on the image data from the information processing device 200 as the sub-image is assumed. In this case, the control unit 370 changes the display form 396 (illustrated in FIG. 4) of the information processing device 200 in the management information retention unit 390 to "SUB" (503 and 504).

The information processing device 200 transmits a mode table request (an inquiry request of the resolution, the audio quality, the low power consumption mode, and the like) to the information processing device 300 periodically or aperiodically (also including only the start time) (505 and 506). The mode table request is a request for transmitting each piece of information (which is information used to communicate with the information processing device 200 with the management information regarding the information processing device 300 (for example, resolution information or the like which can be displayed by the information processing device 200)) managed in the information processing device 300.

When the information processing device 300 receives the mode table request (506), the information processing device 300 transmits command information corresponding to the mode table request (507 and 508). The command information is information regarding the information processing device 200 used for the information processing device 300 to give a setting demand to the information processing device 200 along with the radio wave propagation environment and the display form. For example, the command information is information that includes display form information (for example, a main image and a sub-image) of the resolution and the audio quality, whether to correspond to the low power consumption mode, a maker name, and presence or absence of a multi-reception diversity function. For example, the command information is information that includes the resolution and the audio quality, the kinds of image and audio codecs, presence of absence of a 3D function, presence or absence of the content protection, the display size of a display device, topology information, a usable protocol, setting information (port information or the like) of the protocol, connection interface information (the type of connector or the like), horizontal synchronization and vertical synchronization positions, performance priority request information of a source device, a mode control table response to whether to correspond to the low power consumption mode, a maximum transmission throughput or a receivable maximum throughput of wireless transmission, central processing unit (CPU) power, a battery remaining quantity, and power supply information. Each piece of information is included in a part of capability information. Here, the display form information of the resolution and the audio quality regarding the information processing device 200 is, for example, information indicating whether the display form of the data from the information processing device 200 is a main form or a sub-form. The information processing device 300 transmits the command information including a demand for the setting of the resolution and the audio quality or the low power consumption mode as a parameter from the viewpoint of the information processing device 300. Besides each piece of information regarding the information processing device 200, the information processing device 300 may transmit each piece of information regarding all the source devices as the command information. In this case, the information processing device 200 selects and uses only information dedicated for the own information processing device. When a device that conforms to Wi-Fi Certified Miracast, the device corresponds to wfd-audio-codecs, wfd-video-formats, wfd-content-protection, wfd-displayedid, wfd-coupledsink, wfd-client-rtpports, wfd-I2C, wfd-uibccapability, wfd-connectortype, wfd-sandby-resume-capability, and the like defined as RTSP Message, but message content to be transmitted is assumed not to be limited in these commands.

When the information processing device 200 receives the command information (508), the control unit 240 of the information processing device 200 specifies whether the display form of the data from the information processing device 200 is the main form or the sub-form on the basis of the command information. On the basis of the command information, the control unit 240 of the information processing device 200 determines whether the information processing device 300 has a function corresponding to a power consumption operation mode. Subsequently, the control unit 240 of the information processing device 200 transmits mode setting information indicating that the specified display form is set to the information processing device 300 (509 and 510). Here, the sub-form is assumed to be specified as the display form of the data from the information processing device 200. The information processing device 300 is assumed to have a function corresponding to the low power consumption mode. Accordingly, the control unit 240 of the information processing device 200 transmits mode setting information for notifying the information processing device 300 that the specified display form (sub-form) is set and the low power consumption mode is set, to the information processing device 300 (509 and 510).

In this example, the example in which the image is specified as the main image or the sub-image and the low power consumption mode is set on the basis of the command information has been described, but the low power consumption mode may be set without using the determination of the main image or the sub-image as a reference. For example, the low power consumption mode may be set by interchanging a permission flag indicating that the mode can transition to the low power consumption mode between the source and sink devices.

Subsequently, the control unit 240 of the information processing device 200 sets a sub mode as the transmission mode (511). Accordingly, in the data transmission system 201, a resolution to display the sub-image and audio quality to output sub-audio are to be set (512). In the line control system 202, the low power consumption mode is set (513).

Here, when the low power consumption mode is set in this way, both of the sink and source devices are assumed to have the function. For example, a mobile device (for example, a cellular phone, a smartphone, or a tablet terminal) is driven by a battery to operate in many cases. Therefore, when the display form of the data from the own information processing device is not the main form (when the display form is the sub-form), it is desirable to reduce battery consumption of the own information processing device as much as possible. Accordingly, in the source device in which the display form in the sink device is set to the sub-form, it is desirable to set the low power consumption mode. Further, in the setting process (512), only an audio of the source device allocated to the main image may be set to be reproduced from a speaker and the audio of the source device allocated to the sub-image may be set not to be reproduced. The volume of the audio of the source device allocated to the main image may be set as a main and the volume of the audio of the source device allocated to the sub-image may be set to be lowered and reproduced.

In this way, the control unit 370 of the information processing device 300 performs control such that the low power consumption mode in the information processing device 200 is set when the display form is set as the sub-image (sub-display). That is, the control unit 370 of the information processing device 300 performs control such that the power consumption mode is set in the information processing device 200 on the basis of the display form of the display unit 351 in which the image information is output on the basis of the stream.

When the low power consumption mode is set in this way (513), the control unit 240 of the information processing device 200 starts intermittent transmission (514 to 522).

Specifically, the information processing device 200 stops the transmission process only for a given time and sleeps each unit (514). Subsequently, when the given time passes (514), the information processing device 200 wakes up each unit of the information processing device 200 to perform the transmission process and performs the transmission process to the information processing device 300 (515 to 520).

For example, the control unit 240 of the information processing device 200 transmits an inquiry message for confirming whether any change is made in the information processing device 300 to the information processing device 300 (for example, a change in the display form) (515 and 516).

When the inquiry message is received (516), the control unit 370 of the information processing device 300 transmits a response message to the information processing device 200 to notify whether any change is made (for example, the change in the display form) (517 and 518). Here, it is assumed that no change is made in the information processing device 300 (for example, the change in the display form). Therefore, the control unit 370 of the information processing device 300 transmits a response message for notifying that no change is made (for example, the change in the display form) to the information processing device 200 (517 and 518).

When the response message indicating that no change is made (for example, the change in the display form) in this way (518), it is not necessary to change the setting in the information processing device 200. Therefore, the control unit 240 of the information processing device 200 transmits a stream for outputting the sub-image and the sub-audio to the information processing device 300 (519 and 520). When the information processing device 300 receives the stream in this way (520), the information processing device 300 outputs the image and the audio based on the received stream (521). For example, as illustrated in FIG. 5b, the image 11 based on the stream from the information processing device 200 is displayed as the sub-image on the display unit 351.

When the transmission process ends (519), the information processing device 200 stops the transmission process only for a given time and sleeps each unit (522). The intermittent transmission is continuously performed until a change request is given from the information processing device 300.

Here, in the intermittent transmission, a period in which the stream is not transmitted from the information processing device 200 occurs. Therefore, the information processing device 300 preferably performs a display process of interpolating and displaying the image corresponding to the stream finally received from the information processing device 200. However, the information processing device 300 is assumed not to have an interpolation process function either. In this case, during the sleep period, the image from the information processing device 200 may not be displayed on the display unit 351. Therefore, when the information processing device 300 does not have the interpolation process function, the image data from the information processing device 200 may be continuously transmitted. For example, in the stream which is a transmission target from the information processing device 200, the final image data at the time of the transmission stop is retained in a transmission buffer. During the sleep period, the image processing of the information processing device 200 is stopped, but the transmission process is continuously performed in a wireless link and the image data retained in the transmission buffer is continuously transmitted.

During the sleep period, only the image corresponding to the stream transmitted from the information processing device 400 may be displayed on the display unit 351. For example, the image corresponding to the stream transmitted from the information processing device 400 can be displayed on the entire surface of the display unit 351.

Next, an example of the case in which the user performs a manipulation of setting the display form (changing manipulation) will be described.

When the user performs the manipulation of setting the display form (changing manipulation) (531), as described above, the control unit 370 changes the content retained in the management information retention unit 390 (illustrated in FIG. 4) on the basis of the user information related to the setting manipulation (532 and 533). For example, as illustrated in FIG. 5a, the case in which the user performs the setting manipulation (changing manipulation) of setting the image 11 based on the image data from the information processing device 200 as the main image is assumed. In this case, the control unit 370 changes the display form 396 (illustrated in FIG. 4) of the information processing device 200 in the management information retention unit 390 to "MAIN" (532 and 533).

Here, as described above, when the low power consumption mode is set in the information processing device 200, the information processing device 200 is assumed to sleep. In this way, when the information processing device 200 sleeps, the information processing device 200 may not be notified that the user performs the manipulation of setting the display form (changing manipulation).

Accordingly, when the user performs the manipulation of setting the display form (changing manipulation) 531 and the content retained in the management information retention unit 390 (illustrated in FIG. 4) is changed (532 and 533), the control unit 370 of the information processing device 300 sets a change trigger (534). The change trigger is a trigger for notifying the information processing device 200 that the user performs the manipulation of setting the display form (changing manipulation) when the inquiry message is received from the information processing device 200. Through the change trigger, the information processing device 200 cancels the state of the standby mode and notifies the information processing device 200 that the user performs the manipulation of setting the display form (changing manipulation).

Here, a case in which each unit of the information processing device 200 wakes up and the transmission process to the information processing device 300 starts is assumed. In this case, the control unit 370 of the information processing device 300 transmits a standby cancellation message to the information processing device 200 (535 and 536).

When the standby cancellation message is received (536), the control unit 240 of the information processing device 200 transmits a response message to the information processing device 300 (537 and 538).

In this way, it is necessary to inquire the setting in the information processing device 200 in accordance with the standby mode cancellation request from the sink device (535 to 538). Therefore, the control unit 240 of the information processing device 200 transmits the mode table request to the information processing device 300 (539 and 540). As described above, the mode table request is a request for transmitting each piece of information (the management information regarding the information processing device 200) managed in the information processing device 300. In the above-described processes (535 to 538), the messages (for example, the response message to the inquire message in the processes (515 to 518)) of the change (for example, the change in the display form) may be interchanged.

When the information processing device 300 receives the mode table request (540), the information processing device 300 transmits the command information corresponding to the mode table request (541 and 542). Here, when the command information is already transmitted from the information processing device 300 to the information processing device 200, the information processing device 200 already acquire the information included in the command information. Therefore, the information processing device 300 may transmit only difference information as the command information corresponding to the mode table request (541 and 542). The difference information is information regarding the change and is, for example, display form information of the resolution and the audio quality regarding the information processing device 200.

When the command information is received (542), the control unit 240 of the information processing device 200 specifies whether the display form of the data from the information processing device 200 is the main form or the sub-form on the basis of the command information. Subsequently, the control unit 240 of the information processing device 200 transmits the mode setting information indicating the setting of the specified display form to the information processing device 300 (543 and 544). Here, the main form is assumed to be specified as the display form of the data from the information processing device 200. Accordingly, the control unit 240 of the information processing device 200 transmits the mode setting information for notifying the information processing device 300 that the specified display form (main form) is set and the normal power consumption mode is set, to the information processing device 300 (543 and 544). The processes (539 to 544) may be performed with Capability Re-negotiation when the device conforms to Wi-Fi Certified Miracast. In the case of Capability Re-negotiation, it is not necessary to perform negotiation again in regard to the setting values unchanged in the display form in the process (534). For example, wfd-displayedid, wfd-client-rtpports, wfd-I2C, and wfd-connectortype can be exemplified.

Subsequently, the control unit 240 of the information processing device 200 sets the main mode as the transmission mode (545). Accordingly, in the data transmission system 201, the resolution for displaying the main image and the audio quality for outputting the main audio are set (546). In the line control system 202, the normal power consumption mode is set (547).

When the normal power consumption mode is set in this way (547), the control unit 240 of the information processing device 200 starts a normal transmission process (548 and 549). That is, the information processing device 200 transmits the stream for outputting the main image and the main audio to the information processing device 300 (548 and 549). When the stream is received in this way (549), the information processing device 300 outputs the image and the audio based on the received stream (550). For example, as illustrated in FIG. 5a, the image 11 based on the stream from the information processing device 200 is displayed as the main image on the display unit 351.

In this example, the example in which the previous display form (the display form when the information processing device 300 is powered down) is set as the display form of the display unit 351 when the information processing device 300 is powered up has been described. However, when the information processing device 300 is powered up, another display form may be set. For example, when the information processing device 300 is powered up, a default display form may be normally set. Alternatively, the display form may be decided on the basis of an order of connection to the information processing device 300.

In FIGS. 6 to 8, the example in which the information processing device 200 inquires the setting information regarding the information processing device 300 and sets the transmission parameters on the basis of the received parameter information has been described. However, the information processing device 200 may ask a setting request for the parameters desired to be set to the information processing device 300 and may set the parameters when the information processing device 200 receives a response indicating that there is no problem from the information processing device 300.

Here, for the management information retained in the management information retention unit 390, a command prepared in Wi-Fi Certified Miracast can be used for exchanging the management information. In this case, capability negotiation or capability re-negotiation defined in the Wi-Fi Display specification can be used. Here, as capability negotiation or capability re-negotiation, for example, RFC5939 or the Wi-Fi Certified Miracast specification can be exemplified. However, capability negotiation or capability re-negotiation is not limited thereto, but is defined as interchange of the device performance information. A communication example of the interchange using a command of the Wi-Fi Certified Miracast specification is illustrated in FIG. 9.

[Communication Example of Interchange using Wi-Fi Certified Miracast Specification Command]

Figure 9:
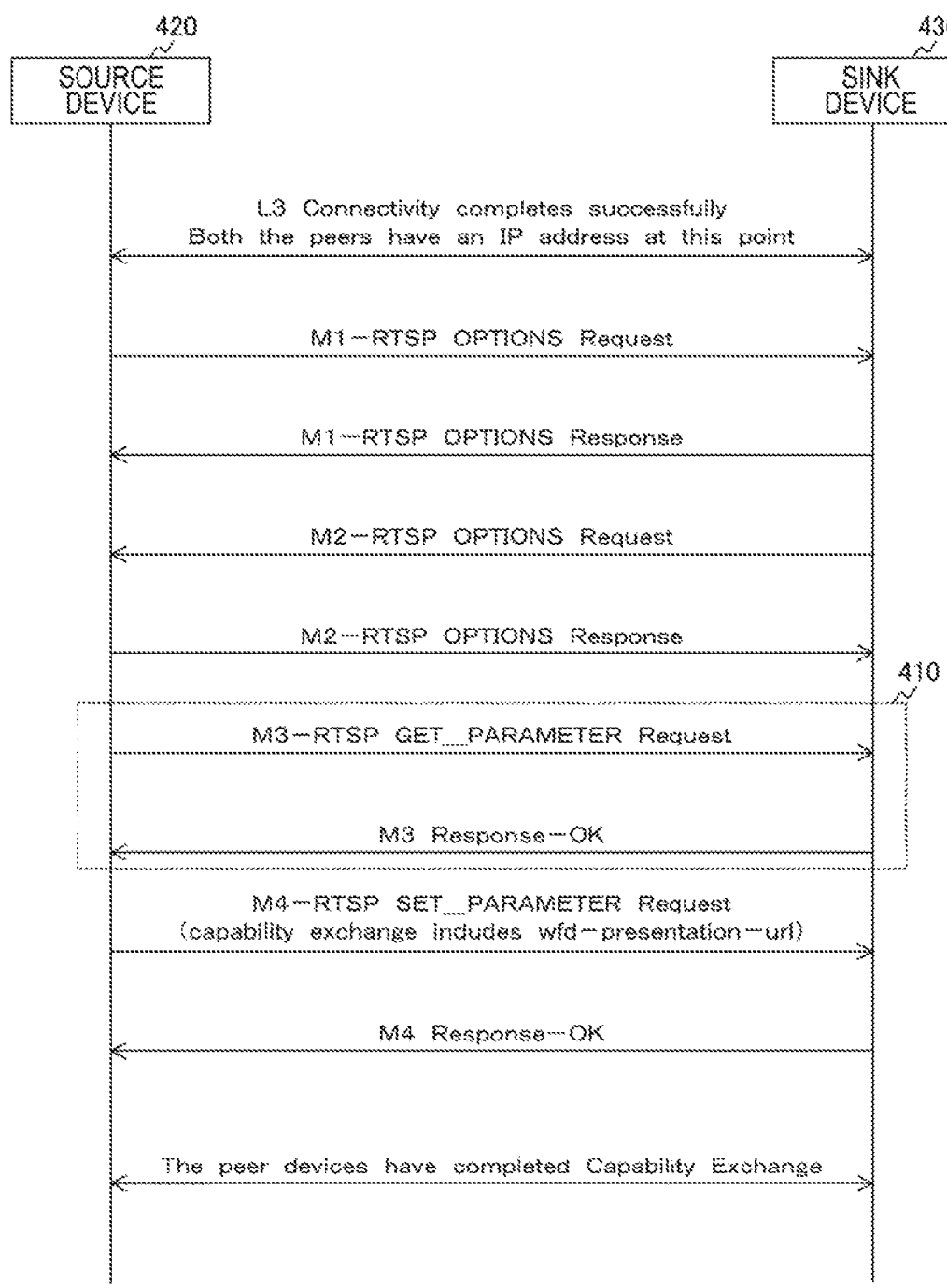
FIG. 9 is a sequence chart illustrating a communication process example between a source device and a sink device according to the first embodiment of the present technology.

FIG. 9 is a sequence chart illustrating a communication process example between a source device and a sink device according to the first embodiment of the present technology. FIG. 9 illustrates a communication example of interchange using an RTSP protocol. A source device 420 corresponds to the information processing devices 200 and 400 and a sink device 430 corresponds to the information processing device 300.

First, the description will be made with reference to FIG. 9. For example, as indicated by a dotted rectangle 410 of FIG. 9, an "RTSP M3 Request" (RTSP GET_PARAMETER Request) message transmitted from the source device to the sink device and an "RTSP M3 Response" (RTSP GET_PARAMETER Response) message transmitted from the sink device to the source device in response to the "RTSP M3 Request" (RTSP GET_PARAMETER Request) message can be used. This exchange process corresponds to, for example, the processes (505 to 508) illustrated in FIG. 6 and the processes (539 to 542) illustrated in FIG. 8. On the other hand, the messages may be appropriately transmitted from the source device to the sink device. For example, the interchange of the "RTSP M3 Request" (RTSP GET_PARAMETER Request) message and the "RTSP M3 Response" (RTSP GET_PARAMETER Response) message may be omitted, the management information may be included in a message to be transmitted from the source device to the sink device, the management information may be transmitted from the source device to the sink device, and the sink device may select the information and retain the information in the management information retention unit 390. For example, when the content protection setting is performed, link protection setup is performed after M3 Response. Therefore, it is desirable to perform communication while ensuring a secrecy ability of a link set once by transmitting only messages of M4 or higher.

In this way, the wireless communication unit 320 can perform the exchange of the capability information with capability negotiation or capability re-negotiation defined in the Wi-Fi Display specification. For example, the capability information is exchanged with the RTSP M3 message in capability negotiation or capability re-negotiation.

In this way, for example, the wireless communication unit 320 of the information processing device 300 performs the communication with the source device to exchange the capability information regarding the information processing device 300 and the capability information regarding the information processing device 200. The wireless communication unit 220 of the information processing device 200 performs the communication with the information processing device 300 to exchange the capability information regarding the information processing device 200 and the capability information regarding the information processing device 300. In this case, the wireless communication units 220 and 320 can exchange the capability information with capability negotiation or capability re-negotiation.

The control unit 370 of the information processing device 300 performs the stream transmission control (for example, the data transmission speed control, the scalability transmission rate control, setting control of multi-reception diversity, or setting control of content protection) with the information processing device 200 on the basis of the capability information regarding the information processing device 200, the radio wave propagation measurement information regarding the communication with the information processing device 200, and the use of the information processing device 300. A stream transmission method is different from in the embodiment of the present technology, but the control unit 240 of the information processing device 200 can also perform the stream transmission control (for example, the data transmission speed control, the scalability transmission rate control, setting control of multi-reception diversity, or setting control of content protection) with the information processing device 300 on the basis of the control performed from the information processing device 300 based on the capability information regarding the information processing device 200 and the radio wave propagation measurement information regarding the communication of the stream with the information processing device 300.

The control unit 370 of the information processing device 300 performs the control such that the power consumption mode is set in the information processing device 200 on the basis of the capability information (for example, the information indicating whether the device is a mobile device) regarding the information processing device 200. In this case, the control unit 370 can perform the control such that the low power consumption mode is set in the information processing device 200 on the basis of the capability information regarding the information processing device 200 and the management information for managing the information processing device 200. The control unit 240 of the information processing device 200 sets the power consumption mode on the basis of the control performed from the information processing device 300 based on the capability information regarding the information processing device 200. In the embodiment of the present technology, the example of the topology in which two source devices are used has been described, but an embodiment of the present technology is not limited to the embodiment of the present technology. For example, when the number of devices is 2 or more, it is necessary to control data transmission speed control corresponding to the number of devices and state transition is considerable. Therefore, the control is difficult, but benefit can be obtained. It is possible to also correspond to topology in which two or more source devices are connected.

<2. Second Embodiment>

In the first embodiment of the present technology, the example in which image transmission is performed from one or more source devices to one sink device has been described. Here, image transmission can also be performed from one or more source devices to a plurality of sink devices.

Thus, an example in which image transmission is performed from one or more source devices to a plurality of sink devices will be described according to a second embodiment of the present technology. In particular, a setting method of setting a multi-sink topology under a multi-source environment will be described.

First, an example of communication among a first sink device including one wireless communication unit, a second sink device including one wireless communication unit, and a plurality of source devices will be described.

[Configuration Example of Communication System]

Figure 10:
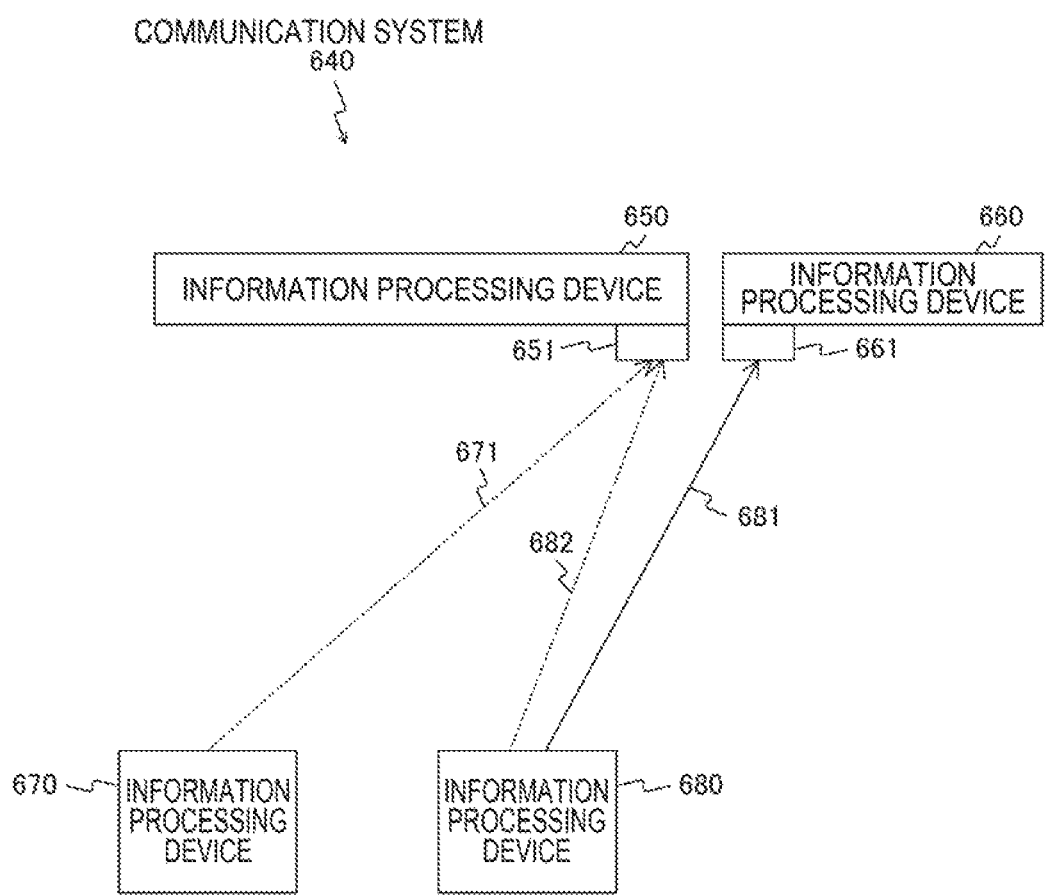
FIG. 10 is a block diagram illustrating a system configuration example of a communication system 640 according to a second embodiment of the present technology.
Figure 11:
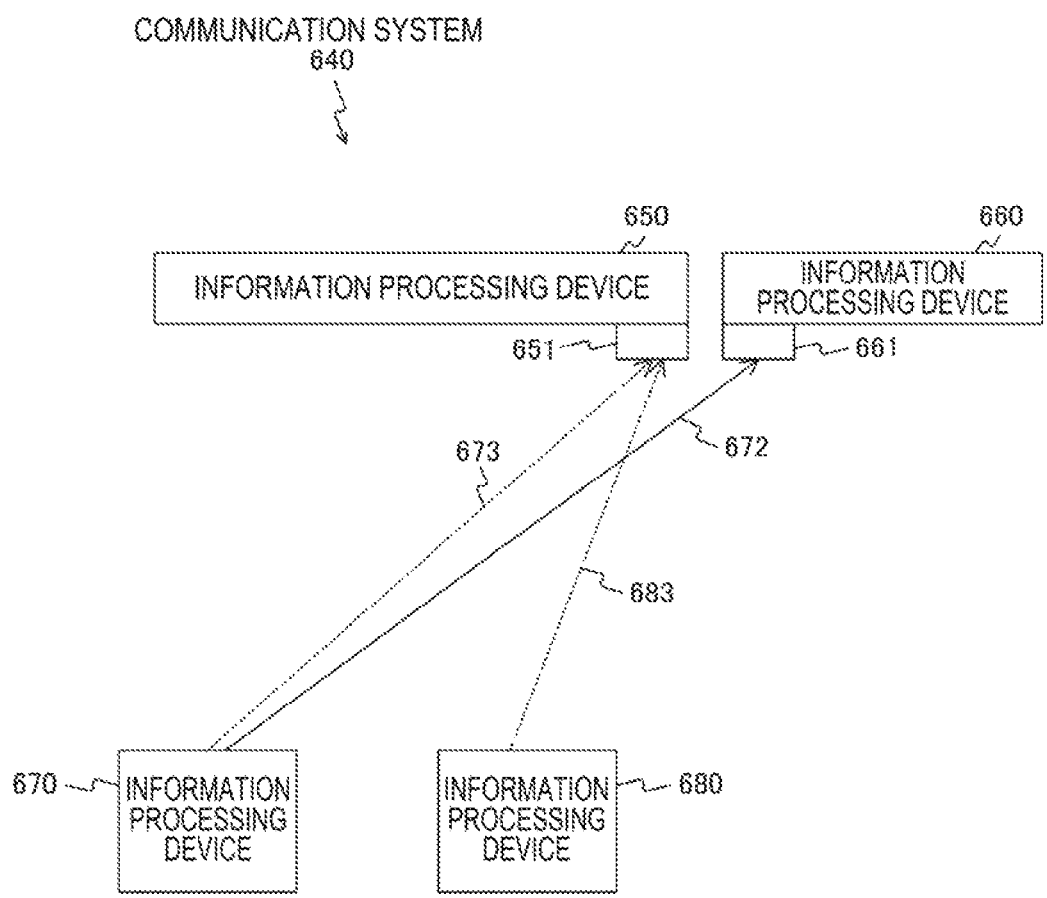
FIG. 11 is a block diagram illustrating a system configuration example of a communication system 640 according to a second embodiment of the present technology.

FIGS. 10 and 11 are block diagrams illustrating a system configuration example of a communication system 640 according to the second embodiment of the present technology. FIGS. 10 and 11 illustrate an example of a case in which communication is performed between a plurality of sink devices (information processing devices 650 and 660) and a plurality of source devices (information processing devices 670 and 680).

The communication system 640 includes information processing devices 650, 660, 670, and 680. The communication system 640 corresponds to the communication system 100 illustrated in FIG. 1. For example, the information processing devices 650 and 660 correspond to the information processing device 300 which is a sink device. The information processing device 680 corresponds to the information processing device 200 which is a source device. The information processing device 670 corresponds to the information processing device 400 which is a source device. Therefore, a part of the description common to the communication system 100 will be omitted.

In the second embodiment of the present technology, as illustrated in FIGS. 5a and 5b, a case in which a display area of a main image is greater than that of a sub-image will be described as an example. In this case, since a main image has a resolution greater than a sub-image, high-quality image transmission is preferably performed on the main image and standard quality image transmission is preferably performed on the sub-image.

In addition, in the second embodiment of the present technology, an example in which an information processing device that can perform a concurrent operation capable of simultaneously using a plurality of frequency channels among three kinds of frequency channels, 2.4 GHz, 5 GHz, and 60 GHz is used will be described. In the concurrent operation, a connection process can be performed while switching between a plurality of devices at the same frequency channel or a plurality (two or more) of different frequency channels. In addition, at the same frequency channel or a plurality of different frequency channels, a plurality of media access control (MAC) layers may be included and simultaneous connection may also be performed.

For example, to perform high-quality image transmission on a main image, it is necessary to select a communication scheme capable of achieving a high data transmission rate. Thus, in the second embodiment of the present technology, when high-quality image transmission is performed on a main image, a wireless communication unit that conforms to the IEEE 802.11ad standard typified by 60 GHz is used. On the other hand, when standard quality image transmission is performed on a sub-image, a wireless communication unit of 2.4 GHz or 5 GHz is used. For example, one device may include a plurality of wireless communication units (a wireless communication unit of 2.4 GHz or 5 GHz and a wireless communication unit of 60 GHz) or one wireless communication unit may realize a plurality of types of communication schemes (2.4 GHz or 5 GHz and 60 GHz).

The information processing device 650 includes a wireless communication unit 651. The wireless communication unit 651 is assumed to perform wireless communication in accordance with one communication scheme or a plurality of types of communication schemes (for example, 2.4 GHz or 5 GHz and 60 GHz).

In addition, the information processing device 660 includes a wireless communication unit 661. The wireless communication unit 661 is assumed to perform wireless communication in accordance with one communication scheme or a plurality of types of communication schemes (for example, 2.4 GHz or 5 GHz and 60 GHz).

In FIG. 10, a dotted arrow 682 schematically illustrates a relation between the devices when the information processing device 680 operates as a group owner (GO) for the wireless communication unit 651 of the information processing device 650. In addition, a solid arrow 681 schematically illustrates a relation between the devices when the information processing device 680 operates as a GO for the wireless communication unit 661 of the information processing device 660. Also, a group owner is not limited to an operation of a GO of Wi-Fi Direct and can also function as a part of a neighbor awareness network (NAN) master function as well as a part of an access point function.

In addition, a dotted line arrow 671 schematically illustrates a relation between the devices when the information processing device 670 operates as a P2P client for the wireless communication unit 651 of the information processing device 650.

For example, as indicated by the solid arrow 681 and the dotted arrow 682, one source device (the information processing device 680) can simultaneously transmit the same image data to a plurality of sink devices (the information processing devices 650 and 660). In this case, the information processing device 680 can copy image data transmitted to one sink device (for example, the information processing device 650) and transmit the copied image data to the other sink device (for example, the information processing device 660). However, transmission target image data is not limited to the same data. For example, different pieces of image data may be transmitted simultaneously (or separately) to the plurality of sink devices (the information processing devices 650 and 660). In addition, FIG. 11 illustrates an example in which one source device (the information processing device 670) transmits the same image data to the plurality of sink devices (the information processing devices 650 and 660) simultaneously or separately (as indicated by a solid arrow 672 and a dotted arrow 673).

In addition, for example, in the example illustrated in FIG. 10, one network is formed by one source device (the information processing device 680) and the plurality of sink devices (the information processing devices 650 and 660). In addition, in the example illustrated in FIG. 10, one network is formed by one source device (the information processing device 670) and one sink device (the information processing device 650).

In addition, in the example illustrated in FIG. 11, one network is formed by one source device (the information processing device 670) and a plurality of sink devices (the information processing devices 650 and 660). In addition, in the example illustrated in FIG. 11, one network is formed by one source device (the information processing device 680) and one sink device (the information processing device 650). This network can be ascertained as a neighbor awareness network (NAN). In addition, each piece of information interchanged in this network may also be interchanged via another information processing device (for example, an access point). In addition, the above-described access point may substitute a group owner of one network and may be configured to construct setting of one more network.

Here, topology setting in which one source device (the information processing device 680) simultaneously transmits the same image data to a plurality of sink devices (the information processing devices 650 and 660) will be described.

Here, the same information processing devices as the information processing devices 650, 660, 670, and 680 illustrated in FIGS. 10 and 11 are used as examples in the description. That is, an example of an information processing device corresponding to either a source device or a sink device will be given. The information processing device operates in, for example, an infrastructure mode or a direct communication mode. In addition, when the information processing device operates in the infrastructure mode, the information processing device communicates with another information processing device via an access point. Conversely, when the information processing device operates in the direct communication mode, the information processing device communicates directly with surrounding information processing devices without involving an access point.

The direct communication mode can be set to, for example, Wi-Fi direct established by the Wi-Fi Alliance. In the direct communication mode, communication starts after connection is established between information processing devices through, for example, a device discovery process or a formation process.

Here, the device discovery process is a process of discovering surrounding information processing devices. In the device discovery process, a beacon, a probe request, and a probe response are communicated for scanning, response waiting, and retrieving.

In addition, the formation process is a process of establishing direct connection between devices through wireless communication to form a group of information processing devices. The formation process includes a process of deciding which information processing device is a GO or an authentication process (provisioning).

In addition, in the direct communication mode, after connection between information processing devices is established to form a group, other information processing devices are subscribed to the group through an invitation process. The invitation process is a process of subscribing surrounding information processing devices to a group. In the invitation process, information for setting between the information processing devices is exchanged.

In addition, after connection between information processing devices is established to form a group, other information processing devices are subscribed to the group through a provision discovery process. The provision discovery process is a process of subscribing an information processing device to the formed group.

In addition, in the direct communication mode, an information processing device enters a state of one of a group owner (GO), a P2P client, and P2P unconfigured (P2P device).

For example, a GO (P2P GO) establishes direct connection between information processing devices (P2P clients) in a group of the information processing devices formed by direct connection between devices through wireless communication. In addition, for example, a GO performs sending a beacon, authenticating information processing devices participating in a group, and supplying connection setting information (Credential) to information processing devices participating in a group. That is, the GO serves as an access point in the group. In addition, for example, a P2P client establishes direct connection with a GO in a group of information processing devices formed by direct connection between devices through wireless communication. That is, the P2P client communicates with the GO or communicates with another P2P client via the GO. In addition, an information processing device of P2P unconfigured does not establish direct connection between devices through wireless communication.

Also, a GO includes a persistent GO and a temporary GO. The persistent GO is a GO that retains connection setting information of a connection destination even after ending of a P2P connection session and can perform reconnection in accordance with an invitation request and a provision discovery request from the connection destination. In addition, the temporary GO is a GO that retains connection setting information only during a P2P connection session and discards the connection setting information after ending of the P2P connection session.

A control unit of an information processing device (equivalent to, for example, the control unit 240 illustrated in FIG. 2 or the control unit 370 illustrated in FIG. 3) controls overall operations of the information processing device. For example, the control unit of the information processing device controls a device discovery process, a formation process, an invitation process, a provision discovery process, and the like by a wireless communication unit of the information processing device. Also, the wireless communication unit of the information processing device is equivalent to, for example, the wireless communication unit 220 illustrated in FIG. 2, the wireless communication unit 320 illustrated in FIG. 3, or the wireless communication units 651 and 661 illustrated in FIGS. 10 and 11.

In addition, the control unit of the information processing device acquires state information indicating a state of each information processing device related to direct connection between devices through wireless communication. Here, pieces of state information regarding first and second information processing devices directly connected through wireless communication will be described as first state information and second state information, respectively. Also, the first information processing device is, for example, a source device (equivalent to the information processing device 680 illustrated in FIG. 10) and the second information processing device is, for example, a sink device (equivalent to the information processing device 650 illustrated in FIG. 10). In this case, the control unit of the first information processing device can establish connection of the first and second information processing devices through the above-described wireless communication on the basis of the first state information and the second state information. Similarly, the control unit of the second information processing device can establish connection of the first and second information processing devices through the above-described wireless communication on the basis of the first state information and the second state information.

For example, the wireless communication is wireless local area network (LAN) communication and the above-described direct connection is direct connection conforming to Wi-Fi Direct. In addition, one of the first state information and the second state information is acquired via a link in the direct communication mode of a P2P group (first P2P group). For example, of the first state information and the second state information, the first state information of the first information processing device is acquired from a storage unit contained in the first information processing device. In addition, of the first state information and the second state information, the second state information of the second information processing device is acquired from the link in the direct communication mode of the first P2P group receiving the second state information.

For example, in the examples illustrated in FIGS. 10 and 11, a case in which the information processing device 650 functions as a GO and the information processing device 680 functions as a P2P client is assumed. A group formed in this case is referred to as a first P2P group. An example of a case in which a new P2P group (second P2P group) different from the already formed first P2P group is generated in this environment will be described.

For example, in the examples illustrated in FIGS. 10 and 11, the information processing device 650 can acquire the first state information of the information processing device 680 via the link in the direct communication mode of the first P2P group. Similarly, the information processing device 680 can acquire the second state information of the information processing device 650 via the link in the direct communication mode of the first P2P group.

Here, when the new P2P group (the second P2P group) is generated, the control unit of the information processing device 680 (equivalent to the control unit 240 or 370 illustrated in FIG. 2 or 3) changes a state (GO) of the information processing device 650. In this way, a process of deciding how the state of the information processing device is changed is referred to as a second P2P group state changing process in the description.

This state is one of a first state (that is, the GO), a second state (that is, the P2P client), and a third state (that is, the P2P unconfigured). The first state is, for example, a state (that is, the GO) in which direct connection with a plurality of information processing devices formed in the direct communication mode is established. In addition, the second state is a state (that is, the P2P client) in which direct connection with the information processing device in the first state is established. In addition, the third state is a state (that is, the P2P unconfigured) in which direct connection with the information processing device in the first state is not established.

For example, a certain information processing device can change a state of another information processing device from any one of the GO, the P2P client, and the P2P unconfigured to another state of the GO, the P2P client, and the P2P unconfigured. For example, by changing the GO state, it is possible to establish connection between devices having a direct connection function. Also, when the state is the GO or the P2P client, state information indicating the state includes information (for example, a group ID) of a group to which an information processing device belongs.

For example, the information processing device 680 (P2P client) can change a state of the information processing device 650 (GO) in the second P2P group from the GO to the P2P client or the P2P unconfigured.

In addition, for example, a case in which a state of an information processing device A in the first P2P group is a GO or a P2P client and the information processing device A and an information processing device B may not communicate in the P2P group is assumed. In this case, the information processing device B can change the state of the information processing device A in the second P2P group from the GO or the P2P client to the P2P unconfigured.

In addition, a case in which direct connection between both devices may not be established through a formation process, an invitation process, a provision discovery process, or the like is also assumed. Even in this case, it is possible to establish direct connection through a formation process, an invitation process, a provision discovery process, or the like after the state is changed.

Also, a change in the information processing device from the GO or the P2P client to the P2P unconfigured is referred to as disconnection (or dropping) of the information processing device in the description.

In addition, for example, a state of the information processing device 680 in the second P2P group can serve as the GO or the P2P client.

That is, the information processing device 680 can perform a concurrent operation. Also, the fact that the concurrent operation can be performed is also referred to as "concurrent operation=1" below On the premise, for example, the information processing device 680 can change a state of the information processing device 650 so that the state of the information processing device 650 is the GO in the first P2P group and is the P2P client in the second P2P group.

With this change in the state, the connection between the information processing devices 650 and 680 can be established in a state in which the information processing device 650 is maintained as the GO in the existing P2P group. In addition, the information processing device 680 can change the state of the information processing device 680 so that the state of the information processing device 680 is the P2P client in the first P2P group and is the GO in the second P2P group.

With this change in the state, the connection between the information processing devices 650 and 680 can be established in a state in which the information processing device 680 is maintained as the P2P client in the existing P2P group.

Also, the concurrent operation includes P2P concurrent and WLAN concurrent. The P2P concurrent is a function of enabling a GO in a P2P group and enabling a P2P client in another P2P group. In addition, the WLAN concurrent is a function of enabling the direct communication mode and the infrastructure mode to coexist and operate.

In addition, for example, the information processing device 680 further acquires limit information indicating a limit of the information processing device 680 on direct connection (first limit information) and limit information indicating a limit of the information processing device 650 on direct connection (second limit information).

At least one combination between a combination of the first state information and the first limit information and a combination of the second state information and the second limit information is acquired via the link in direct communication of the first P2P group. For example, a combination for the own device between the combination of the first state information and the first limit information and the combination of the second state information and the second limit information is acquired from an internal storage unit. In addition, a combination for another device between the combination of the first state information and the first limit information and the combination of the second state information and the second limit information is acquired from the link in the direct communication of the first P2P group receiving the state information.

Here, the first limit information includes, for example, information indicating whether the information processing device 680 can serve as the GO in a certain P2P group and can serve as the P2P client in another P2P group. That is, the limit information includes information indicating whether the concurrent operation can be performed. In other words, the state information is information used at the time of deciding the role of the second P2P group and is information indicating a role of each of the information processing devices belonging to the first P2P group.

In addition, the second limit information includes, for example, information indicating whether a new information processing device can be added to a P2P group when the state of the information processing device 650 is a GO in the P2P group. That is, the limit information includes information indicating Group Limit. Here, when Group Limit=1 is satisfied, the limit information indicates a state in which a new information processing device may not participate in the P2P group of the own device. In other words, the limit information is information regarding a limit of each information processing device.

In addition, the second limit information includes information indicating whether the information processing device 650 can operate a device equivalent to an access point. That is, the second limit information includes information indicating an ON or OFF state of Intra-Bss. In addition, the second limit information includes, for example, information indicating whether the information processing device 650 can establish connection between another information processing device and an access point. That is, the second limit information includes information indicating whether there is a function of an external registrar. In addition, the second limit information includes information indicating an OF or OFF state of a direct communication function (for example, Wi-Fi P2P power state) in the information processing device 650. In addition, the second limit information includes information indicating whether authentication for direct connection and supply of connection setting information through wireless communication in the information processing device 650 can be executed (for example, Wi-Fi protected setup (WPS) capability). In addition, the second limit information includes information indicating whether direct connection is established in the information processing device 650. In addition, the second limit information includes channel information (for example, a listen or operating channel) in the information processing device 650. In addition, the second limit information includes information regarding a wireless communication interface (for example, a MAC address of a wireless communication interface or the number of interfaces) in the information processing device 650.

In addition, the information processing device 680 selects a target pair of states of the information processing devices 650 and 680 in which the information processing devices 650 and 680 can be connected. Then, the information processing device 680 changes the state of the information processing device 680 so that the states of the information processing devices 650 and 680 become the selected target pair.

Here, the information processing device 680 may change both the states of the information processing devices 650 and 680. In addition, for example, the information processing device 680 selects a target pair with higher priority among a plurality of target pairs. For example, GO Intent indicating priority for a GO is assumed to be given to the information processing devices 650 and 680. In this case, a target pair suitable for the GO Intent is selected. For example, a case in which the information processing device 650 has higher GO Intent than the information processing device 680 is assumed. In this case, a target pair in which the state of the information processing device 650 is a GO and the state of the information processing device 680 is a P2P client is selected by the information processing device 680.

Due to this change in the state, not only can the connection between the information processing devices 650 and 680 be established, but the states of the information processing devices 650 and 680 can also be changed to desired states. For example, by setting one of the information processing devices 650 and 680 as GO, direct connection between the information processing devices 650 and 680 can be established. In addition, one of the information processing devices 650 and 680 can also be designated as a GO.

In addition, the information processing device 680 may acquire the target pair of states of the information processing devices 650 and 680 in which the information processing devices 650 and 680 can be connected. In this case, the information processing device 680 may change the state of the information processing device 650 so that the states of the information processing devices 650 and 680 become the target pair.

Due to this change in the state, when a desired state is given in advance, the states of the information processing devices 650 and 680 can be changed to the desired state.

In addition, for example, the information processing device 680 may acquire a target pair and the second state information of the information processing device 650 via the link in the direct communication mode of the first P2P group. Then, before the first state information of the information processing device 680 is transmitted to the information processing device 650, the information processing device 680 may change the state of the information processing device 680 on the basis of the acquired target pair.

Due to this change in the state, since the state of one information processing device is changed in advance before sharing of the state information, the number of process steps after the sharing of the state information can be reduced.

In addition, for example, the information processing device 680 may control a process of starting a service between the information processing devices 650 and 680 after connection between the information processing devices 650 and 680 through wireless communication is established. For example, the service is a service usable after connection establishment of the wireless communication, such as a digital living network alliance (DLNA) service or an image and/or audio mirroring service.

The service can be used immediately after the connection establishment of the wireless communication through the control of this process. In addition, the information processing device 680 may acquire information used to start the service via the link in the direct communication mode of the first P2P group and control the process of starting the service on the basis of the acquired information.

The information used in the service is, for example, device information regarding a device related to the service or service information regarding the service.

By acquiring information via the link in the direct communication mode of the first P2P group, it is possible to omit, for example, an information acquisition process performed at the time of starting a service such as mirroring. The information acquisition process is, for example, disconnection of connection between information processing devices, retrieval of a device, or reestablishment of connection between information processing devices. That is, it is possible to reduce manipulations of a user, simplify a process, and shorten a processing time.

In addition, the information used to start the service may be acquired via the link in the direct communication mode of the first P2P group when at least one of the pieces of state information is acquired via the link in the direct communication mode of the first P2P group.

Also, the information processing device may not have a direct connection function and the state of the information processing device may be a fourth state in which there is no direct connection function (hereinafter referred to as a "legacy device state"). In this case, when a state of another information processing device is the P2P client or the P2P unconfigured, the state of the other information processing device can be changed from the P2P client or the P2P unconfigured to the GO. Due to this change in the state, connection between a legacy device and a device having the direction connection function can be established.

In addition, the information processing devices 650 and 680 may have no direct connection function and the states of the information processing devices 650 and 680 may be a state of a legacy device which has no direct connection function. In this case, when the link in the direct communication mode of the first P2P group is used, connection with the same access point may be established between the information processing devices 650 and 680. Through this process, it is possible to establish the connection between the legacy devices.

As described above, the state information and the limit information can be shared between information processing devices to be connected via the link in the direct communication mode of the first P2P group. In addition, when it is determined that the wireless LAN communication is difficult, the connection between the information processing devices can be established by changing the states of the information processing devices. Accordingly, a user can obtain a desired connection form by performing only a manipulation of using the link in the direct communication mode of the first P2P group without being conscious of the state of the information processing device.

In addition, connection can be established with even an information processing device which has no direct connection function (for example, a legacy device). That is, even when connection between information processing devices may not be established through a predetermined process of establishing direct connection, the connection between the information processing devices can be established.

The communication example of the case in which each device includes one wireless communication unit has been described above. However, even when each device includes one wireless communication unit or a plurality of wireless communication units, an embodiment of the present technology can be applied. Thus, communication examples of a case in which one sink device includes a plurality of wireless communication units are illustrated in FIGS. 12 and 13.

[Configuration Example of Communication System]

Figure 12:
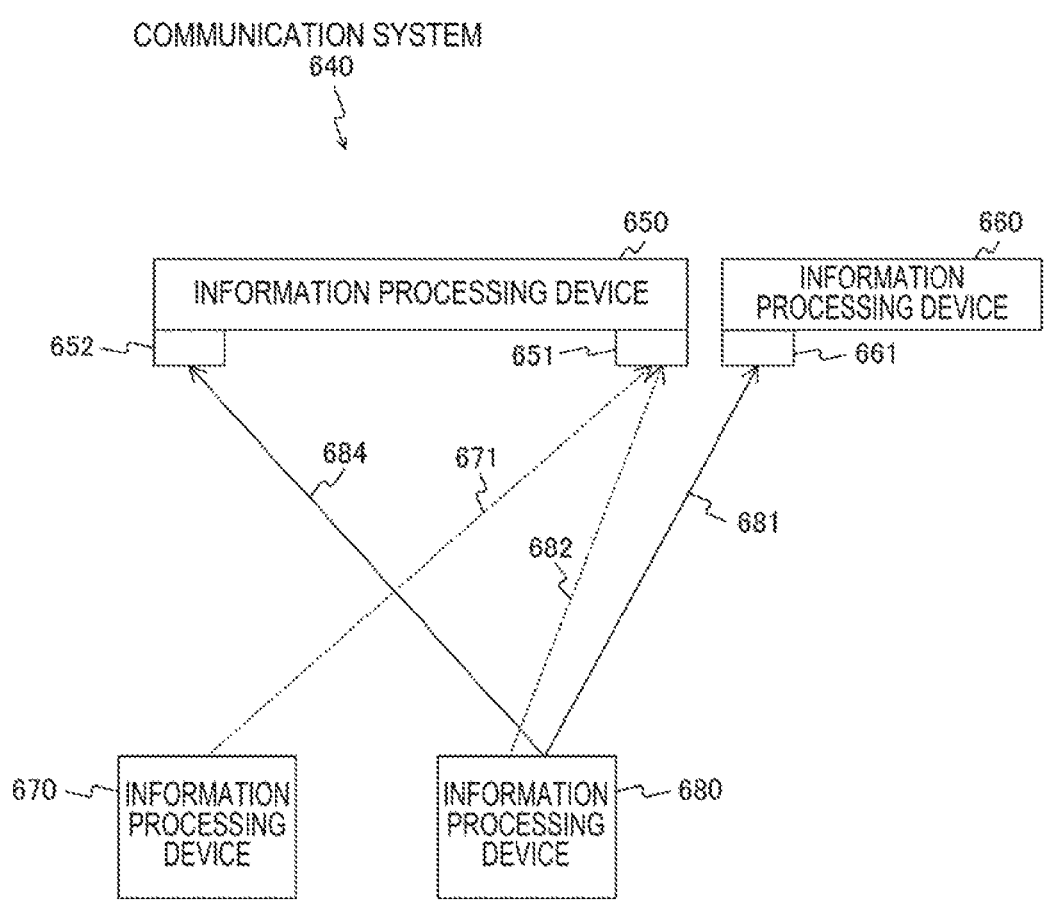
FIG. 12 is a block diagram illustrating a system configuration example of a communication system 640 according to a second embodiment of the present technology.
Figure 13:
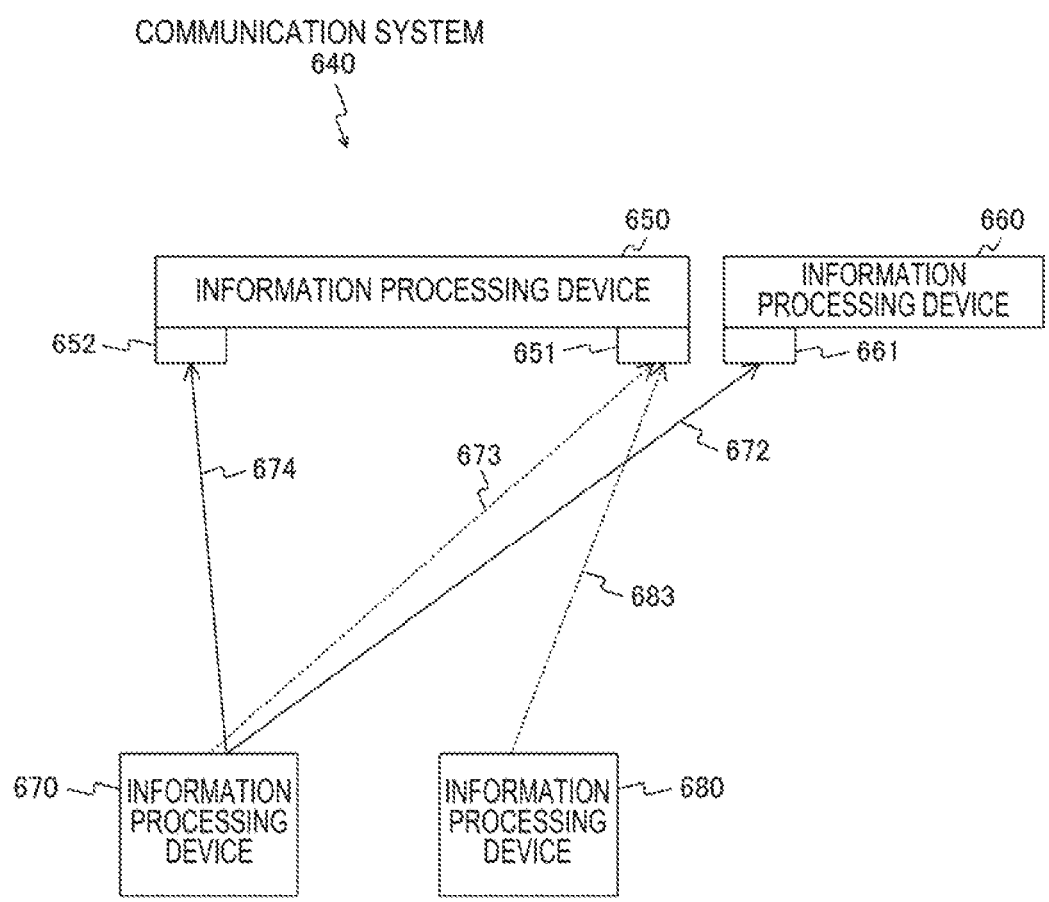
FIG. 13 is a block diagram illustrating a system configuration example of a communication system 640 according to a second embodiment of the present technology.

FIGS. 12 and 13 are block diagrams illustrating a system configuration example of a communication system 640 according to the second embodiment of the present technology.

FIGS. 12 and 13 illustrate an example of a case in which communication is performed between a plurality of sink devices (the information processing devices 650 and 660) and a plurality of source devices (the information processing devices 670 and 680). Also, FIGS. 12 and 13 are drawings in which FIGS. 10 and 11 are partially modified. Specifically, an example of a communication system (a communication system 640) in which a wireless communication unit 652 is added to the information processing device 650 illustrated in FIGS. 10 and 11 will be described. Therefore, a part of the description common to FIGS. 10 and 11 will be omitted.

Here, in IEEE 802.11ad used for a main image, high-speed transmission of a maximum of a few Gbps can be performed. Therefore, a resolution is not limited to HD and 4K (4K resolution) transmission can also be performed. Thus, IEEE 802.11ad is appropriate for high-quality image transmission. As described above, however, a technology for gaining a distance by allowing an antenna to have directivity is employed in IEEE 802.11ad. Therefore, an environment in which a link may not be ensured, such as blocking by a person, is also assumed. Thus, FIGS. 12 and 13 illustrate an example in which multi-reception diversity is appropriately set in such an environment (an example corresponding to a change in a topology).

Specifically, the information processing device 650 includes two wireless communication units 651 and 652. For example, the wireless communication units 651 and 652 are assumed to be wireless communication units that conform to the IEEE 802.11ad standard typified by 60 GHz. Also, FIGS. 12 and 13 illustrate an example in which one frequency band is used, but the present technology is not limited thereto. As described above, the wireless communication units may be separately used for 2.4 GHz or 5 GHz and 60 GHz or a plurality of frequency bands may be used in a time-division manner in each wireless communication unit.

In this way, in FIGS. 12 and 13, two wireless interfaces (the wireless communication units 651 and 652 of 60 GHz) of a sink device (the information processing device 650) are included. That is, the sink device (the information processing device 650) includes a plurality of reception units (the wireless communication units 651 and 652 of 60 GHz) that perform reception using multi-reception diversity. Then, when the multi-reception diversity is used, the plurality of reception units (the wireless communication units 651 and 652 of 60 GHz) are used. Accordingly, for example, even when an obstacle comes between the information processing device 680 and the wireless communication unit 651 (as indicated by a dotted line 682) and link disconnection occurs, the link can be avoided between the information processing device 680 and the wireless communication unit 652 (as indicated by a solid line 684). That is, image transmission between the information processing devices 650 and 680 can be prevented from being interrupted.

In this way, when the transmission from the information processing device 680 to the information processing device 650 is performed using the multi-reception diversity, the information processing device 680 copies the same image data as image data transmitted to the wireless communication unit 651 and transmits packets to the wireless communication unit 652.

In addition, the information processing device 650 can interpolate packets lost in regard to the image data received by the wireless communication unit 651 from the image data received by the wireless communication unit 652. By interpolating the lost packets in this way, the image data can be close to the image data transmitted by the information processing device 680 as much as possible. In addition, the information processing device 650 generates a main image on the basis of the image data subjected to the interpolation process and displays the main image on a display unit.

In addition, the information processing device 670 is connected to the wireless communication unit 651 so that the image data can be transmitted to the wireless communication unit 651. In this case, the information processing device 650 generates a sub-image on the basis of the image data received by the wireless communication unit 651 and displays the sub-image on the display unit.

For example, when the information processing device 680 transmits the main image to the information processing device 650 through the high-quality image transmission in this way, the connection between the information processing devices 650 and 680 can be set to 1 to 2 (as indicated by a dotted line 682 and a solid line 684). In addition, for example, when the information processing device 670 transmits the sub-image to the information processing device 650 through the standard quality image transmission, the connection between the information processing devices 650 and 670 can be set to 1 to 1 (as indicated by a dotted line 671). In addition, FIG. 13 illustrates an example in which one source device (the information processing device 670) simultaneously transmits the same image data to the plurality of sink devices (the information processing devices 650 and 660) (as indicated by solid arrows 672 and 674 and a dotted arrow 673).

[Communication Example]

Figure 14:
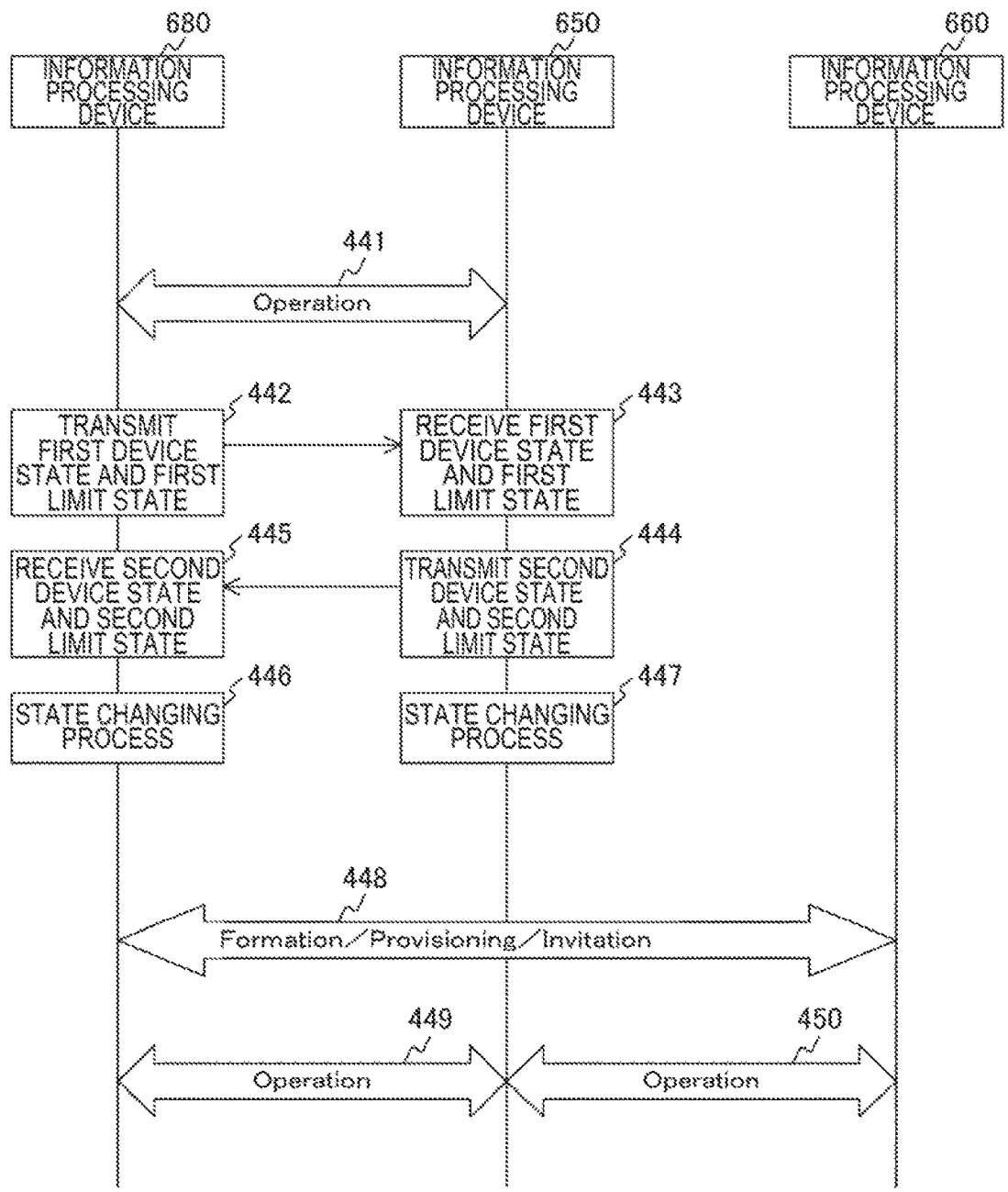
FIG. 14 is a sequence chart illustrating a communication process example between devices included in the communication system 640 according to the second embodiment of the present technology.

FIG. 14 is a sequence chart illustrating a communication process example between devices included in the communication system 640 according to the second embodiment of the present technology. Also, FIG. 14 illustrates an example of communication processing among the information processing devices 650, 660, and 680.

The process starts by establishing the link in the direct communication mode of the first P2P group between the information processing devices 650 and 680 (441).

Subsequently, the information processing device 680 transmits the first state information of the information processing device 680 to the information processing device 650 via the link in the direct communication mode of the first P2P group (442 and 443). This state information is information indicating one of the GO, the P2P client, the P2P unconfigured, and the legacy device, as described above. For example, when the state information includes information directly indicating the GO, the P2P client, or the P2P unconfigured, the state information indicates a state indicated by the information. When the state information does not include the information, the information means the legacy device.

In addition, the information processing device 680 transmits the first limit information of the information processing device 680 to the information processing device 650 via the link in the direct communication mode of the first P2P group (442 and 443). The limit information includes the information indicating whether the concurrent operation can be performed, the information indicating the Group Limit, the information indicating the ON or OFF state of Intra-Bss, or the information indicating whether there is a function of an external registrar, as described above.

The information processing device 650 receiving the first state information and the first limit information transmits the second state information and the second limit information of the information processing device 650 to the information processing device 680 via the link in the direct communication mode of the first P2P group (444 and 445).

Subsequently, the information processing devices 650 and 680 perform a state changing process for the second P2P group of the information processing devices 650 and 680 on the basis of the state information of the information processing devices 650 and 680 (446 and 447). That is, the information processing devices 650 and 680 decide how the states of the information processing devices 650 and 680 are changed so that the connection between the information processing devices 650 and 680 can be established (446 and 447).

In this case, both the information processing devices 650 and 680 may autonomously perform the state changing process for the second P2P group. In addition, of the information processing devices 650 and 680, the operation mode may be switched to a mode in which the state changing process for the second P2P group is performed by one of both the devices.

Here, for example, an operation mode of both the devices is also assumed to be a mode in which the state changing process for the second P2P group is autonomously performed. In this case, competition in which both the devices serve as the GO together is assumed to occur. Thus, when the operation mode of both the devices is the mode in which the state changing process for the second P2P group is autonomously performed, one of both the devices may switch the operation mode to the state changing process for the second P2P group.

Subsequently, when wireless LAN communication can be performed to use the second P2P group, the information processing devices 650 and 680 perform communication using a wireless LAN (448). Alternatively, after the wireless LAN communication can be performed, for example, by turning on the radio communication unit, communication is performed using a wireless LAN (448). In addition, the information processing devices 650 and 680 perform the communication even with another information processing device 660 using the wireless LAN (448).

Specifically, a process of establishing direct connection, such as the formation process, the invitation process, or the provision discovery process, is performed among the information processing devices 650, 660, and 680 (448).

Subsequently, each of the information processing devices 650, 660, and 680 starts direct communication (operation) (449 and 450).

For example, a case in which the information processing device 650 retains device management information (each piece of information illustrated in FIG. 4) and includes an interface in which a user can perform a manipulation input by touching or approaching a display surface with his or her finger is assumed. In this case, the information processing device 650 is assumed to generate a new group using the information processing device 680 as the GO and receives a desired use for generating a multi-sink topology from a user.

In this case, to cause the information processing device 680 to function as the GO of the second P2P group, the information processing device 650 confirms the state information (the first state information) and the limit information (the first limit information) of the information processing device 680. When there is no problem to cause the information processing device 680 to function as the GO of the second P2P group as a result of the confirmation, the information processing device 650 sets the information processing device 680 as the GO of the second P2P group and the own device is set to the P2P client of the second P2P group.

Here, to perform connection between the GO and the P2P client as the second P2P group, it is necessary for the information processing device 680 to perform an invitation request process on the information processing device 650. Alternatively, it is necessary for the information processing device 650 to perform a provision discovery process on the information processing device 680. Here, a link between the information processing devices 650 and 680 in the second P2P group is interchanged in the first P2P group. Therefore, a part of a connection sequence between the GO and the P2P client as the second P2P group can be omitted. Through this process (a part of the process can be omitted), a new group is generated.

In addition, it is necessary to cause the information processing device 660 to participate in the second P2P group. Thus, the information processing device 680 performs the invitation request process on the information processing device 660 (448). Here, the information processing device 660 is also assumed to be connected to the information processing device 650 as the first P2P group. In this case, it is possible to ascertain that the information processing device 660 receives a desired intention to generate a new group using the information processing device 680 as the GO and generate a multi-sink topology from a user. Therefore, the information processing device 660 may perform the provision discovery process on the information processing device 680 (448).

[Operation Example of Information Processing Device]

Figure 15:
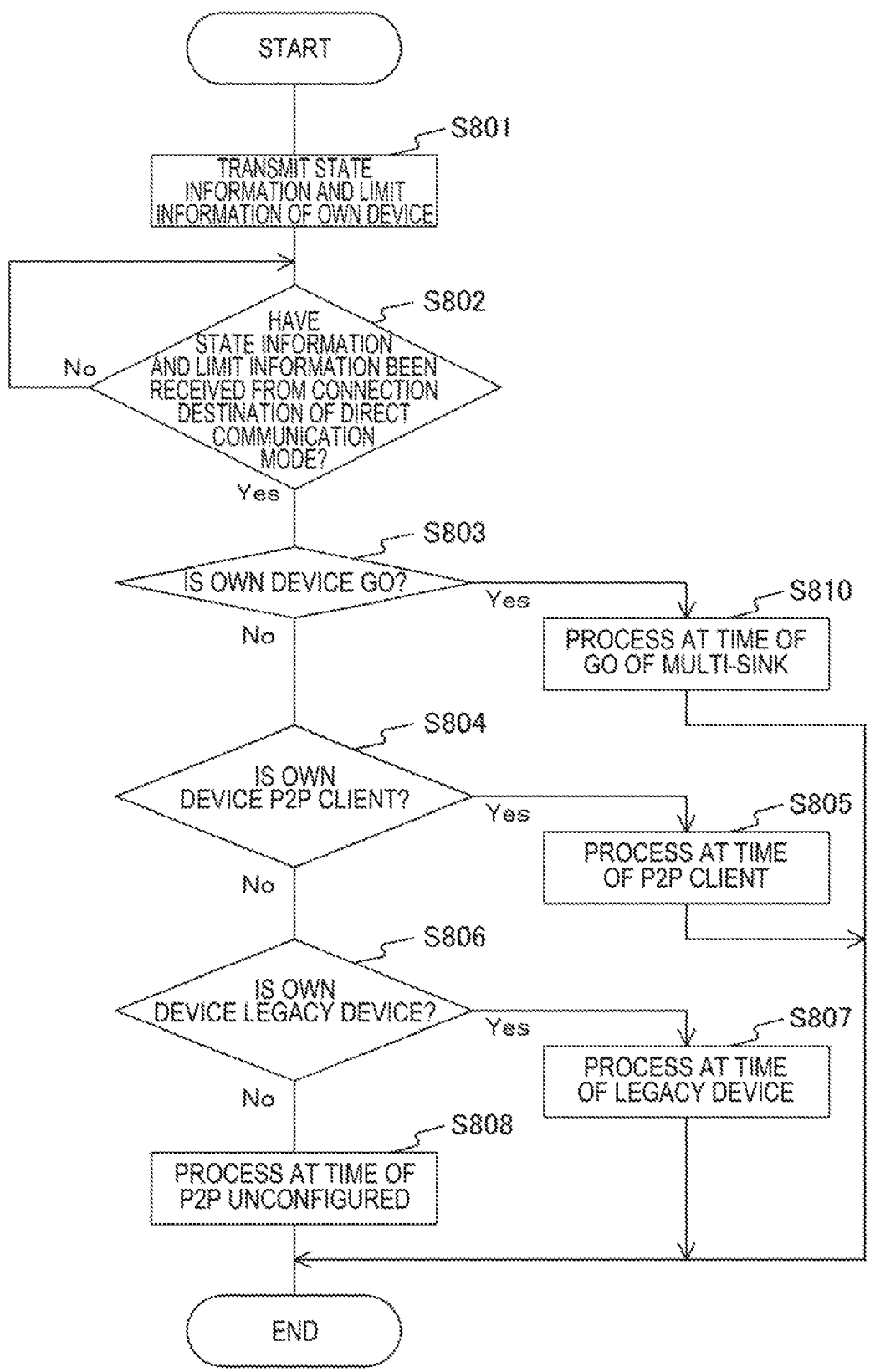
FIG. 15 is a flowchart illustrating an example of a process procedure of a communication process by an information processing device 680 according to the second embodiment of the present technology.

FIG. 15 is a flowchart illustrating an example of a process procedure of a communication process by the information processing device 680 according to the second embodiment of the present technology. This communication process starts, for example, when the information processing device 680 uses the link in the direct communication mode of the first P2P group in which the information processing device 650 is set to the GO.

First, the control unit of the information processing device 680 transmits the state information (the first state information) and the limit information (the first limit information) of the information processing device 680 to the information processing device 650 using the link in the direct communication mode of the first P2P group (step S801).

Subsequently, the control unit of the information processing device 680 determines whether the state information (the second state information) and the limit information (the second limit information) of the information processing device 650 has been received via the link in the direct communication mode of the first P2P group (step S802). When the second state information and the second limit information have not been received (step S802), monitoring is continuously performed.

When the second state information and the second limit information are received (step S802), the control unit of the information processing device 680 determines whether the information processing device 680 is a GO of an existing P2P group on the basis of the first state information of the information processing device 680 (step S803). When the information processing device 680 is a GO of an existing P2P group (step S803), a process at the time of a GO of a multi-sink is performed (step S810). This process will be described in detail with reference to FIG. 16.

For example, when the information processing device 650 receives an intention to generate a new group using the information processing device 680 as the GO and generate a multi-sink topology from a user, the subsequent processes may be omitted. In this case, the control unit of the information processing device 680 can set the own device as the GO of the second P2P group. In this way, the control unit of the information processing device 680 can also set the own device as the GO of the second P2P group internally. However, the control unit of the information processing device 650 may perform a normal process without change and set the own device as the GO by setting a parameter for giving a priority for the GO (for example, GO Intent indicating a priority for the GO).

When the information processing device 680 is not a GO of an existing P2P group (step S803), the control unit of the information processing device 680 determines whether the information processing device 680 is a P2P client of the existing P2P group on the basis of the first state information of the information processing device 680 (step S804). When the information processing device 680 is a P2P client of the existing P2P group (step S804), a process at the time of the P2P client is performed (step S805).

When the information processing device 680 is not a P2P client of the existing P2P group (step S804), the control unit of the information processing device 680 determines whether the information processing device 680 is a legacy device on the basis of the first state information of the information processing device 680 (step S806). When the information processing device 680 is a legacy device (step S806), a process at the time of the legacy device is performed (step S807).

When the information processing device 680 is not a legacy device (step S806), a process at the time of the P2P unconfigured is performed (step S808).

Figure 16:
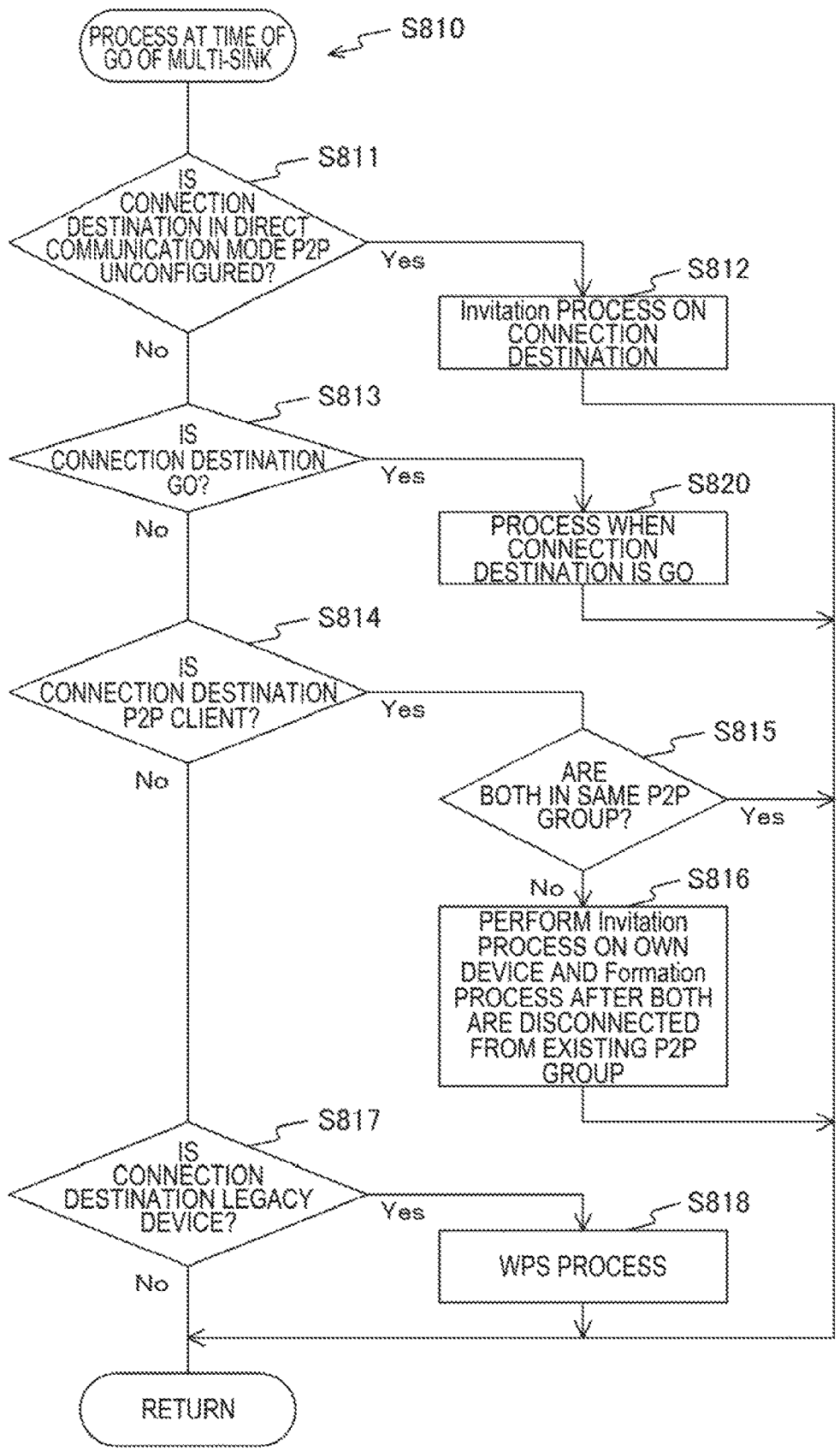
FIG. 16 is a flowchart illustrating an example of a process procedure at the time of a GO of a multi-sink in the process procedure of the communication process by the information processing device 680 according to the second embodiment of the present technology.

FIG. 16 is a flowchart illustrating an example of a process procedure at the time of a GO of a multi-sink in the process procedure (the process procedure of step S810 illustrated in FIG. 15) of the communication process by the information processing device 680 according to the second embodiment of the present technology.

First, the control unit of the information processing device 680 determines whether the information processing device 650 is the P2P unconfigured on the basis of the second state information of the information processing device 650 (step S811). When the information processing device 650 is the P2P unconfigured (step S811), the control unit of the information processing device 680 performs the invitation process on the information processing device 650 (step S812). That is, the control unit of the information processing device 680 performs the invitation process by transmitting an invitation request to the information processing device 650 via a communication interface (step S812). Also, the communication interface means a wireless communication unit included in the information processing device 680 or a link in the direct communication mode of the first P2P group. In addition, hereinafter, the communication interface is used as having the same meaning.

For example, when the information processing device 650 receives an intention to generate a new group using the information processing device 680 as the GO and generate a multi-sink topology from a user, the subsequent processes may be omitted. In this case, the control unit of the information processing device 680 can set the information processing device 650 as the P2P client of the second P2P group. In this way, the control unit of the information processing device 680 can also internally set the information processing device 650 as the P2P client of the second P2P group.

When the information processing device 650 is not the P2P unconfigured (step S811), the control unit of the information processing device 680 determines whether the information processing device 650 is the GO of the existing P2P group (step S813). When the information processing device 650 is the GO of the existing P2P group (step S813), the process when the connection destination is the GO is performed (step S820). This process will be described in detail with reference to FIG. 17.

When the information processing device 650 is not the GO (step S813), the control unit of the information processing device 680 determines whether the information processing device 650 is the P2P client of the existing P2P group on the basis of the second state information of the information processing device 650 (step S814).

When the information processing device 650 is the P2P client (step S814), the control unit of the information processing device 680 determines whether both the information processing devices 650 and 680 belong to the same P2P group (step S815). Then, when both the information processing devices belong to the same P2P group (step S815), the operation of the process at the time of the GO of the multi-sink ends.

When both the information processing devices do not belong to the same P2P group (step S815), the control of the information processing device 680 performs the invitation process on the own device and performs the formation process after both the information processing devices are disconnected from the existing P2P group (step S816).

When the information processing device 650 is not the P2P client (step S814), the control unit of the information processing device 680 determines whether the information processing device 650 is the legacy device on the basis of the second state information of the information processing device 650 (step S817).

When the information processing device 650 is the legacy device (step S817), the control unit of the information processing device 680 performs a Wi-Fi protected setup (WPS) process in In-Band or Out of Band (OOB) (step S818). Then, the operation of the process at the time of the GO of the multi-sink ends. Also, the WPS process is a process including authentication and sharing of connection setting information (Credential). In addition, WPS is also referred to as Wi-Fi Simple Config (WSC) or WSC exchange.

Figure 17:
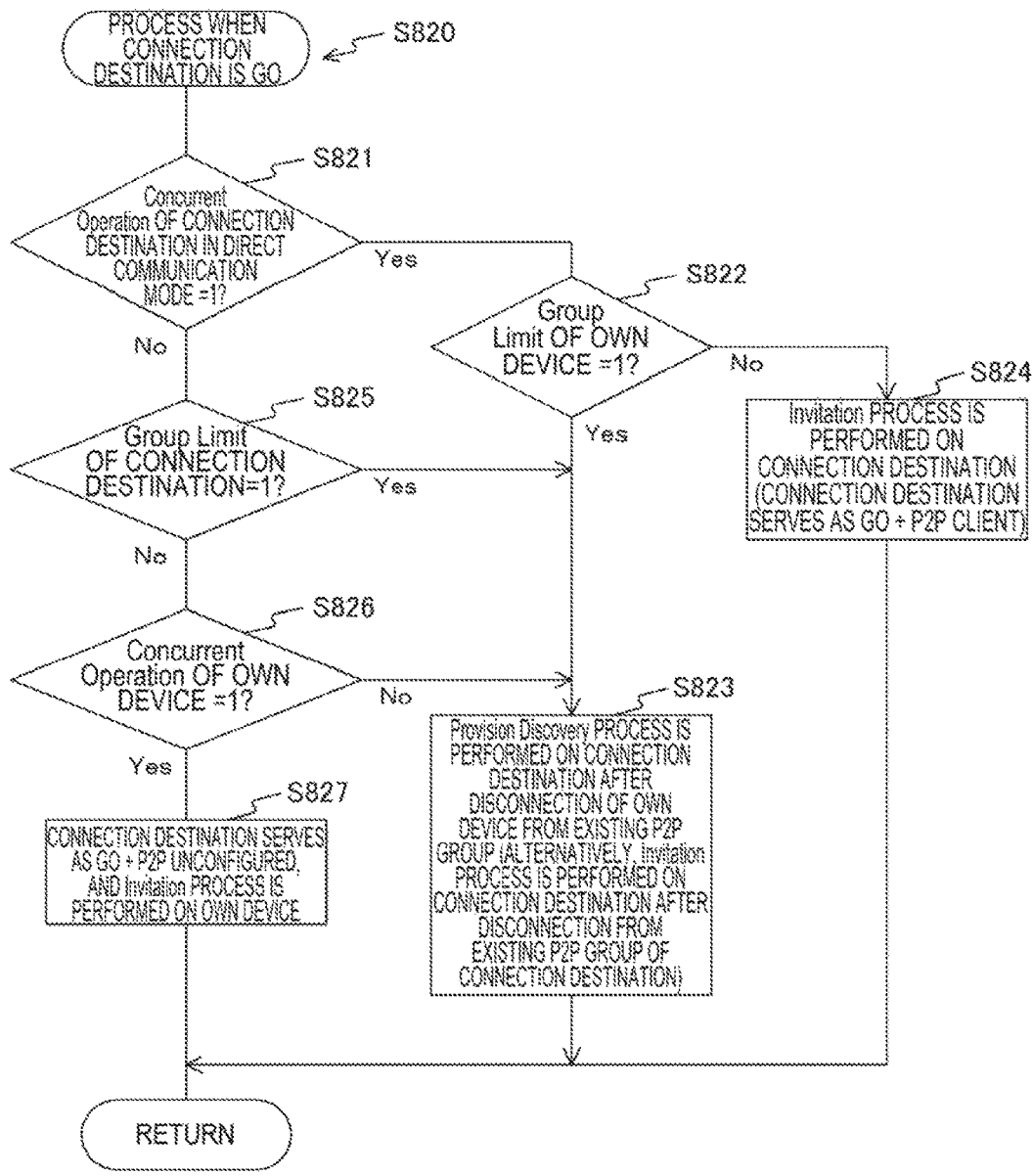
FIG. 17 is a flowchart illustrating an example of a process procedure when a connection destination is a GO in the process procedure of the communication process by the information processing device 680 according to the second embodiment of the present technology.

FIG. 17 is a flowchart illustrating an example of a process procedure (the process procedure of step S820 illustrated in FIG. 16) when a connection destination is a GO in the process procedure of the communication process by the information processing device 680 according to the second embodiment of the present technology.

First, the control unit of the information processing device 680 determines whether Concurrent Operation=1 is satisfied on the basis of the second limit information of the information processing device 650 (step S821). That is, it is determined whether the information processing device 650 can perform the concurrent operation. In addition, it is determined whether the information processing device 650 serves as the GO in the P2P group and the P2P client in another P2P group.

When Concurrent Operation=1 is satisfied (step S821), the control unit of the information processing device 680 determines whether Group Limit=1 is satisfied on the basis of the first limit information of the information processing device 680 (step S822). That is, it is determined whether a new information processing device can be added to the P2P group of the information processing device 680.

When Group Limit=1 is satisfied (step S822), the control unit of the information processing device 680 disconnects the information processing device 680 from the existing P2P group (step S823). Subsequently, the control unit of the information processing device 680 performs the provision discovery process by transmitting a provision discovery request to the information processing device 650 via the communication interface (step S823). Through the provision discovery process, the information processing device 680 serves as the P2P client of the P2P group in which the information processing device 650 is the GO.

Alternatively, the control unit of the information processing device 680 may disconnect the information processing device 650 from the existing P2P group via the communication interface (step S823). In this case, the control unit of the information processing device 680 performs the invitation process by transmitting an invitation request to the information processing device 650 (step S823). Through the invitation process, the information processing device 650 serves as the P2P client of the P2P group in which the information processing device 680 is the GO.

Here, when Group Limit=1 is satisfied (step S822), it is desirable to transmit the capability information interchanged in the first P2P group to the information processing device 650 before disconnection from the first P2P group is performed. That is, when Group Limit=1 is satisfied (step S822), the control unit of the information processing device 680 transmits the capability information interchanged in the first P2P group to the information processing device 650 before disconnection from the first P2P group is performed. The capability information is, for example, information obtained with an M3 message (get_parameter) of a Miracast standard or each piece of information illustrated in FIG. 4.

For example, even in an environment in which there are two or more Miracast groups, the GO that manages the capability information of all the devices of the Miracast group can supply information to the GO of another Miracast group. Accordingly, it is possible to reduce the effort for each device to perform capability negotiation for each GO.

When Group Limit=1 is not satisfied (step S822), the control unit of the information processing device 680 performs the invitation process on the information processing device 650 (step S824). That is, the control unit of the information processing device 680 performs the invitation process by transmitting an invitation request to the information processing device 650 via the communication interface. Through the invitation process, the information processing device 650 serves as the GO of the existing P2P group and serves as the P2P client of the P2P group in which the information processing device 680 is the GO.

When Concurrent Operation=1 is not satisfied (step S821), the control unit of the information processing device 680 determines whether Group Limit=1 is satisfied on the basis of the second limit information of the information processing device 650 (step S825). That is, it is determined whether a new information processing device can be added to the P2P group of the information processing device 650. When Group Limit=1 is satisfied (step S825), the process proceeds to step S823.

When Group Limit=1 is not satisfied (step S825), the control unit of the information processing device 680 determines whether Concurrent Operation=1 is satisfied on the basis of the first limit information of the information processing device 680 (step S826). That is, it is determined whether the information processing device 680 can serve as the GO in the P2P group and the P2P client in another P2P group.

When Concurrent Operation=1 is satisfied (step S826), the control unit of the information processing device 680 changes the state of the information processing device 680 (step S826). Specifically, the control unit of the information processing device 680 changes from the GO of the existing P2P group to the GO and the P2P unconfigured of the existing P2P group (step S826).

Subsequently, the control unit of the information processing device 680 performs the provision discovery process by transmitting a provision discovery request to the information processing device 650 via the communication interface (step S827). Through the provision discovery process, the information processing device 680 serves as the GO of the existing P2P group and serves as the P2P client of the P2P group in which the information processing device 650 is the GO.

In this way, in an environment of parameters of the various information processing devices, the connection method corresponding to the situation can be realized. Accordingly, it is possible to perform connection without the effort of the user.

[Transition example of group]

FIGS. 18*a* and 18*b* is a are diagrams illustrating a transition example of a group formed by the information processing devices included in the communication system 640 according to the second embodiment of the present technology.

FIGS. 18*a* and 18*b* illustrate an example of a case in which the second P2P group is formed in a state in which the first P2P group is formed by the information processing devices 650 and 680, as described above.

FIG. 18*a* schematically illustrates a dotted rectangle indicating a first P2P group 700 formed by the information processing devices 650 and 680.

FIG. 18*b* schematically illustrates a dotted rectangle indicating a second P2P group 701 formed by the information processing devices 650, 660, and 680.

As illustrated in FIGS. 18*a* and 18*b*, while the information processing device 680 serves as a P2P client in the first P2P group 700, the information processing device 680 serves as a P2P GO in the second P2P group 701. In addition, while the information processing device 650 serves as a P2P GO in the first P2P group 700, the information processing device 650 serves as a P2P client in the second P2P group 701.

[Communication Example when New Group is Formed]

FIGS. 19 to 22 are sequence charts illustrating a communication process example between devices included in the communication system 640 according to the second embodiment of the present technology.

FIGS. 23 to 26 are diagrams illustrating examples of frame formats interchanged between devices included in the communication system 640 according to the second embodiment of the present technology.

FIG. 19 illustrates an example in which a multi-sink topology is formed through relay of the P2P GO (the information processing device 650) of the first P2P group 700. That is, FIG. 19 illustrates an example in which the multi-sink topology is formed by connecting the P2P GO (the information processing device 680) and the P2P client (the information processing device 660) of the second P2P group 701 through the relay of the P2P GO (the information processing device 650) of the first P2P group 700. Accordingly, the topology of the second P2P group 701 can be constructed through the relay of the first P2P group 700 (the information processing device 650) rather than a process performed via the GO (the information processing device 680) of the second P2P group 701.

In the example of FIGS. 18*a* and 18*b*, interchange methods of the information processing devices 650, 680, and 660 are different when a wireless link of the second P2P group 701 starts. Thus, FIG. 19 illustrates an example of a case in which a source device or a sink function is newly added when the information processing devices 650 and 680 of the second P2P group 701 are already connected as the first P2P group 700.

In FIG. 19, first, the information processing device 660 is assumed to be unconnected to the information processing devices 650 and 680. In addition, a case in which the information processing devices 650 and 680 can perform the concurrent operation, but the information processing device 660 may not perform the concurrent operation in the environment is assumed.

Here, after the second P2P group 701 is formed, the information processing device 660 can be connected to the information processing device 680 serving as the GO. However, before the second P2P group 701 is formed, the information processing device 680 still functions as the P2P client of the first P2P group 700.

Thus, the information processing device 660 performs a discoverability request process on the GO (the information processing device 650) of the first P2P group 700 (702). That is, the information processing device 660 transmits a discoverability request process to the information processing device 650 (702). Also, the discoverability request is illustrated in FIG. 26.

Here, a case in which the information processing device 650 generates a new group (the second P2P group 701) using the information processing device 680 as the GO of the second P2P group 701 and receives a use for generating a multi-sink topology from the user is assumed. In this case, the information processing device 650 ascertains that the own device operates as the P2P client in the second P2P group 701 while the own device operates as the GO in the first P2P group 700. Therefore, the information processing device 650 transmits a discoverability request to the information processing device 680 (703).

The discoverability request is set to a process command for executing the following (1) and (2). Therefore, the discoverability request includes information for performing the following (1) and (2):

(1) to operate as the GO in the second P2P group 701; and (2) to omit connection with the information processing device 650 in the second P2P group 701 (to describe an invitation omission flag=1 (illustrated in FIG. 25)).

In this way, the information processing device 650 receiving the discoverability request transmits the discoverability request to the information processing device 680 (703). In addition, the information processing device 650 transmits a discoverability response to the information processing device 660 (704). Also, the discoverability response is illustrated in FIG. 26.

Here, an invitation sequence between the information processing devices 650 and 680 can be omitted. However, in the case of an information processing device capable of performing the concurrent operation, a different MAC address is used for each process in some cases. In this way, when the MAC address to be used is different, only a 4 way-handshake is performed between the information processing devices 650 and 680. However, when the same MAC address is used, a 4 way-handshake can be omitted between the information processing devices 650 and 680.

Subsequently, the information processing device 680 starts a group formation process with the information processing device 660 by establishing connection with the information processing device 650 (705). In this process, information can be exchanged between the groups.

FIG. 19 illustrates an example of a case in which the information processing device 660 may not perform the concurrent operation. However, even when the information processing device 660 can perform the concurrent operation, for example, when a frequency channel with the information processing device 680 is temporarily unstable, the example illustrated in FIG. 19 can be applied.

Figure 20:
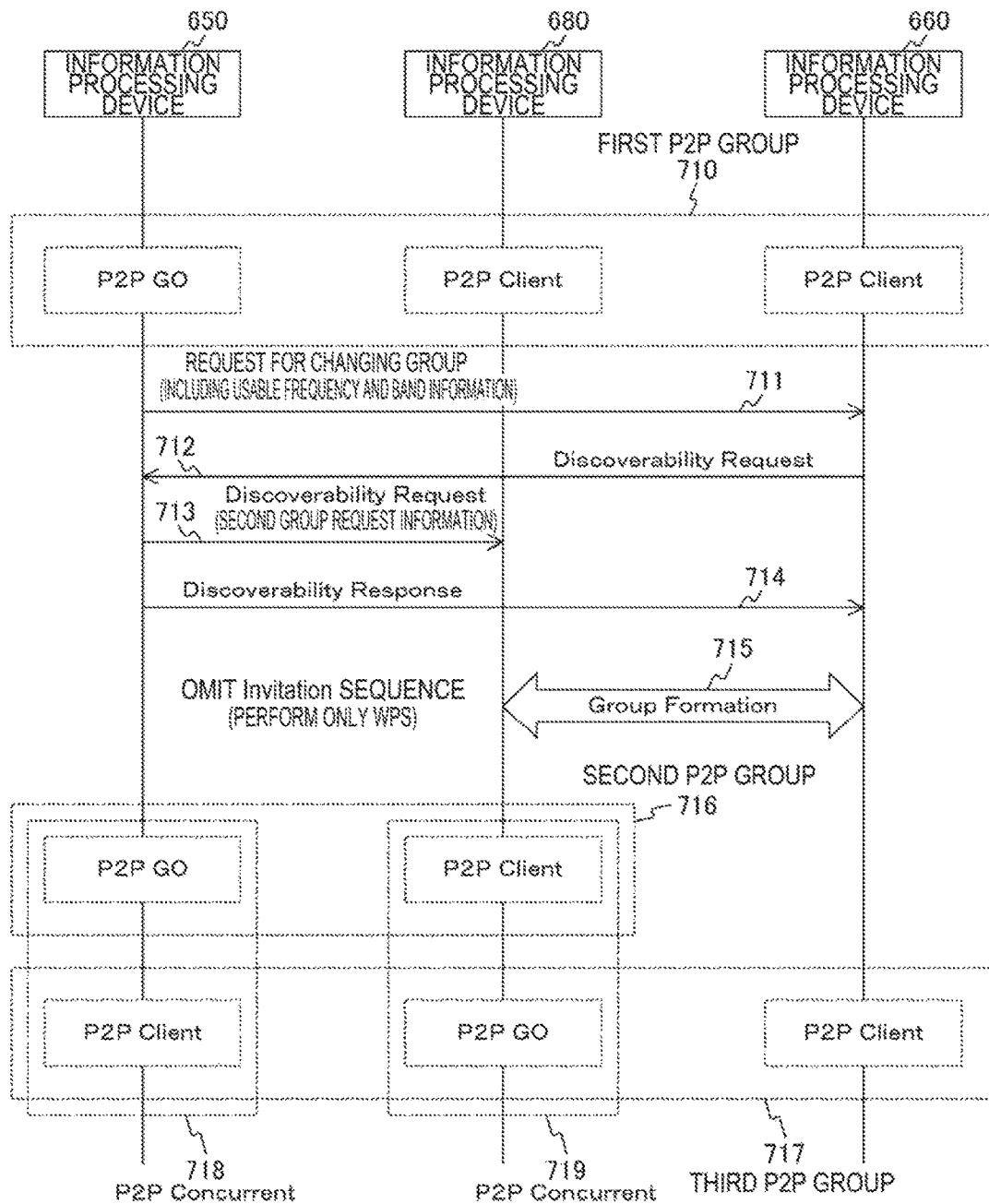
FIG. 20 is a sequence chart illustrating a communication process example between devices included in the communication system 640 according to the second embodiment of the present technology.

Next, FIGS. 20 and 21 illustrate examples of cases in which the information processing device belonging to the first P2P group or a new information processing device not belonging to the first P2P group newly forms the second P2P group.

FIG. 20 illustrates an example of a case in which the first P2P group and the second P2P group perform the concurrent operation at other channels of the same frequency band (for example, only 5 GHz). Alternatively, FIG. 20 illustrates an example of a case in which the first P2P group and the second P2P group use other frequency bands (for example, 2.4 GHz and 5 GHz).

First, a case in which the user performs a manipulation of changing display forms of the information processing devices 680 and 660 using the information processing device 650 and giving an instruction to transmit display content of the information processing device 680 to the information processing devices 650 and 660 is assumed. That is, a case in which use of the information processing devices 680 and 660 is changed is assumed.

Also, content which is transmitted from the information processing device 680 to the information processing device 650 or 660 and is displayed may be the same content (image) or may be different pieces of content (images). For example, an image displayed in the information processing device 680 can be transmitted to the information processing device 650 without change and content stored in a storage unit of the information processing device 680 can also be transmitted to the information processing device 660.

In this way, when the use of the information processing device 660 is changed, the information processing device 650 transmits a command for requesting to form the second P2P group (group changing request) to the information processing device 660 (711).

Here, in the first P2P group 710, the information processing device 650 has already performed capability negotiation. In addition, since the information processing device 650 is the GO of the first P2P group 710, the information processing device 650 can ascertain an empty situation of a transmission band used by each source device connected to the own device in advance. Thus, the information processing device 650 can designate a usable frequency and a usable transmission band of the information processing device 660 using the group changing request (711). That is, the information processing device 650 can include information for forming the second P2P group (for example, information regarding the GO of the second P2P group, the frequency channel, and the data transmission band requested by the information processing device 650) in the group changing request for transmission.

The information processing device 660 starts a process for connection with the information processing device 680 on the basis of the group changing request (information for forming the second P2P group) received from the information processing device 650.

Specifically, the information processing device 660 transmits a discoverability request to the information processing device 650 to make connection at the frequency channel or the data transmission band requested by the information processing device 650 (712). In a packet format of the discoverability request, there is a field in which a frequency channel or a data transmission band is described.

In addition, the information processing device 650 transmits the discoverability request to the information processing device 680 on the basis of the discoverability request received from the information processing device 660 (713). The discoverability request is used for the information processing device 650 to request the information processing device 680 to form the second P2P group and includes second group request information. The second group request information is, for example, a usable frequency, concurrent presence or absence, or a transmission speed.

In addition, the information processing device 650 transmits a response (discoverability response) to the discoverability request to the information processing device 660 (714). The information processing device 650 prompts group formation (715) between the information processing devices 680 and 660 by transmitting the discoverability response. Accordingly, the group formation process starts between the information processing devices 680 and 660 (715).

In addition, the information processing device 650 performs a connection process with the information processing device 680. Also, in the connection process between the information processing devices 650 and 680, only a Wi-Fi protected setup (WPS) process is performed without performing a normal group formation process.

Accordingly, a second P2P group 716 in which the information processing device 650 serves as a P2P GO and a third P2P group 717 in which the information processing device 680 serves as a P2P GO are formed.

Also, FIG. 20 illustrates an example in which interchange is performed in an environment in which the information processing device 660 is connected to the first P2P group 710. However, the example can also be applied to a case in which interchange is performed in an environment in which only the information processing devices 650 and 680 are connected to the first P2P group 710 (that is, an environment in which the information processing device 660 is not connected). That is, the example illustrated in FIG. 20 can also be applied to a case in which the information processing device 660 is connected as a sink device of a new P2P group (third P2P group 717) in the environment in which the information processing device 660 is not connected to the first P2P group 710.

In the environment, for example, the information processing device 660 is connected to the GO (the information processing device 650) of the first P2P group and transmits a message suggesting that the second P2P group is formed. The message may be included in a discoverability request or may be included in a probe request.

When the message is received, the information processing device 650 notifies the information processing device 660 of the frequency channel or the data transmission band used by the first P2P group. Through the notification, the information processing device 660 can determine the frequency channel or the data transmission band of the second P2P group. Also, the information processing device 660 may give the request to the information processing device 650 via the information processing device 680.

In addition, in the formation of the second P2P group, a procedure of connection control of the link at the other frequency channels of the information processing devices 650 and 680 and the link at the other frequency channels of the information processing devices 680 and 660 is not limited. In addition, in a connection process between the information processing devices 650 and 680, a normal group formation process may be performed.

FIG. 21 illustrates an example of a case of coexistence using the same link as that of the first P2P group. That is, FIG. 21 illustrates an example of a case in which the P2P client of the second P2P group is connected using the same frequency channel the GO of the first P2P group.

First, a case in which the user performs a manipulation of changing display forms of the information processing devices 680 and 660 using the information processing device 650 and giving an instruction to transmit display content of the information processing device 680 to the information processing devices 650 and 660 is assumed. That is, a case in which use of the information processing devices 680 and 660 is changed is assumed.

In this case, since the information processing device 650 functions as the GO of the second P2P group, the information processing device 650 transmits a 2nd GO setup request to the information processing device 680 (721). In addition, the 2nd GO setup request includes information indicating whether the same link is used (illustrated in FIGS. 23 and 24).

The information processing device 680 receiving the 2nd GO setup request transmits a response (2nd GO setup response) to the 2nd GO setup request to the information processing device 650 (722).

The information processing device 650 receiving the 2nd GO setup response confirms that the information processing device 680 serves as the GO. Then, after the confirmation, the information processing device 650 transmits disassociation to the information processing device 660 (723).

In addition, the information processing device 680 performs interchange of a P2P invitation request/response with the information processing device 660 (724 and 725). Also, the P2P invitation request/response is illustrated in FIG. 26. Then, the information processing device 680 performs the group formation process with the information processing device 660 (726).

In addition, since the information processing devices 650 and 680 in the environment illustrated in FIG. 21 have already been connected, a wireless link of the first P2P group 720 can be employed without change. Therefore, the connection of the second P2P group is omitted, the information processing device 650 performs P2P client processing, and the information processing device 680 performs a process of starting the function of the GO.

Accordingly, a second P2P group 727 in which the information processing device 650 serves as a P2P GO and a third P2P group 728 in which the information processing device 680 serves as a P2P GO are formed.

Also, FIGS. 19 to 21 illustrate examples in which the information processing devices 650 and 680 operate through P2P concurrent (dotted rectangles 706, 707, 718, 719, 729, and 730) as the concurrent operation. However, as described above, the information processing devices 650 and 680 may operate through WLAN concurrent as a concurrent operation. That is, the information processing devices 650 and 680 may cause the direct communication mode and the infrastructure mode to coexist and may operate.

Also, FIGS. 19 to 21 are examples and the present technology is not limited thereto. An application example of FIGS. 19 to 21 is illustrated in FIG. 22.

For example, as illustrated in FIG. 22, each group is formed after all the negotiations of a level of layer 2 end (741 to 745). Then, images are transmitted between the information processing devices (746). The images can be transmitted even in IP, UDP, or RTP. In addition, a control signal (for example, a MAC address or TCP) can be interchanged while transmitting images.

In addition, while all the negotiations of the level of layer 2 end and an image is transmitted (746), the same process as the connection method illustrated in FIG. 21 may be performed in a connection control sequence of layer 3 or higher (747 to 750).

In addition, in the example illustrated in FIG. 22, as the first P2P group, all the wireless links are connected and a role of the information processing device such as a P2P GO or a P2P client may be changed after the connection.

In addition, the processes illustrated in FIGS. 21 and 22 may be performed after the groups illustrated in FIGS. 19 and 20 are generated. In addition, instead of the processes (747 to 750) performed after images are transmitted (746), as illustrated in FIG. 22, the processes (702 to 705) illustrated in FIG. 19 or the processes (711 to 715) illustrated in FIG. 20 may be performed.

[Another Example when New Group is Formed]

The example in which the P2P client (source device) of the first P2P group is switched to the GO of the first P2P group when the second P2P group is formed has been described above. However, the present technology is not limited thereto. For example, when the second P2P group is generated, the P2P client (source device) of the first P2P group can serve as a P2P client even in the second P2P group. Thus, this example will be described below.

[Transition Example of Group]

Figure 27A:
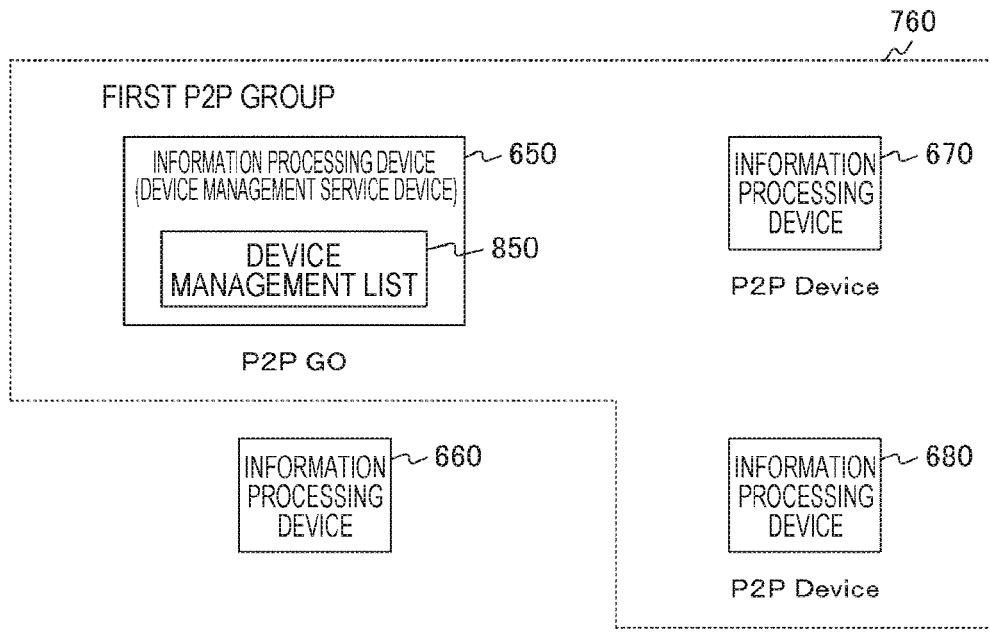
FIGS. 27a and 27b is a are diagrams illustrating a transition example of a group formed by the information processing devices included in the communication system 640 according to the second embodiment of the present technology.
Figure 27B:
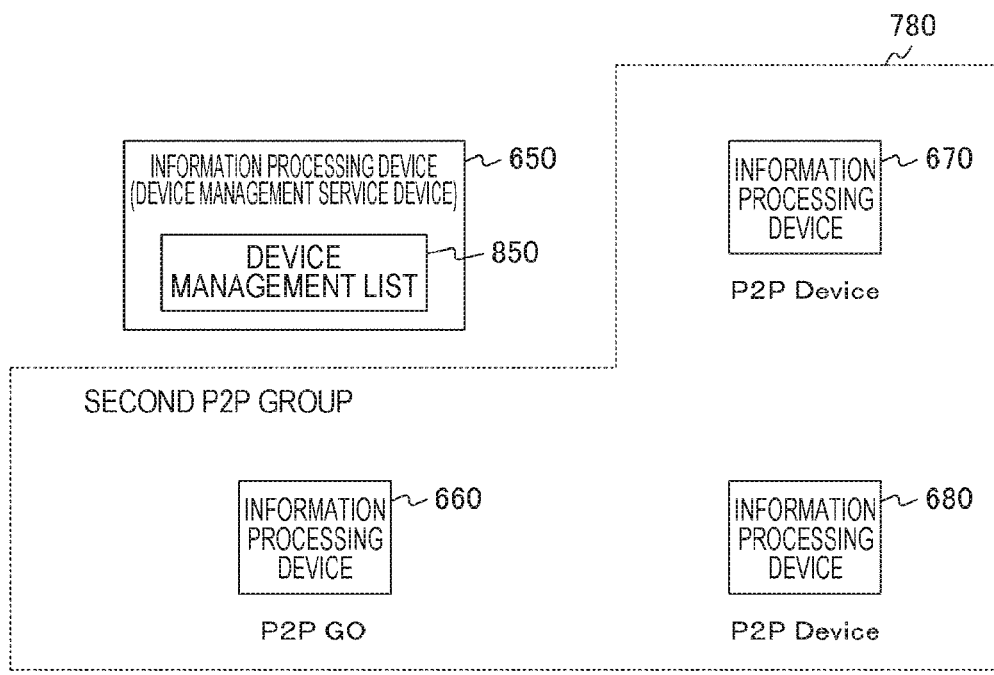

FIGS. 27*a* and 27*b* is a are diagrams illustrating a transition example of a group formed by the information processing devices included in the communication system 640 according to the second embodiment of the present technology.

FIGS. 27*a* and 27*b* illustrate a transition example when a second P2P group 780 is formed in a state in which a first P2P group 760 is formed. That is, the first P2P group 760 is illustrated in FIG. 27*a*. In addition, a second P2P group 780 is illustrated in FIG. 27*b*.

The first P2P group 760 is a P2P group in which images are transmitted from the plurality of source devices (the information processing devices 670 and 680) to one sink device (the information processing device 650). In addition, the second P2P group 780 is a P2P group in which images are transmitted from a plurality of source devices (the information processing devices 670 and 680) to one sink device (the information processing device 660).

In addition, FIGS. 27*a* and 27*b* illustrate an example in which only a device (a device management service device) that performs a device management service for managing the devices (source and sink devices) among the devices included in the communication system 640 is provided. The device management service device functions as, for example, a control device in the entire system.

In addition, FIGS. 27*a* and 27*b* illustrate an example in which the device management service device is set to a sink device (the information processing device 650). In addition, another sink device other than the device management service device (the information processing device 650) is assumed to be connected to the device management service device in a wireless or wired manner. In addition, it is assumed that whether each sink device is activated as the device management service device or activated as another sink device at a timing of an activation time is designated.

In addition, FIGS. 27*a* and 27*b* illustrate an example in which each source device (the information processing devices 670 and 680) switches a sink device of a connection destination on the basis of an instruction from the device management service device (the information processing device 650).

FIG. 27*a* schematically illustrates a dotted rectangle indicating the first P2P group 760 formed by the information processing devices 650, 670, and 680. Here, the device management service device (the information processing device 650) is assumed to retain a device management list 850. Also, the device management list 850 will be described in detail with reference to FIGS. 28*a* and 28*b*.

FIG. 27*b* schematically illustrates a dotted rectangle indicating the second P2P group 780 formed by the information processing devices 660, 670, and 780.

As illustrated in FIGS. 27*a* and 27*b*, while the information processing device 650 serves as a P2P GO in the first P2P group 760, the information processing device 660 serves as a P2P GO in the second P2P group. Also, the P2P clients are assumed to be unchanged in the first P2P group 760 and the second P2P group 780.

[Retained Content Example of Device Management List]

FIGS. 28a and 28b are diagrams schematically illustrating a transition example of retained content of the device management list 850 according to the second embodiment of the present technology.

The device management list 850 is a table in which information (management information) for managing each device connected to the information processing device 650 using wireless communication is retained. For example, in the device management list 850, terminal identification information 851, a device name 852, and a communication scheme 853 are retained in association with each other.

In the terminal identification information 851, identification information (unique ID (for example, a physical address)) for identifying each device connected to the information processing device 650 using the wireless communication is stored.

In the device name 852, a name of each device connected to the information processing device 650 using the wireless communication is stored.

In the communication scheme 853, a communication scheme actually used by each device connected to the information processing device 650 using the wireless communication is stored. As the communication scheme, for example, wired or wireless (a connection form between the information processing device 650 and each terminal with terminal identification information), a maximum transmission speed, and a frequency channel are stored.

Also, each piece of content of the device management list 850 illustrated in FIGS. 28a and 28b may be included in the management information retention unit 390 illustrated in FIG. 4 to be managed.

[Communication Example]

Figure 29:
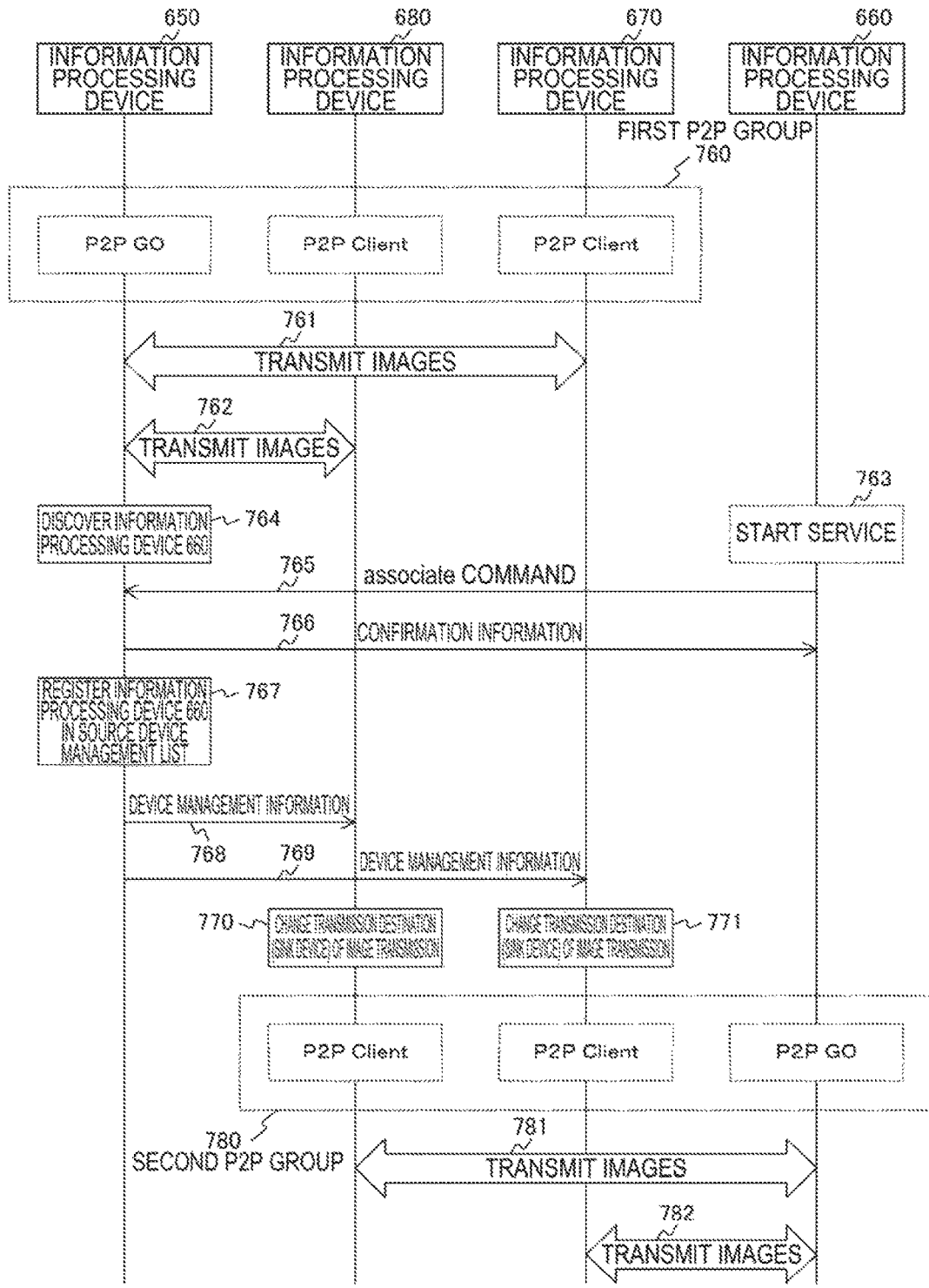

FIG. 29 is a sequence chart illustrating a communication process example between the devices included in the communication system 640 according to the second embodiment of the present technology. Also, in FIG. 29, differences from the above-described communication examples are mainly illustrated and some of the common portions are omitted.

First, the first P2P group 760 is assumed to be formed by connecting a plurality of source devices (the information processing devices 670 and 680) to one sink device (the information processing device 650). In addition, the sink device (the information processing device 650) is assumed to manage the plurality of source devices (the information processing devices 670 and 680) using the device management list 850 (illustrated in FIG. 28a). In addition, images are assumed to be transmitted from the plurality of source devices (the information processing devices 670 and 680) to the sink device (the information processing device 650) (761 and 762).

In the environment, a sink device (the information processing device 660) which does not belong to the first P2P group 760 starts a service (763). In this case, the sink device (the information processing device 650) which is the device management service device discovers the sink device (the information processing device 660) starting the service through a device discovery process (764). In this way, when the sink device (the information processing device 650) discovers the sink device (the information processing device 660), the sink device (the information processing device 660) is registered in the device management list 850 (767).

Specifically, for example, the sink device (the information processing device 660) starting the service transmits an associate command to the sink device (the information processing device 650) which is the device management service device (765). The associate command includes, for example, each piece of information (some or all) stored in the device management list 850 illustrated in FIGS. 28a and 28b.

When the sink device (the information processing device 650) receives the associate command, the sink device (the information processing device 650) transmits confirmation information indicating that the content is confirmed (for example, information indicating OK or NG) to the sink device (the information processing device 660) (766). In this case, it is also possible to confirm whether connection is possible from the sink device (the information processing device 650) which is the device management service device or another device capable of remotely controlling the sink device (the information processing device 650).

In this way, each piece of information regarding the sink device (the information processing device 660) is stored in the device management list 850 by interchanging information between the sink device (the information processing device 650) and the sink device (the information processing device 660) (767). An example of the storage is illustrated in FIG. 28b.

Subsequently, the source devices (the information processing devices 670 and 680) access the device management list 850 managed by the sink device (the information processing device 650) to acquire the device management information stored in the device management list 850 (768 and 769). In this case, the source devices (the information processing devices 670 and 680) can access the device management list 850 on the basis of the control of the sink device (the information processing device 650).

Subsequently, on the basis of the acquired device management information, the source devices (the information processing devices 670 and 680) perform switching for image transmission to the sink device (the information processing device 660) starting the service (770 and 771). Accordingly, the plurality of source devices (the information processing devices 670 and 680) are connected to a new sink device (the information processing device 660) so that the second P2P group 780 is formed. In addition, images are transmitted from the plurality of source devices (the information processing devices 670 and 680) to the new sink device (the information processing device 660) (781 and 782).

Here, a case in which the source devices (the information processing devices 670 and 680) switch a transmission destination of image transmission to the sink device (the information processing device 650) (a case of return to the original transmission destination) is assumed. In this case, the source devices (the information processing devices 670 and 680) are configured to disconnect the link from the sink device (the information processing device 660) and start connection to the sink device (the information processing device 650). When the switching is performed in this way, the sink device (the information processing device 660) preferably notifies the sink device (the information processing device 650) of an image transmission state (for example, stop, disconnection, or reproduction) after the switching.

In this way, the wireless communication unit of each information processing device interchanges a stream for outputting image information from a sink device belonging to a first group using wireless communication in the first group to which a plurality of information processing devices including the own device belong. In addition, as illustrated in FIGS. 10 and 11, the wireless communication unit of each information processing device may interchange a stream for outputting image information from a sink device belonging to the first group via a wireless communication device in the first group. The wireless communication device is, for example, a wireless device such as an access point.

In addition, when a new group (second group) is formed, the control unit of each information processing device performs control such that a group owner of the first group notifies a group owner of the second group of capability information regarding each information processing device. In this case, a second group owner forms the second group on the basis of the capability information regarding the plurality of information processing devices. In addition, the control unit of each information processing device can perform control such that the second group is formed on the basis of use of the sink device or use of a first group owner. Also, the capability information includes at least one of information regarding a frequency to be used, information regarding a transmission rate to be used, and information regarding whether there is the concurrent function.

In addition, the control unit of each information processing device performs control such that state information regarding each of the information processing devices belonging to the first group and limit information regarding each information processing device are interchanged between the information processing devices belonging to the first group. In this way, since whether connection is possible can be ascertained in advance before construction of a topology, a countermeasure method can be messaged to a user in advance.

In addition, on the basis of at least one of a display form and use of a sink device, the control unit of each information processing device can perform control such that the first group owner notifies the second group owner of a usable frequency recommended to the second group and information regarding a transmission speed. Accordingly, in formation of the second group, the second group can be formed while a service of the first group remains stable in accordance with a frequency use situation, a concurrent-mounted situation of each device, and a transmission speed situation of the first group.

In addition, the first group owner can decide the second group owner and clients of the second group so that at least one client belonging to the first group serves as the second group owner. Then, the first group owner can notify each of the information processing devices belonging to the second group of the decided content. In this case, the second group owner can form the second group by performing an invitation process on each information processing device serving as a client of the second group. Accordingly, after the second group is generated, an invitatin is transmitted to each P2P client. Therefore, automatic connection can be performed without troubling a user.

Alternatively, the second group owner can form the second group by performing a provision discovery process on the basis of information received from the information processing devices serving as the clients of the second group. Accordingly, even in a situation in which the image transmission mode is operating, a load of a GO can be reduced by starting access from a P2P client.

In addition, the first group owner can notify an information processing device newly participating in the first group of device management information (for example, each piece of information illustrated in FIG. 4) managed by the first group owner to set a mode for participation in the first group.

Accordingly, it is possible to set a function which can be ascertained in advance and reduce a time of topology connection.

In addition, the control unit of each information processing device can perform control such that the second group is formed by setting a second group owner and clients of the second group via the first group.

In addition, the control unit of each information processing device can perform control such that capability information necessary to form the second group is transmitted to each of the information processing devices belonging to the second group.

In addition, when the first group owner has no concurrent function, the first group owner can transmit the capability information managed by the first group owner to the second group owner for disconnection from the first group.

In addition, as illustrated in FIGS. 27a and 27b to 29, each of the control examples can also be applied to a case in which an information processing device other than the information processing devices belonging to the first group is set to a group owner of the second group.

In addition, when each of the control examples is performed, as illustrated in FIGS. 10 and 11, each piece of information interchanged in the first or second group may be interchanged via another information processing device (for example, an access point). For example, when the second group is formed, the control unit of each information processing device can perform control such that the group owner of the first group notifies the group owner of the second group of the capability information regarding each information processing device via a wireless communication device.

In addition, for a link between the information processing devices belonging to the second group among the information processing devices belonging to the first group, some of the processes of forming a group can be omitted. For example, a process of setting scanning, dynamic host configuration protocol (DHCP), and TCP parts can be omitted. Accordingly, for example, it is possible to accelerate connection and construct a multi-sink topology. That is, it is possible to shorten a setup time of multi-sink topology construction.

Here, interchange between source and sink devices is defined in the Miracast standard. For example, it is possible to refer to Wi-Fi P2P Technical Specification v1.1 (Wi-Fi Direct). In addition, for example, it is possible to refer to Wi-Fi Simple Configuration Technical Specification v2.0.1 (WPS).

In addition, with reference to the technologies, interchange between source and sink devices can be performed in a multi-source topology in which a plurality of source device are connected to one sink device.

In addition, in a situation in which one P2P client may not simultaneously be connected to a plurality of GOs, a concurrent operation is utilized so that the P2P client can participate in two or more groups. Thus, it is important to perform efficient control for forming a new group. In particular, since the number of devices is large in a multi-source topology or a multi-sink topology, a time of P2P connection control may be long. Therefore, it is important to shorten the time. In addition, in regard to a concurrent operation function, it is important to set a common frequency channel or improve efficiency of a transmission band in a multi-source topology or a multi-sink topology.

Thus, in the second embodiment of the present technology, a multi-source topology and a multi-sink topology can coexist without the effort of a user even in a situation in which one P2P client may not be connected to a plurality of GOs. That is, the first P2P group and the second P2P group can coexist. Therefore, it is possible to shorten a connection time.

In addition, in an environment in which there are two or more Miracast groups, it is necessary to manage the capability information regarding all of the devices of the Miracast groups. That is, when the plurality of source devices are connected, it is necessary to perform capability negotiation or service discovery corresponding to the number of source devices. However, when capability negotiation is performed for each Miracast group, it takes time to make connection in accordance with an increase in the number of devices belonging to the group.

Thus, in the second embodiment of the present technology, a GO of the second P2P group can ascertain common capability candidates or common service candidates of a plurality of P2P clients by employing information regarding the first Miracast group. Therefore, it is possible to shorten a connection time. In addition, in regard to two or more Miracast groups, concurrent device information, frequency channel information, transmission band information, and the like are interchanged. Therefore, it is possible to provide an efficient system in a wireless band.

In this way, according to an embodiment of the present technology, it is possible to realize a P2P protocol or a Miracast protocol in formation of a second topology. Accordingly, it is possible to perform a process related to group formation rapidly.

Also, in the second embodiment of the present technology, the example in which the second P2P group is generated on the basis of the use of the group owner which is the sink device in the topology in which the plurality of source devices are connected has been described. However, when the first P2P group is in a multi-sink environment, usefulness for connection of the second P2P group may be achieved on the basis of use of a group owner which is a source device.

Also, the example in which a maximum of two P2P clients (the information processing devices 650 and 660) are connected to one GO (the information processing device 680) is illustrated in FIGS. 10 and 11. However, the second embodiment of the present technology can also be applied to a case in which the number of P2P clients is 3 or more.

In addition, the example in which communication is performed between the plurality of sink devices (the information processing devices 650 and 660) and the plurality of source devices (the information processing devices 670 and 680) is illustrated in FIGS. 10 and 11. However, the second embodiment of the present technology can also be applied to a case in which communication is performed between a plurality of sink devices and one source device. That is, the second embodiment of the present technology can also be applied to either a case in which there is the information processing device 670 or a case in which there is no information processing device 670.

In addition, the example in which the information processing device 660 constructs the topology (708) is illustrated in FIG. 14, but the present technology is not limited thereto. For example, a case in which the information processing device 660 is a dedicated device serving as sink device which can be connected to a plurality of source devices is assumed. In this case, it is important to match the capability information (for example, each piece of information illustrated in FIG. 4) managed by the information processing device 650 with the capability information managed by the information processing device 660. Thus, for example, at the time of activating the information processing device 660, a mode in which the capability information managed by the information processing device 650 is operated as master information is set in the information processing device 660. Accordingly, it is possible to prevent impropriety from occurring in the capability information received by the GO of the second P2P group from the GO of the first P2P group.

In addition, as described above, an embodiment of the present technology can also be applied to a case in which at least one of the sink and source devices includes a plurality of wireless communication units. Thus, FIG. 30 illustrates a communication example between a plurality of source devices and one sink device including a plurality of wireless communication units.

[Configuration Example of Communication System]

Figure 30:
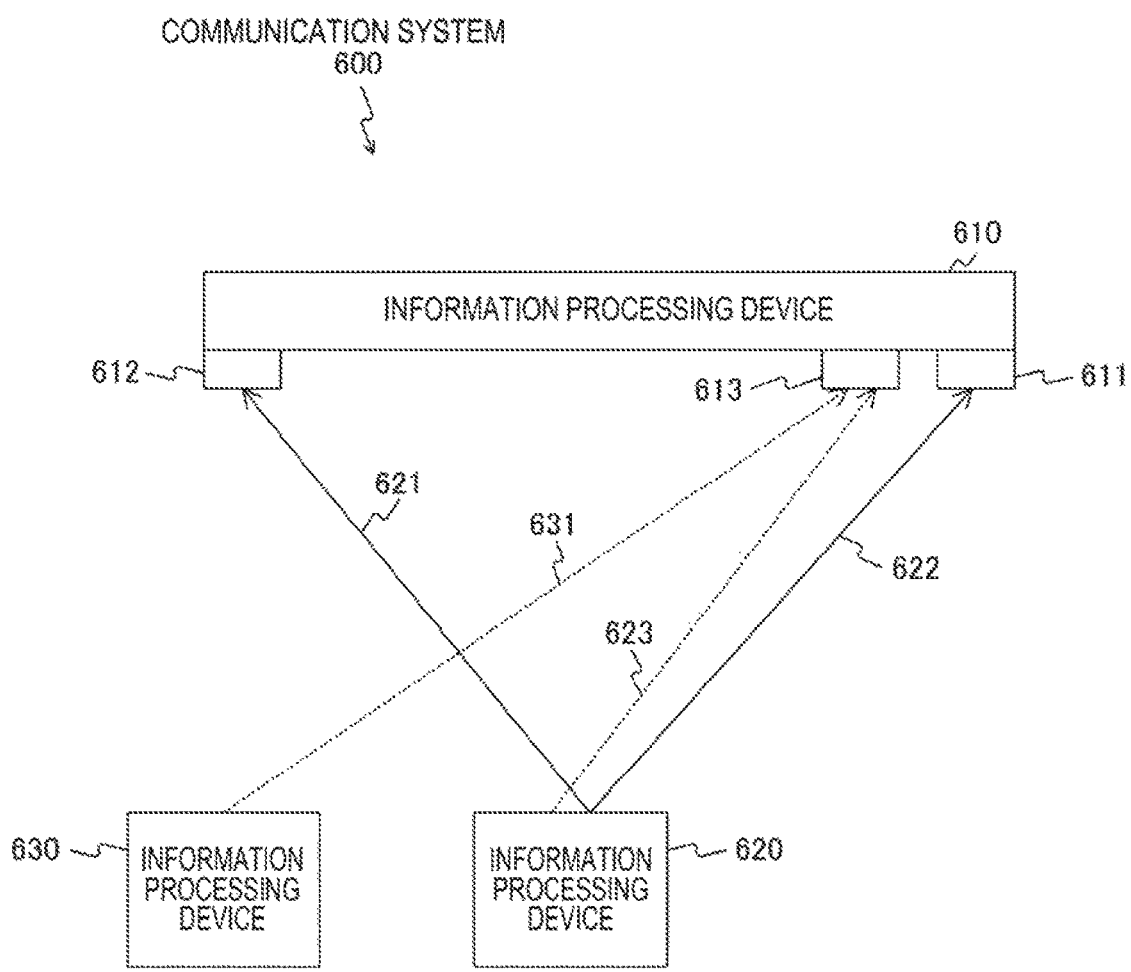

FIG. 30 is a block diagram illustrating a system configuration example of a communication system 600 according to the second embodiment of the present technology.

The communication system 600 includes information processing devices 610, 620, and 630. Also, the communication system 600 corresponds to the communication system 100 illustrated in FIG. 1. For example, the information processing device 610 corresponds to the information processing device 300 which is a sink device, the information processing device 620 corresponds to the information processing device 200 which is a source device, and the information processing device 630 corresponds to the information processing device 400 which is a source device. Therefore, a part of the description common to the communication system 100 will be omitted below.

In addition, a case in which a display area of a main image is greater than a sub-image, as illustrated in FIGS. 5a and 5b, will be described as an example with reference to FIG. 30. In this case, since the main image has a resolution greater than the sub-image, it is preferable to perform high-quality image transmission on the main image and to perform standard quality image transmission on the sub-image.

In addition, FIG. 30 illustrates an example in which an information processing device that can perform a concurrent operation capable of simultaneously using a plurality of frequency channels among three kinds of frequency channels, 2.4 GHz, 5 GHz, and 60 GHz is used. In the concurrent operation, a connection process can be performed while switching between a plurality of devices at the same frequency channel or a plurality (two or more) of different frequency channels. In addition, at the same frequency channel or a plurality of different frequency channels, a plurality of media access control (MAC) layers may be included and simultaneous connection may also be performed.

For example, to perform high-quality image transmission of a main image, it is necessary to select a communication scheme capable of achieving a high data transmission rate. Thus, FIG. 30 illustrates an example in which wireless communication units (for example, the wireless communication units 611 and 612 illustrated in FIG. 30 that conforms to the IEEE 802.11ad standard typified by 60 GHz is used. On the other hand, when standard quality image transmission of a sub-image is performed, a wireless communication unit of 2.4 GHz or 5 GHz (for example, a wireless communication unit 613 illustrated in FIG. 30) is used.

Here, in IEEE 802.11ad used for a main image, high-speed transmission of a maximum of a few Gbps can be performed. Therefore, a resolution is not limited to HD and 4K (4K resolution) transmission can also be performed. Thus, IEEE 802.11ad is appropriate for high-quality image transmission. As described above, however, a technology for gaining a distance by allowing an antenna to have directivity is employed in IEEE 802.11ad. Therefore, an environment in which a link may not be ensured, such as blocking by a person, is also assumed. Thus, in the second embodiment of the present technology, an example in which multi-reception diversity is appropriately set in such an environment (an example appropriately corresponding to a change in a topology) will be described.

Specifically, the information processing device 610 includes three wireless communication units 611 to 613. As described above, the wireless communication units 611 and 612 are assumed to be wireless communication units that conform to the IEEE 802.11ad standard typified by 60 GHz. In addition, the wireless communication unit 613 is assumed to be a wireless communication unit of 2.4 GHz or 5 GHz. Also, in the embodiment of the present technology, an example in which the plurality of frequency bands are used will be described, but the present technology is not limited thereto. In addition, an example in which the wireless communication units are divided by 2.4 GHz or 5 GHz and 60 GHz will be described, but the wireless communication units may not be divided in this way or only any one of the frequency bands may be used in a time-division manner.

In this way, in FIG. 30, two wireless interfaces (the wireless communication units 611 and 612 of 60 GHz) of a sink device (the information processing device 610) are included. That is, the sink device (the information processing device 610) includes a plurality of reception units (the wireless communication units 611 and 612 of 60 GHz) that perform reception using multi-reception diversity. Then, when the multi-reception diversity is used, the plurality of reception units (the wireless communication units 611 and 612 of 60 GHz) are used. Accordingly, for example, even when an obstacle comes between the information processing device 620 and the wireless communication unit 621 (as indicated by a dotted line 622) and link disconnection occurs, the link can be avoided between the information processing device 620 and the wireless communication unit 612 (as indicated by a solid line 621). That is, image transmission between the information processing devices 610 and 620 can be prevented from being interrupted.

In this way, when the transmission from the information processing device 620 to the information processing device 610 is performed using the multi-reception diversity, the information processing device 620 copies the same image data as image data transmitted to the wireless communication unit 611 and transmits packets to the wireless communication unit 612.

In addition, the information processing device 610 can interpolate packets lost in regard to the image data received by the wireless communication unit 611 from the image data received by the wireless communication unit 612. By interpolating the lost packets in this way, the image data can be as close to the image data transmitted by the information processing device 620 as possible. In addition, the information processing device 610 generates a main image on the basis of the image data subjected to the interpolation process and displays the main image on a display unit.

In addition, the information processing device 630 is connected to the wireless communication unit 613 so that the image data can be transmitted to the wireless communication unit 613. In this case, the information processing device 610 generates a sub-image on the basis of the image data received by the wireless communication unit 613 and displays the sub-image on the display unit.

For example, when the information processing device 620 transmits the main image to the information processing device 610 through the high-quality image transmission in this way, the connection between the information processing devices 610 and 620 can be set to 1 to 2 (as indicated by solid lines 621 and 622). In addition, for example, when the information processing device 630 transmits the sub-image to the information processing device 610 through the standard quality image transmission, the connection between the information processing devices 610 and 630 can be set to 1 to 1 (as indicated by a dotted line 631). In addition, for example, when the information processing device 620 transmits a sub-image to the information processing device 610 through the standard quality image transmission, the connection between the information processing devices 610 and 620 can be set to 1 to 1 (as indicated by a dotted line 623).

In addition, for example, at least one of source and sink devices may be configured to have a tag function of NFC or a reader/writer function. In this case, a device can be allowed to participate in an existing group through a touch operation using NFC. In addition, a group owner of a new group can be decided through a touch operation using NFC. For example, a device performing a touch on a group owner (or a sink device) of an existing group can be decided as a group owner of a new group. In this way, when a touch operation is performed using NFC, each of the above-described items of information can be employed through wireless communication by the touch.

Also, the use of the information processing device 650 or 660 is not limited to the above-described use. In addition, manipulating a display state of the information processing device 650 or 660 and giving an instruction for display as multi-display can also be ascertained as use of the information processing device 650 or 660. In addition, for example, manipulating a display state of the information processing device 650 or 660 and changing the display state of each device as in extension display can also be ascertained as use of the information processing device 650 or 660. In addition, for example, performing a manipulation of changing a GO on the information processing device 650 or 660 via another information processing device can also be ascertained as use of the information processing device 650 or 660. Also, the other information processing device is, for example, an information processing device (for example, a remote control, a tablet terminal, or a smartphone) that is connected to the information processing device 650 or 660 using wired communication or wireless communication and is able to manipulate the information processing device 650 or 660.

In this way, the control unit of each information processing device can perform control such that multi-reception of a stream related to another information processing device is set on the basis of capability information regarding the other information processing device and use of the information processing device.

In addition, in an embodiment of the present technology, to improve robustness of resistance of a link in which high-quality image transmission is necessary, the multi-reception diversity can be appropriately set or switched in accordance with a connection form. By controlling the setting or the switching in this way, it is possible to stably transmit or receive a video with high quality.

In addition, according to an embodiment of the present technology, a sink device that performs output on the basis of streams from a plurality of source devices adjusts resolutions of the streams, stops transmission, and changes a frequency channel so that unnecessary power consumption can be reduced. Accordingly, it is possible to realize communication appropriate for a mobile device. In addition, it is possible to improve band use efficiency of a frequency channel and realize communication in which robustness is improved.

That is, for example, when a plurality of source devices is connected to one unitary monitor (for example, a monitor with a large screen of 80 inches or a monitor in which a plurality of small monitors are bundled), it is possible to perform appropriate setting in accordance with each topology.

Also, an embodiment of the present technology can also be applied to other devices that have wireless communication functions. For example, an embodiment of the present technology can be applied to an imaging device (for example, a digital still camera or a digital video camera (for example, a camera-integrated recorder)) that has a wireless communication function. In addition, for example, an embodiment of the present technology can be applied to a display device (for example, a television, a projector, or a personal computer) that has a wireless communication function or a portable information processing device (for example, a smartphone or a tablet terminal).

<3. Application Examples>

The technology of the present disclosure can be applied to various products. For example, the information processing device 200, 300, 400, 610, 620, 630, 650, 660, 670, and 680 may be realized as a mobile terminal such as a smartphone, a tablet-type personal computer (PC), a notebook PC, a portable game terminal, or a digital camera, a fixed-type terminal such as a television receiver set, a printer, a digital scanner, or a network storage, or an in-vehicle terminal such as a car navigation device. In addition, the information processing device 200, 300, 400, 610, 620, 630, 650, 660, 670, and 680 may be realized as a terminal which performs machine-to-machine (M2M) communication (which is also referred to as a machine-type communication (MTC) terminal) such as a smart meter, a vending machine, a remote monitoring device, or a point-of-sale (POS) terminal. Furthermore, the information processing device 200, 300, 400, 610, 620, 630, 650, 660, 670, and 680 may be a wireless communication module (for example, an integrated circuit module configured in one die) mounted in these terminals.

[3-1. First Application Example]

Figure 31:
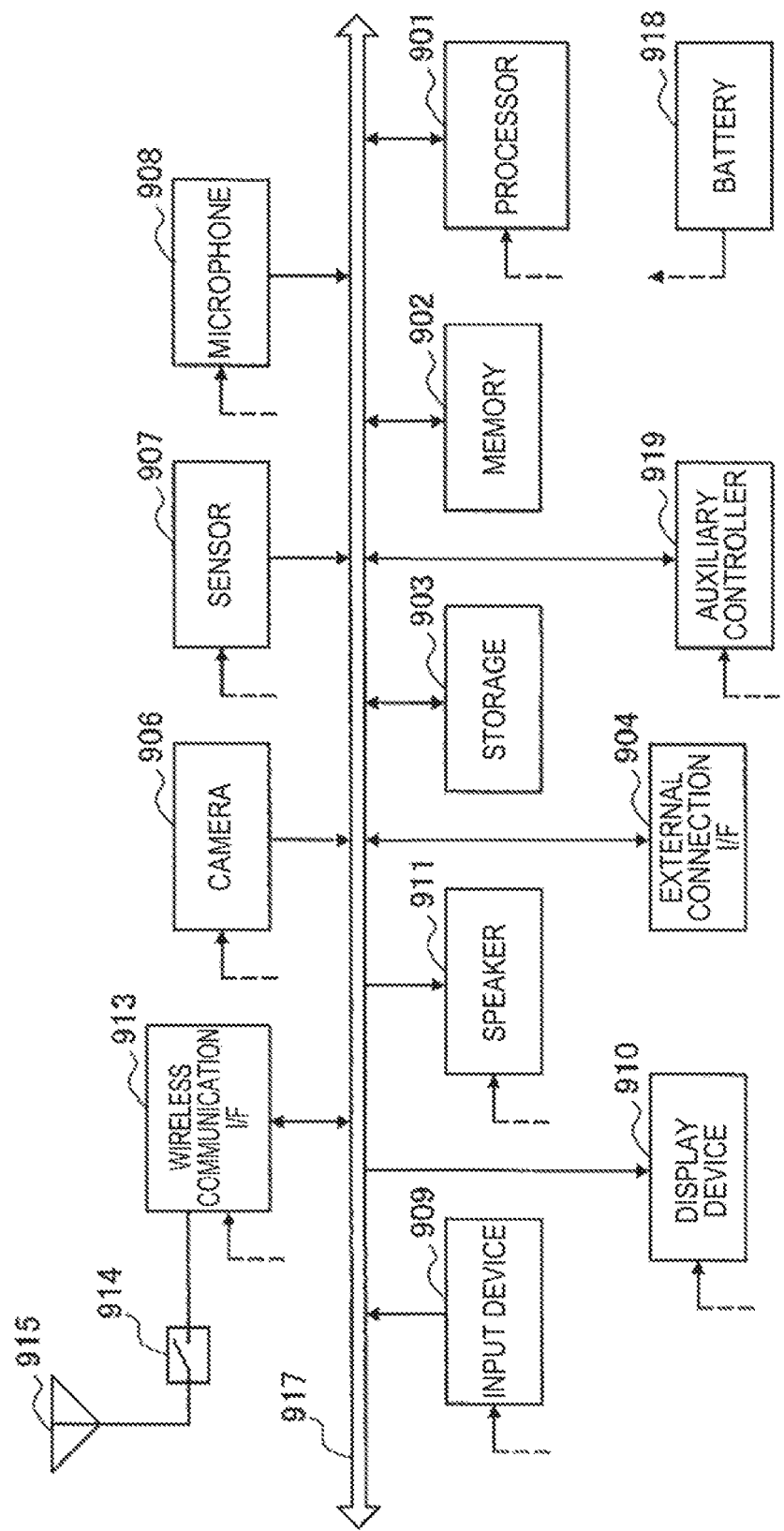

FIG. 31 is a block diagram showing an example of a schematic configuration of a smartphone 900 to which the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a wireless communication interface 913, an antenna switch 914, an antenna 915, a bus 917, a battery 918, and an auxiliary controller 919.

The processor 901 may be, for example, a central processing unit (CPU) or a system on a chip (SoC), and controls functions of an application layer and another layer of the smartphone 900. The memory 902 includes a random access memory (RAM) and a read only memory (ROM), and stores a program that is executed by the processor 901, and data. The storage 903 may include a storage medium such as a semiconductor memory or a hard disk. The external connection interface 904 is an interface for connecting an external device such as a memory card or a universal serial bus (USB) device to the smartphone 900.

The camera 906 includes an image sensor such as a charge coupled device (CCD) and a complementary metal oxide semiconductor (CMOS), and generates a captured image. The sensor 907 may include a group of sensors such as a measurement sensor, a gyro sensor, a geomagnetic sensor, and an acceleration sensor. The microphone 908 converts sounds that are input to the smartphone 900 to audio signals. The input device 909 includes, for example, a touch sensor configured to detect touch onto a screen of the display device 910, a keypad, a keyboard, a button, or a switch, and receives an operation or an information input from a user. The display device 910 includes a screen such as a liquid crystal display (LCD) and an organic light-emitting diode (OLED) display, and displays an output image of the smartphone 900. The speaker 911 converts audio signals that are output from the smartphone 900 to sounds.

The wireless communication interface 913 supports one or more of wireless LAN standards such as IEEE 802.11a, 11b, 11g, 11n, 11ac, and 11ad to execute wireless communication. The wireless communication interface 913 can communicate with another device via a wireless LAN access point in an infrastructure mode. In addition, the wireless communication interface 913 can directly communicate with another device in an ad hoc mode or a direct communication mode such as Wi-Fi direct, or the like. In the Wi-Fi Direct, unlike the ad-hoc mode, one of two terminals operates as an access point, but communication is performed directly between the terminals. The wireless communication interface 913 can typically include a baseband processor, a radio frequency (RF) circuit, and a power amplifier. The wireless communication interface 913 may be a one-chip module in which a memory which stores a communication control program, a processor which executes the program and a relevant circuit are integrated. The wireless communication interface 913 may support other kinds of wireless communication schemes such as a near field wireless communication scheme, a proximity wireless communication scheme or a cellular communication scheme in addition to the wireless LAN scheme. The antenna switch 914 switches connection destinations of the antenna 915 between a plurality of circuits (for example, circuits for different wireless communication schemes) included in the wireless communication interface 913. The antenna 915 has a single or a plurality of antenna elements (for example, a plurality of antenna elements which constitute a MIMO antenna), which are used by the wireless communication interface 913 for transmission and reception of radio signals. Further, a function of a wireless communication interface for establishing a connection with a public line based on specifications such as IEEE 802.16 or 3GPP (for example, W-CDMA, GSM, WiMAX, WiMAX2, LTE, or LTE-A) to perform communication with the public line may be provided.

It should be noted that the smartphone 900 is not limited to the example of FIG. 31 and may include a plurality of antennas (for example, an antenna for a wireless LAN, an antenna for the proximity wireless communication scheme, or an antenna for a public line communication, etc.). In that case, the antenna switch 914 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 913, and the auxiliary controller 919 to each other. The battery 918 supplies power to blocks of the smartphone 900 illustrated in FIG. 31 via feeder lines, which are partially shown as dashed lines in the figure. The auxiliary controller 919 operates a minimum necessary function of the smartphone 900, for example, in a sleep mode.

In the smartphone 900 shown in FIG. 31, the control unit 240 described using FIG. 2, and the control unit 370 described using FIG. 3 may be implemented by the wireless communication interface 913. In addition, at least some of these functions may be implemented by the processor 901 or the auxiliary controller 919.

The smartphone 900 may operate as a wireless access point (software AP) by executing an access point function at an application level through the processor 901. Further, the wireless communication interface 913 may have a wireless access point function.

[3-2. Second Application Example]

FIG. 32 is a block diagram illustrating an example of a schematic configuration of a car navigation device 920 to which the technology of the present disclosure may be applied. The car navigation device 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, an antenna switch 934, an antenna 935, and a battery 938.

The processor 921 may be, for example, a CPU or a SoC, and controls a navigation function and another function of the car navigation device 920. The memory 922 includes RAM and ROM, and stores a program that is executed by the processor 921, and data.

The GPS module 924 uses GPS signals received from a GPS satellite to measure a position (such as latitude, longitude, and altitude) of the car navigation device 920. The sensor 925 may include a group of sensors such as a gyro sensor, a geomagnetic sensor, and a barometric sensor. The data interface 926 is connected to, for example, an in-vehicle network 941 via a terminal that is not shown, and acquires data generated by the vehicle, such as vehicle speed data.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or an information input from a user. The display device 930 includes a screen such as a LCD or an OLED display, and displays an image of the navigation function or content that is reproduced. The speaker 931 outputs sounds of the navigation function or the content that is reproduced.

The wireless communication interface 933 supports one or more of wireless LAN standards such as IEEE 802.11a, 11b, 11g, 11n, 11ac, and 11ad to execute wireless communication. The wireless communication interface 933 can communicate with another device via a wireless LAN access point in an infrastructure mode. In addition, the wireless communication interface 933 can directly communicate with another device in an ad hoc mode or a direct communication mode such as Wi-Fi Direct. The wireless communication interface 933 can typically include a baseband processor, an RF circuit, and a power amplifier. The wireless communication interface 933 may be a one-chip module in which a memory which stores a communication control program, a processor which executes the program and a relevant circuit are integrated. The wireless communication interface 933 may support other kinds of wireless communication schemes such as a near field wireless communication scheme, a proximity wireless communication scheme or a cellular communication scheme in addition to the wireless LAN scheme. The antenna switch 934 switches connection destinations of the antenna 935 between a plurality of circuits included in the wireless communication interface 933. The antenna 935 has a single or a plurality of antenna elements, which are used by the wireless communication interface 933 for transmission and reception of radio signals.

In addition, the car navigation device 920 may include a plurality of antennas, not limited to the example of FIG. 32. In that case, the antenna switches 934 may be omitted from the configuration of the car navigation device 920.

The battery 938 supplies power to blocks of the car navigation device 920 illustrated in FIG. 32 via feeder lines that are partially shown as dashed lines in the figure. The battery 938 accumulates power supplied form the vehicle.

In the car navigation device 920 illustrated in FIG. 32, the control unit 240 described using FIG. 2 and the control unit 370 described using FIG. 3 may be implemented by the wireless communication interface 933. At least a part of the functions may also be implemented by the processor 921.

The technology of the present disclosure may also be realized as an in-vehicle system (or a vehicle) 940 including one or more blocks of the car navigation device 920, the in-vehicle network 941, and a vehicle module 942. The vehicle module 942 generates vehicle data such as vehicle speed, engine speed, and trouble information, and outputs the generated data to the in-vehicle network 941.

The above-described embodiments are examples for embodying the present technology, and matters in the embodiments each have a corresponding relationship with disclosure-specific matters in the claims. Likewise, the matters in the embodiments and the disclosure-specific matters in the claims denoted by the same names have a corresponding relationship with each other. However, the present technology is not limited to the embodiments, and various modifications of the embodiments may be embodied in the scope of the present technology without departing from the spirit of the present technology.

The processing sequences that are described in the embodiments described above may be handled as a method having a series of sequences or may be handled as a program for causing a computer to execute the series of sequences and recording medium storing the program. As the recording medium, a hard disk, a CD (Compact Disc), an MD (Mini-Disc), and a DVD (Digital Versatile Disc), a memory card, and a Blu-ray disc (registered trademark) can be used.

Effects described in the present description are just examples, the effects are not limited, and there may be other effects.

Additionally, the present technology may also be configured as below.

(1)

An information processing device including:

a wireless communication unit configured to interchange a stream for outputting image information from a first information processing device by using wireless communication, the first information processing device belonging to a first group to which one or more information processing devices including the own device belong; and a control unit configured to perform control such that capability information regarding the one or more information processing devices is exchanged with a second information processing device belonging to a second group which is a new group other than the first group when the second group is formed.

(2)

The information processing device according to (1), wherein the control unit performs control such that a process of exchanging a request and a response with the second information processing device is performed, the request and the response including information regarding a usable frequency channel or data transmission band.

(3)

The information processing device according to (2), wherein the control unit performs control such that a group changing request including predetermined band information is transmitted to the second information processing device before the process of exchanging the request and the response when the second group is formed.

(4)

The information processing device according to (2) or (3), wherein the control unit performs control such that the process of exchanging the request and the response is realized through provision discovery.

(5)

The information processing device according to any of (1) to (4), wherein the second information processing device forms the second group on the basis of the capability information regarding the one or more information processing devices.

(6)

The information processing device according to any of (1) to (5), wherein the control unit performs control such that the second group is formed on the basis of a way of using the first information processing device.

(7)

The information processing device according to any of (1) to (6), wherein the control unit performs control such that state information indicating a role of each of the information processing devices belonging to the first group and limit information regarding a limit of each of the information processing devices are interchanged between the information processing devices belonging to the first group, the information being used at time of deciding a role of the second group.

(8)

The information processing device according to any of (1) to (7), wherein the control unit performs control such that the second information processing device is notified of information regarding a usable frequency and a transmission speed recommended to the second group on the basis of at least one of a display form of the first information processing device and a way of using the first information processing device.

(9)

The information processing device according to any of (1) to (8), wherein the first information processing device manages device management information of each of the information processing devices belonging to the first group.

(10)

The information processing device according to any of (1) to (9), wherein the first information processing device decides a group owner of the second group and a client of the second group so that at least one client belonging to the first group serves as the second information processing device, and the first information processing device notifies each of the information processing devices belonging to the second group of content of the decision.

(11)

The information processing device according to (10), wherein the group owner of the second group forms the second group by performing an invitation process on each information processing device to be a client of the second group.

(12)

The information processing device according to (10), wherein the group owner of the second group forms the second group by performing a provision discovery process on the basis of information received from an information processing device to be a client of the second group.

(13)

The information processing device according to any of (1) to (12), wherein the first information processing device notifies an information processing device that newly participates in the first group of device management information managed by the first information processing device and causes the information processing device to set a mode for participation in the first group.

(14)

The information processing device according to any of (1) to (13), wherein the control unit performs control such that the second group is formed by setting a group owner of the second group and a client of the second group via the first group.

(15)

The information processing device according to any of (1) to (14), wherein the control unit performs control such that the capability information necessary to form the second group is transmitted to each of the information processing devices that are to belong to the second group.

(16)

The information processing device according to any of (1) to (15), wherein, when the first information processing device does not have a concurrent function, the first information processing device transmits the capability information managed by the first information processing device to the second information processing device for disconnection from the first group.

(17)

The information processing device according to any of (1) to (16), wherein the capability information includes at least one of information regarding a frequency to be used, information regarding a transmission rate to be used, and information regarding whether there is a concurrent function.

(18)

An information processing method including:

a communication procedure of interchanging a stream for outputting image information from a first information processing device by using wireless communication, the first information processing device belonging to a first group to which one or more information processing devices belong; and a control procedure of performing control such that capability information regarding the one or more information processing devices is exchanged with a second information processing device belonging to a second group which is a new group other than the first group when the second group is formed.

(19)

A program causing a computer to perform:

a communication procedure of interchanging a stream for outputting image information from a first information processing device by using wireless communication, the first information processing device belonging to a first group to which one or more information processing devices belong; and a control procedure of performing control such that capability information regarding the one or more information processing devices is exchanged with a second information processing device belonging to a second group which is a new group other than the first group when the second group is formed.

REFERENCE SIGNS LIST 100 communication system
200 information processing device
201 data transmission system
202 line control system
210 antenna
220 wireless communication unit
230 control signal reception unit
240 control unit
250 image and audio signal generation unit
260 image and audio compression unit
270 stream transmission unit
300 information processing device
301 line control system
302 input and output system
310 antenna
320 wireless communication unit
330 stream reception unit
340 image and audio decompression unit
350 image and audio output unit
351 display unit
352 audio output unit
360 user information acquisition unit
361 imaging unit
370 control unit
380 control signal transmission unit
390 management information retention unit
400 information processing device
420 source device
430 sink device
600 communication system
610 information processing device
611 to 613 wireless communication unit
620, 630 information processing device
640 communication system
650 information processing device
651, 652 wireless communication unit
660 information processing device
661 wireless communication unit
670 information processing device
680 information processing device
900 smartphone
901 processor
902 memory
903 storage
904 external connection interface
906 camera
907 sensor
908 microphone
909 input device
910 display device
911 speaker
913 wireless communication interface
914 antenna switch
915 antenna
917 bus
918 battery
919 auxiliary controller
920 car navigation device
921 processor
922 memory
924 GPS module
925 sensor
926 data interface
927 content player
928 storage medium interface
929 input device
930 display device
931 speaker
933 wireless communication interface
934 antenna switch
935 antenna
938 battery
941 in-vehicle network
942 vehicle module

The invention claimed is:

1. A first information processing device, comprising:
circuitry configured to:
interchange a stream for output of image information from a second information processing device by wireless communication, wherein the second information processing device belongs to a first group, wherein the first group includes a plurality of information processing devices including the first information processing device and the second information processing device; and
control exchange of capability information regarding the plurality of information processing devices with a third information processing device that belongs to a second group at a time the second group including the first information processing device and the third information processing device is formed, wherein the second group is a new group and different from the first group.

2. The first information processing device according to claim 1, wherein the circuitry is further configured to control exchange of a request and a response with the third information processing device, wherein the request and the response includes information regarding at least one of a usable frequency channel or data transmission band.

3. The first information processing device according to claim 2, wherein the circuitry is further configured to control transmission of a group changing request including predetermined band information to the third information processing device prior to the exchange of the request and the response.

4. The first information processing device according to claim 2, wherein the exchange of the request and the response is realized through provision discovery.

5. The first information processing device according to claim 1, wherein the third information processing device forms the second group based on the capability information regarding the plurality of information processing devices.

6. The first information processing device according to claim 1, wherein the second group is formed based on of a way of using the second information processing device.

7. The first information processing device according to claim 1, wherein
the circuitry is further configured to control interchange of state information and limit information between the plurality of information processing devices,
the state information indicates a role of each information processing device of the plurality of information processing devices that belongs to the first group, the limit information indicates a limit of each information processing device of the plurality of information processing devices, and the state information and the limit information are used at time of deciding a role of the second group.

8. The first information processing device according to claim 1, wherein the circuitry is further configured to notify the third information processing device of information regarding a usable frequency and a transmission speed recommended to the second group based on at least one of a display form of the second information processing device or a way of using the second information processing device.

9. The first information processing device according to claim 1, wherein the second information processing device manages device management information of each information processing device of the plurality of information processing devices that belongs to the first group.

10. The first information processing device according to claim 1, wherein
the second information processing device determines a group owner of the second group and a client of the second group so that at least one client that belongs to the first group serves as the third information processing device, and the second information processing device notifies each information processing device of the plurality of information processing devices that belongs to the second group of the determination.

11. The first information processing device according to claim 10, wherein the group owner of the second group forms the second group by execution of an invitation process on each information processing device of the plurality of information processing devices to be the client of the second group.

12. The first information processing device according to claim 10, wherein the group owner of the second group forms the second group by execution of a provision discovery process based on information received from a fourth information processing device to be the client of the second group.

13. The first information processing device according to claim 1, wherein the second information processing device notifies a fourth information processing device that newly participates in device management information managed by the second information processing device, and causes the fourth information processing device to set a mode for participation in the first group.

14. The first information processing device according to claim 1, wherein the circuitry is further configured to control setting of a group owner of the second group and a client of the second group via the first group.

15. The first information processing device according to claim 1, wherein the circuitry is further configured to control to transmit capability information that is necessary to form the second group to each information processing device of the plurality of information processing devices that are to belong to the second group.

16. The first information processing device according to claim 1, wherein the second information processing device transmits the capability information managed by the second information processing device to the third information processing device for disconnection from the first group.

17. The first information processing device according to claim 1, wherein the capability information includes at least one of information regarding a frequency to be used, information regarding a transmission rate to be used, or information regarding whether there is a concurrent function.

18. An information processing method, comprising:
in a first information processing device:
interchanging a stream for outputting image information from a second information processing device by wireless communication, wherein the second information processing device belongs to a first group, wherein the first group includes a plurality of information processing devices including the first processing information device and the second information processing device; and controlling exchange of capability information regarding the plurality of information processing devices with a third information processing device that belongs to a second group at a time the second group including the first information processing device and the third information processing device is formed, wherein the second group is a new group and different from the first group.

19. A non-transitory computer-readable medium having stored thereon, computer-executable instructions, which when executed by a processor of a first information processing device, cause the processor to execute operations, the operations comprising:
interchanging a stream for outputting image information from a second information processing device by wireless communication, wherein the second information processing device belongs to a first group, wherein the first group includes a plurality of information processing devices including the first information processing device and the second information processing device; and controlling exchange of capability information regarding the plurality of information processing devices with a third information processing device that belongs to a second group at a time the second group including the first information processing device and the third information processing device is formed, wherein the second group is a new group and different from the first group.

* * * * *